Jan. 16, 1962
F. ZANKL ET AL
3,016,804
PROGRAM CONTROL SYSTEM
Filed Sept. 4, 1956
11 Sheets-Sheet 1
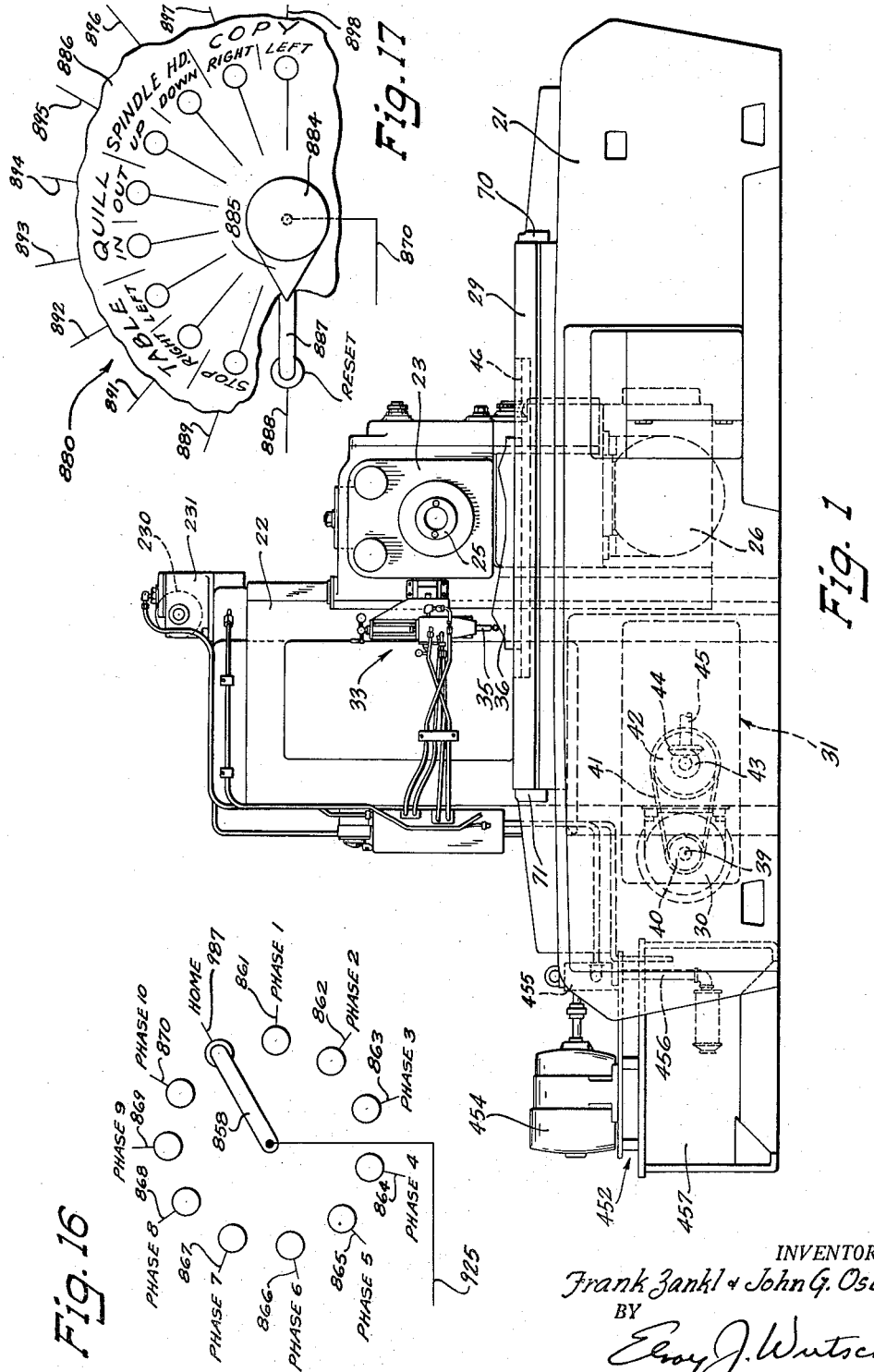
INVENTORS.
Frank Zankl & John G. Osburn
BY
Elroy J. Wutschel
Attorney

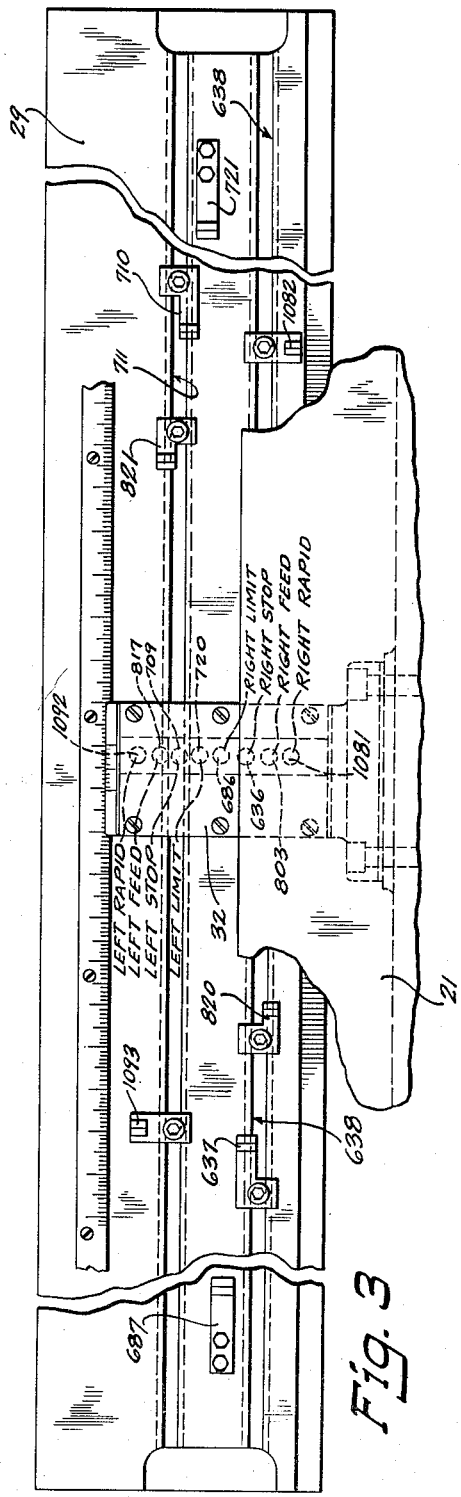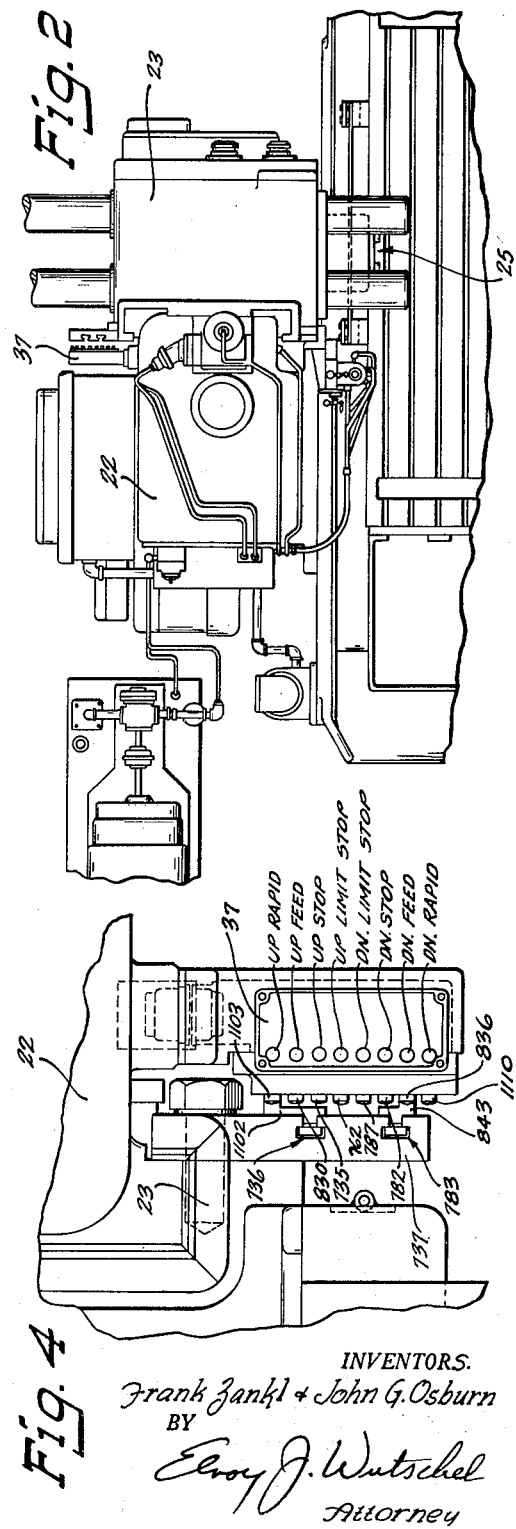

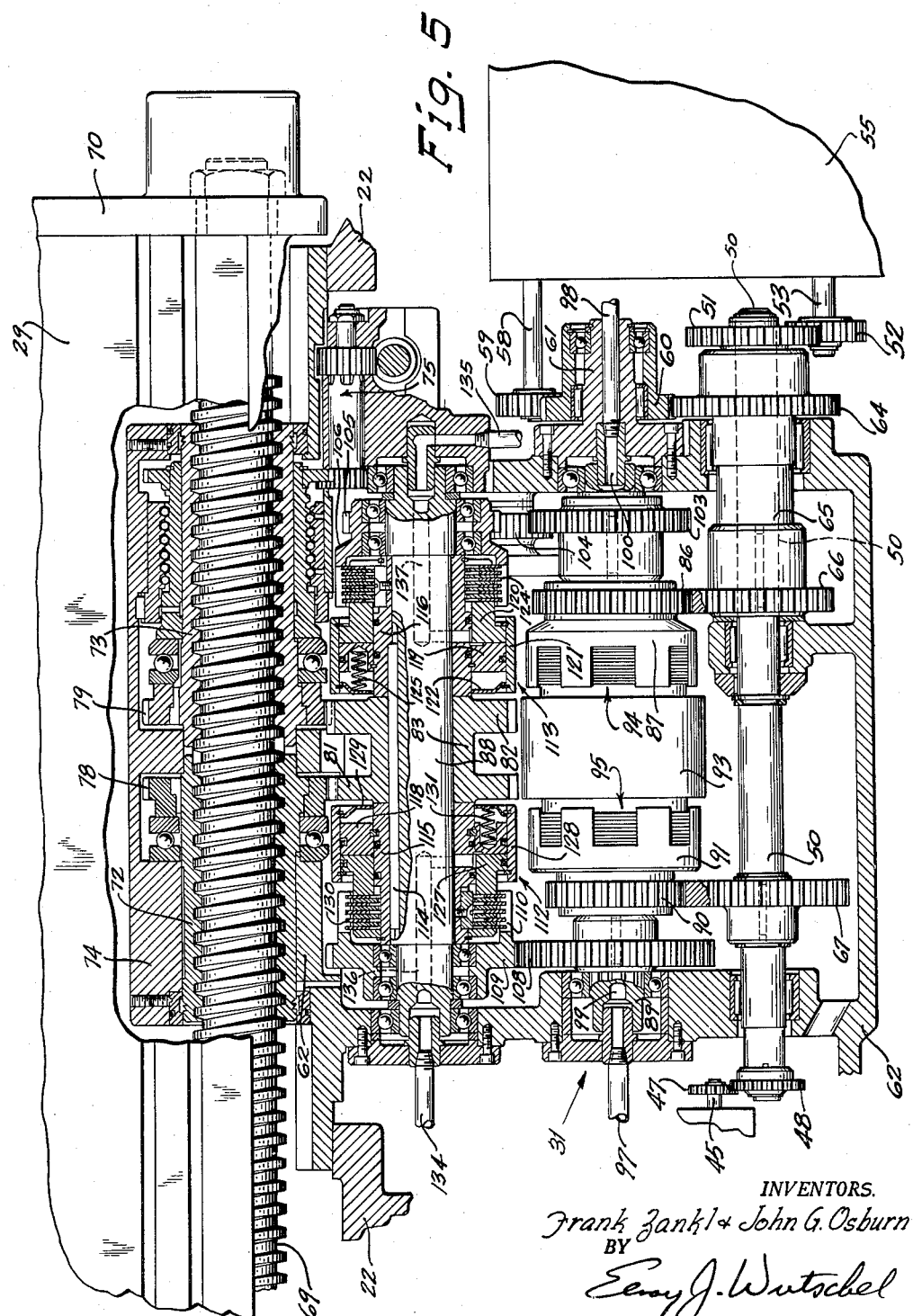

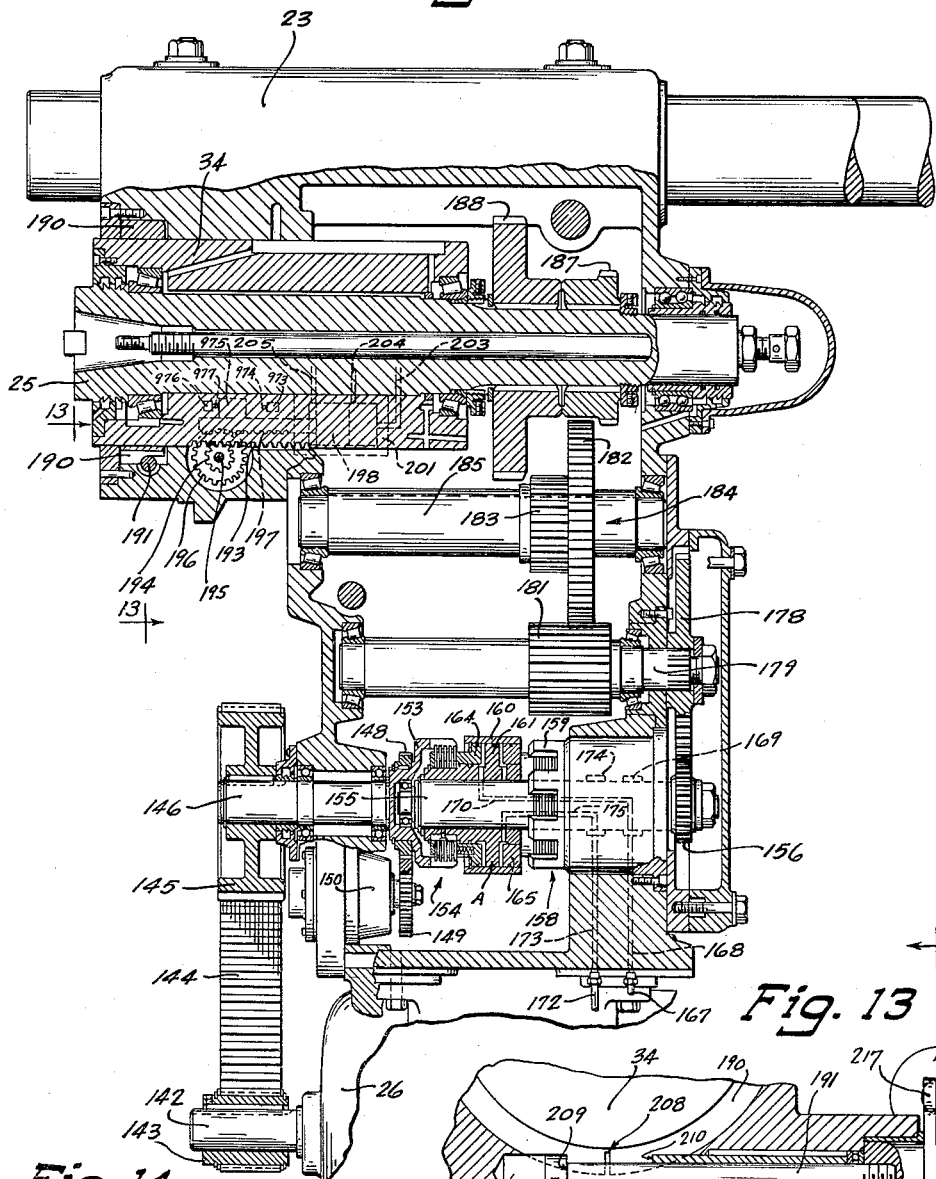

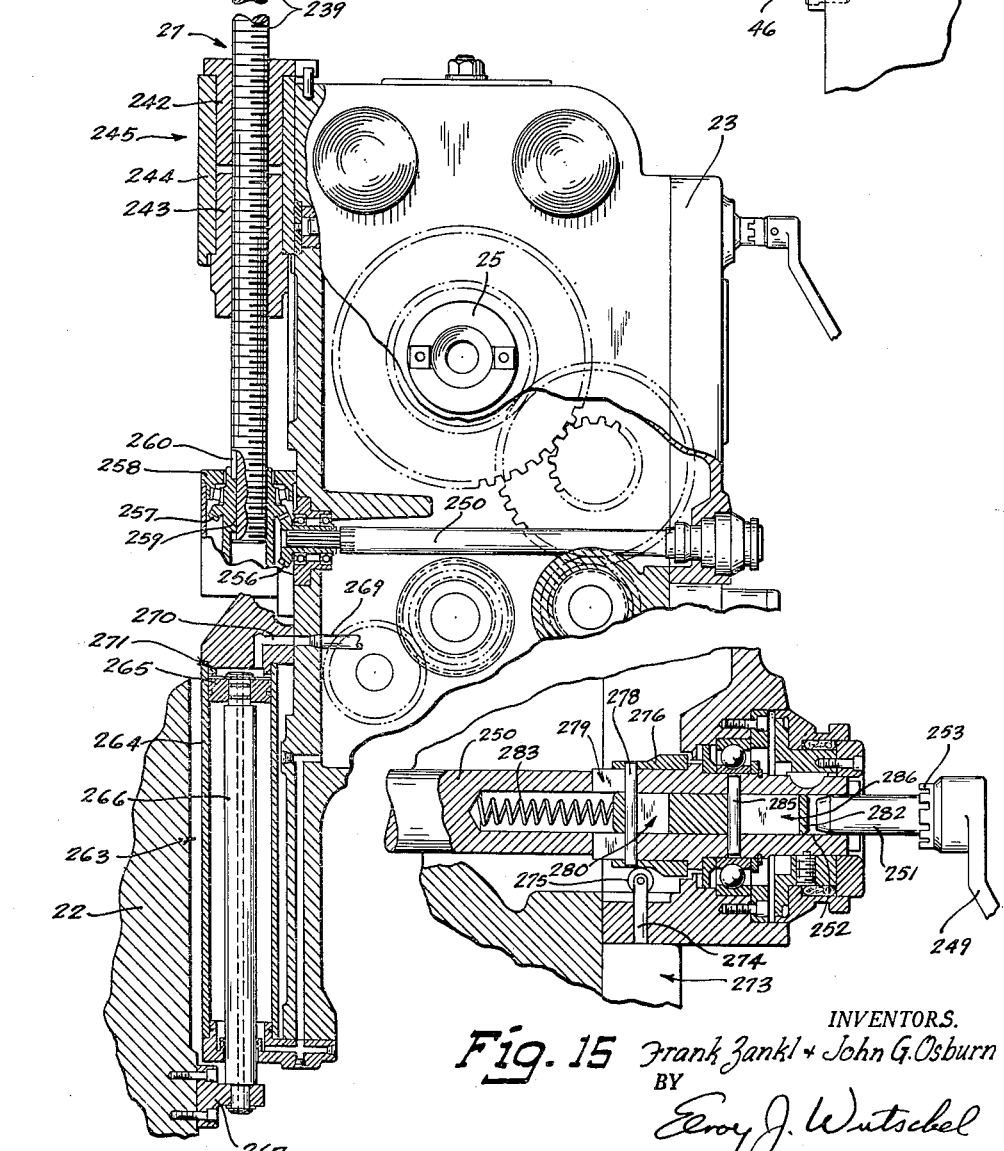

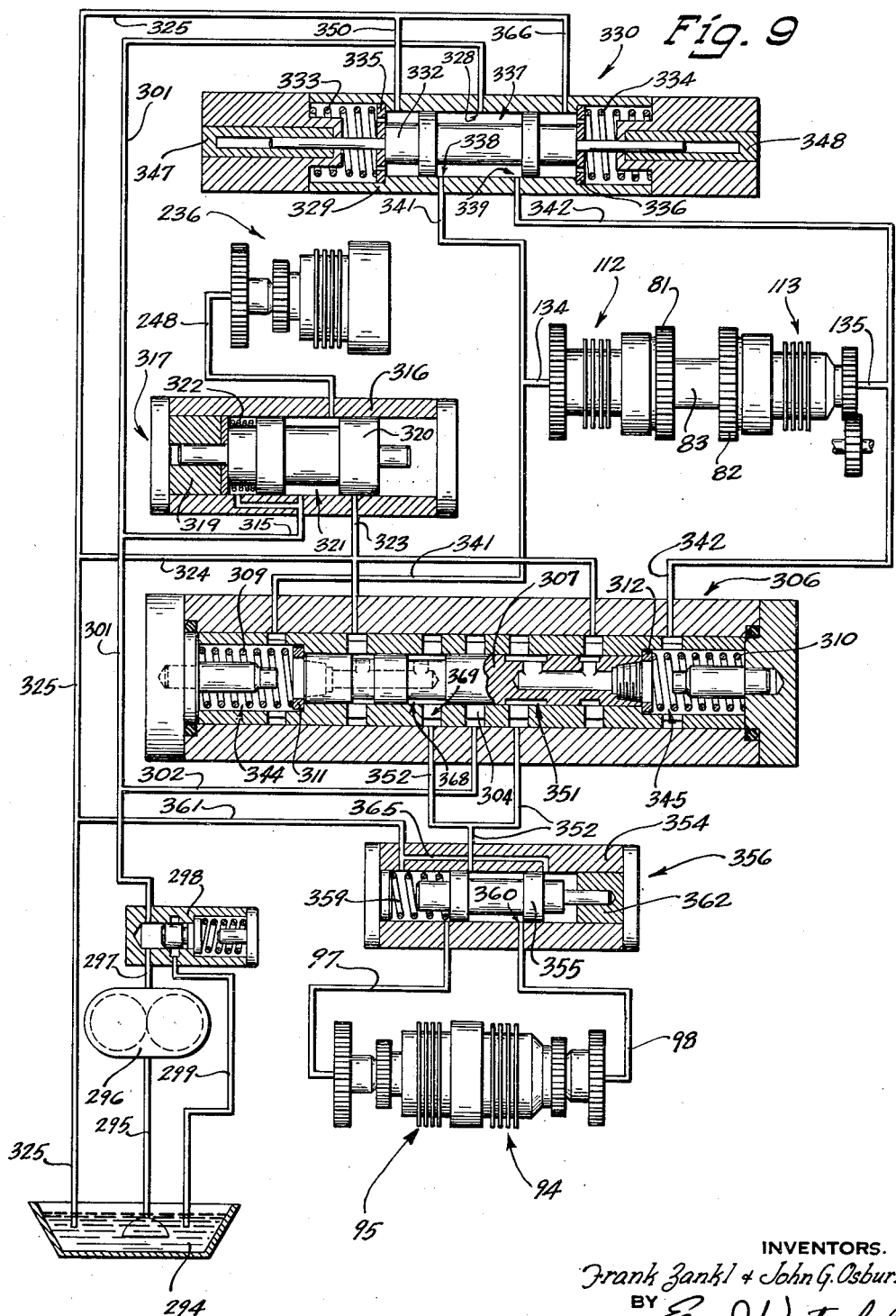

INVENTORS.
Frank Zankl & John G. Osburn
BY
Elroy J. Wutschel
Attorney

INVENTORS.
Frank Zankl & John G. Osburn.

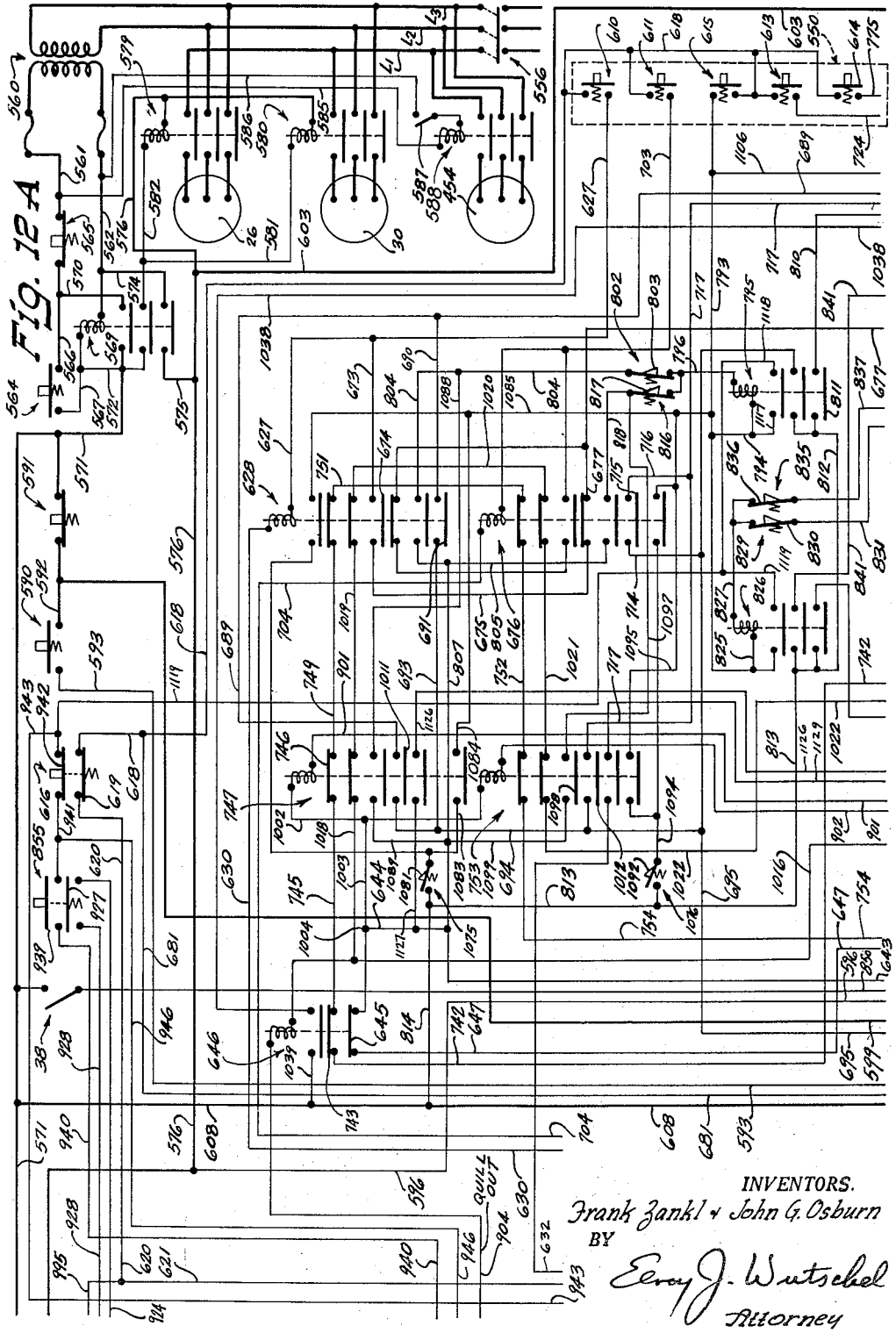

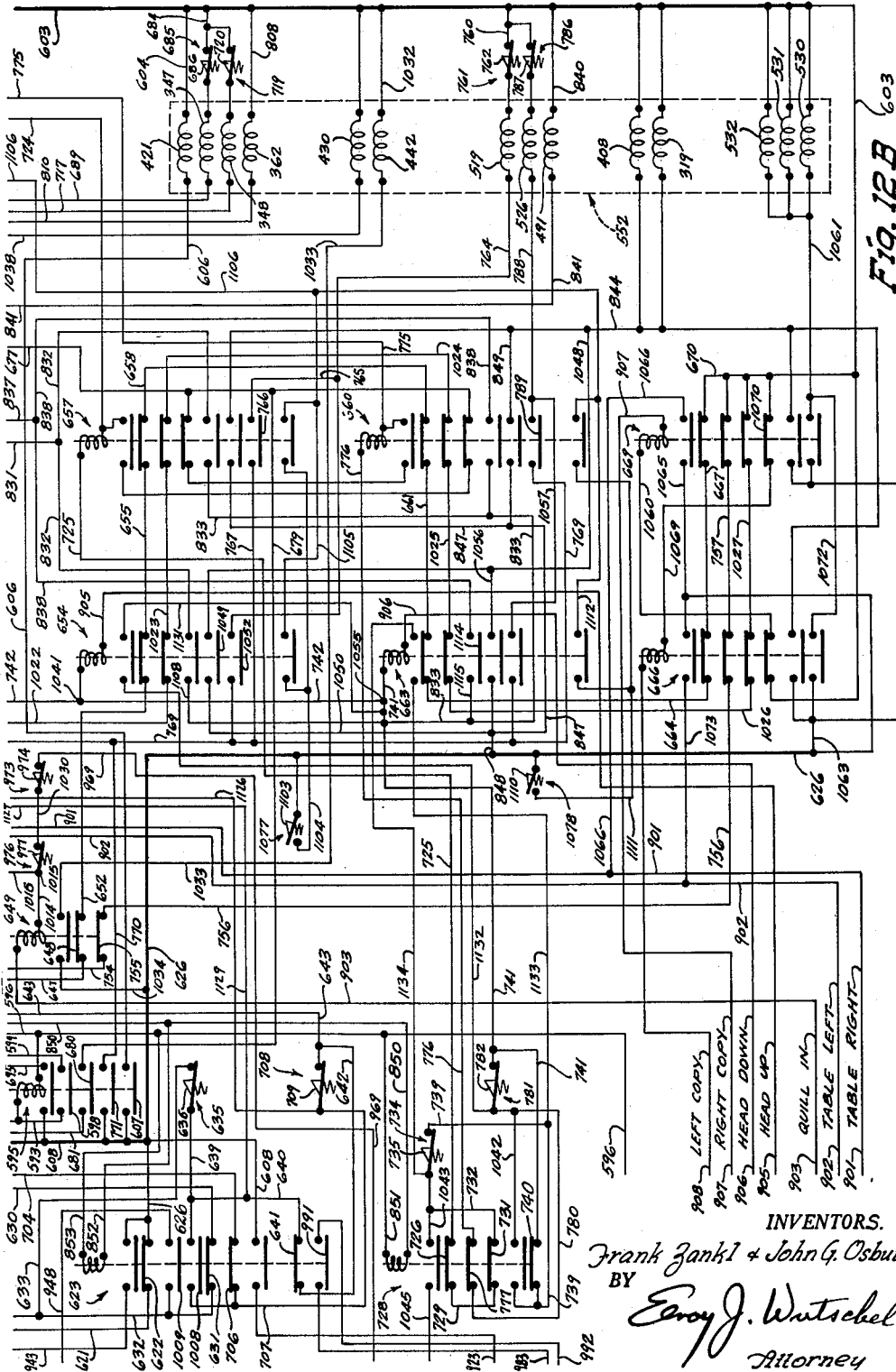

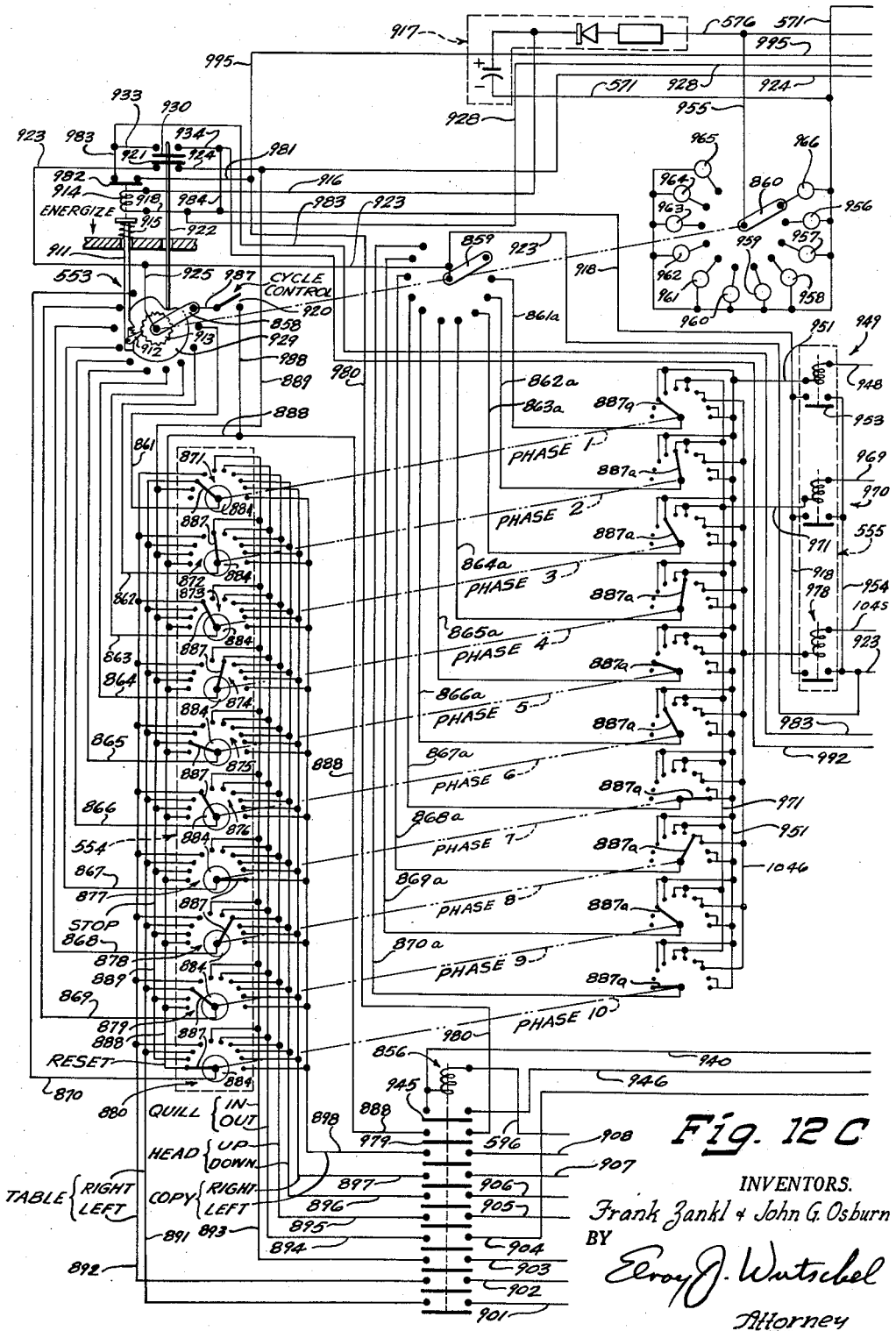

3,016,804
PROGRAM CONTROL SYSTEM
Frank Zankl and John G. Osburn, Milwaukee, Wis., assignors to Kearney & Trecker Corporation, West Allis, Wis., a corporation of Wisconsin
Filed Sept. 4, 1956, Ser. No. 607,948
17 Claims. (Cl. 90—15)

This invention relates to control systems and, more particularly, to a program control system for controlling a plurality of machine tool functions in any predetermined sequence.

A general object of the invention is to provide an improved program control system for a machine tool.

Another object of the invention is to provide an improved and greatly simplified electrical control system for selectively controlling in any predetermined sequence, the movement of three or more machine elements that are respectively carried for movement in different planes.

Another object is to provide an electrical control system that is operative to stop movement of a rectilinearly moving member, and that is arranged to initiate continued movement of the same member in the same direction.

Another object of the invention is to provide an improved control system for selectively controlling the power driven movable elements of a machine tool.

Another object of the invention is to provide a machine tool having a plurality of power driven elements, a selective manual control system for causing the members to move, in combination with a selectively automatically operable programming control system to cause the members to move in any predetermined sequence independently of the manual control system.

Another object of the invention is to provide an improved milling machine particularly suited for either manual or automatic sequence control of power driven machine movements.

Another object is to provide an improved presettable programming control system for a milling machine.

Another object is to provide an improved milling machine having a horizontally movable work support in combination with a vertically movable spindle head that is provided with a copy control system.

Another object of the invention is to provide an improved hydraulically operated counterweight that is selectively connectable to counterweight the vertically movable spindle head of a machine tool.

Another object of the invention is to provide an electrical control system that is operative to facilitate the performing of split milling operations.

Another object of the invention is to provide an improved system for selectively and indexably advancing an indexable sequence controller that is operatively connected to cause a machine tool to perform a plurality of functions in any predetermined sequence.

A further object is to provide a system for effecting an automatic step-by-step operation of a plurality of movably power driven machine tool members.

A further object is to provide an improved tracer control system for a machine tool.

A further object is to provide an improved control system for effecting selective vertical movement of a tool spindle in coordinated relationship with a longitudinally movable work support.

A further object is to provide an improved control system for advancing the pattern engaging element of a tracer controlled machine tool into pattern engaging relationship.

A still further object is to provide an improved programming control system for controlling a plurality of machine functions in any selected sequence and one of which is a copy control function.

A still further object of the invention is to provide a machine tool incorporating improved means for coordinately controlling a copy movement function with other rectilinear movement functions.

According to this invention, thre is provided an improved programming control system for a milling machine adapted to perform a plurality of different machine movements or functions. The arrangement is such that any number of functions or movements within the range of machine operation can be performed in any preselected sequence. The arrival of any machine element at a predetermined, selected position operates both to terminate the movement then being performed as well as to initiate the next succeeding movement. A repeat cycle control is provided to effect either single cycle or repetitive cycle operation. Although a complete series of machine functions is automatically and sequentially controlled during single cycle operation, it is necessary to restart each succeeding single cycle by manual switching means. During repetitive cycle control, however, the operation is continuous in that the last function of any cycle operates to initiate the first function of the next cycle. In addition to the sequential operation effected by the program control system, separate push button switches are provided to effect selective movement of the machine elements.

The complete control system is incorporated in a milling machine of the bed type that is provided with three principal members carried for rectilinear movement; including a horizontally reciprocable worktable, a vertically movable spindle head, and a spindle quill slidably carried in the spindle head for horizontal movement transversely to the worktable. Separate power driven transmission means are selectively connectable, by means of solenoid controlled hydraulic valves, to effect movement of the worktable, spindle head and spindle quill. A tool spindle rotatably journalled in the quill is likewise connected to be selectively power driven. The power driven transmission for effecting vertical movement of the spindle head is connectable to be operated in coordinated relationship with the horizontally movable worktable by means of a copy control system. To accomplish this, a stylus carried by the vertically movable spindle head is adapted to engage a template carried by the horizontally movable worktable. The stylus is connected to actuate a hydraulic valve to control the vertical transmission for effecting the required vertical movement of the spindle head in accordance with the configuration of the guiding pattern.

The electrical control system is coordinately operative to control movement of the machine members for independent push button control, for single cycle program control, or for repetitive cycle program control. The copy control system is selectively operative to effect automatically controlled vertical movement of the spindle head in either condition of operation, i.e., push button control or program control. Appropriate selector switches are interconnected in the control circuit, and are selectively operative to condition the machine for the required mode of operation.

The program control system comprises essentially a stepping-type switch mechanism, a bank of function selector switches, circuits for actuating movement of the selected members, function change switches, and cooperating function change dogs. With the machine conditioned for program control, the function selector switches are operatively adjusted to determine the sequence of functions to be performed in each cycle of operation. Separate stationary tripping posts, respectively carrying function change switches, are operatively associated with movably positionable function change dogs carried by the worktable and the spindle head. The function change dogs are respectively positionable to control the extent of the machine movements of functions, the sequence of which are determined by the function selector switches. After the function selector switches and function change dogs have been coordinately positioned in accordance with the requirements of a particular cycle, the machine is ready for program controlled operation.

For illustrative purposes, it will be assumed the selected machine program includes only four movements; for example, table left, head up, table right and head down, corresponding to the setting for the first four of the function selector switches, respectively. The remainder of the selector switches would then be positioned to reset, thereby causing the wiper arms to successively advance through the intermediate phases until again reaching the "home position" which, in single cycle operation would act as a stop position at the completion of one cycle. Having conditioned the machine for operation, a traverse start button is depressed to start the program cycle, by energizing the stepping switch in a manner that the wiper arms thereof are moved from their "home" position into engagement with the first contact. A circuit is then completed through the first function selector switch and the preselected control circuit to cause the table to move in a leftward direction. At the same time, another circuit is completed through the first function selector switch, and a function change switch to complete a holding circuit and thereby energize a coil associated with the stepping switch to condition it for resiliently biased stepping movement to its next position. Upon arrival of the worktable at its selected position of leftward movement, a function change dog carried thereby actuates the proper function change switch to interrupt the holding circuit to the stepping switch coil. Thereupon, the wiper arms of the stepping switch are resiliently biased to their next position to simultaneously terminate one function and initiate the next (in this case "table left" and "head up" respectively). Advancement of the switch wiper arm to its next position interconnects the second function selector switch and an associated control circuit to effect upward movement of the spindle head. At the same time, a holding circuit is likewise completed through the second selector switch, and a function change switch associated with the spindle head to the stepping switch coil, again conditioning it for resiliently biased stepping movement. After the spindle head is moved upwardly the required amount, a dog carried thereby actuates the associated function change switch to again deenergize the stepping switch coil, permitting resiliently biased movement of the stepping switch to its next position. Advancement of the stepping switch to its next position effects an interconnection with the third function selector switch to complete two circuits as hereinbefore explained, one a control circuit for effecting rightward table movement and the other to energize the stepping switch coil. As an incident to this movement, it is apparent that the stepping switch has disconnected the second function selector switch from the circuit to stop upward movement of the spindle head.

In a similar manner, rightward table movement operates, at a predetermined point to simultaneously terminate table movement and initiate downward movement of the spindle head. Downward movement of the spindle head is predeterminately stopped, in a manner that the spindle head is returned to its original position for starting the next cycle. Stopping of the spindle head in its downward path of travel is effected by indexable advancement of the stepping switch to its "reset position," as determined by the setting of the remainder of the function selector switches. Thus, the stepping switch is indexably advanced through the remainder of its stepped positions until reaching the "home" position.

The foregoing and other objects of the invention, which will become more fully apparent from the following description, may be achieved by means of the particular structure constituting an exemplifying embodiment of the invention that is shown in and described in connection with the following drawings, in which:

FIGURE 1 is a view in front elevation of a milling machine of the bed type embodying the features of this invention;

FIG. 2 is a fragmentary plan view of the machine shown in FIG. 1;

FIG. 3 is an enlarged fragmentary view in front elevation of a portion of the machine bed and table tripping post together with the worktable and cooperating function change dogs;

FIG. 4 is an enlarged fragmentary plan view of adjacent portions of the spindle head and upright, showing the spindle head tripping post;

FIG. 5 is an enlarged detailed view, partly in front elevation of the worktable, and partly in longitudinal vertical section through the associated feed and rapid traverse table driving mechanism;

FIG. 6 is a view in transverse vertical section through the spindle head, and showing the spindle driving transmission mechanism;

FIG. 7 is a view in transverse vertical section through the spindle head and a portion of the upright illustrating the spindle head counterweight and elevating mechanism;

FIG. 8 is an enlarged fragmentary view in side elevation of portions of the copying mechanism and worktable together with the pattern support;

FIG. 9 is a schematic representation of a hydraulic circuit for controlling movement of the worktable and spindle head drive clutch;

Figure 10:
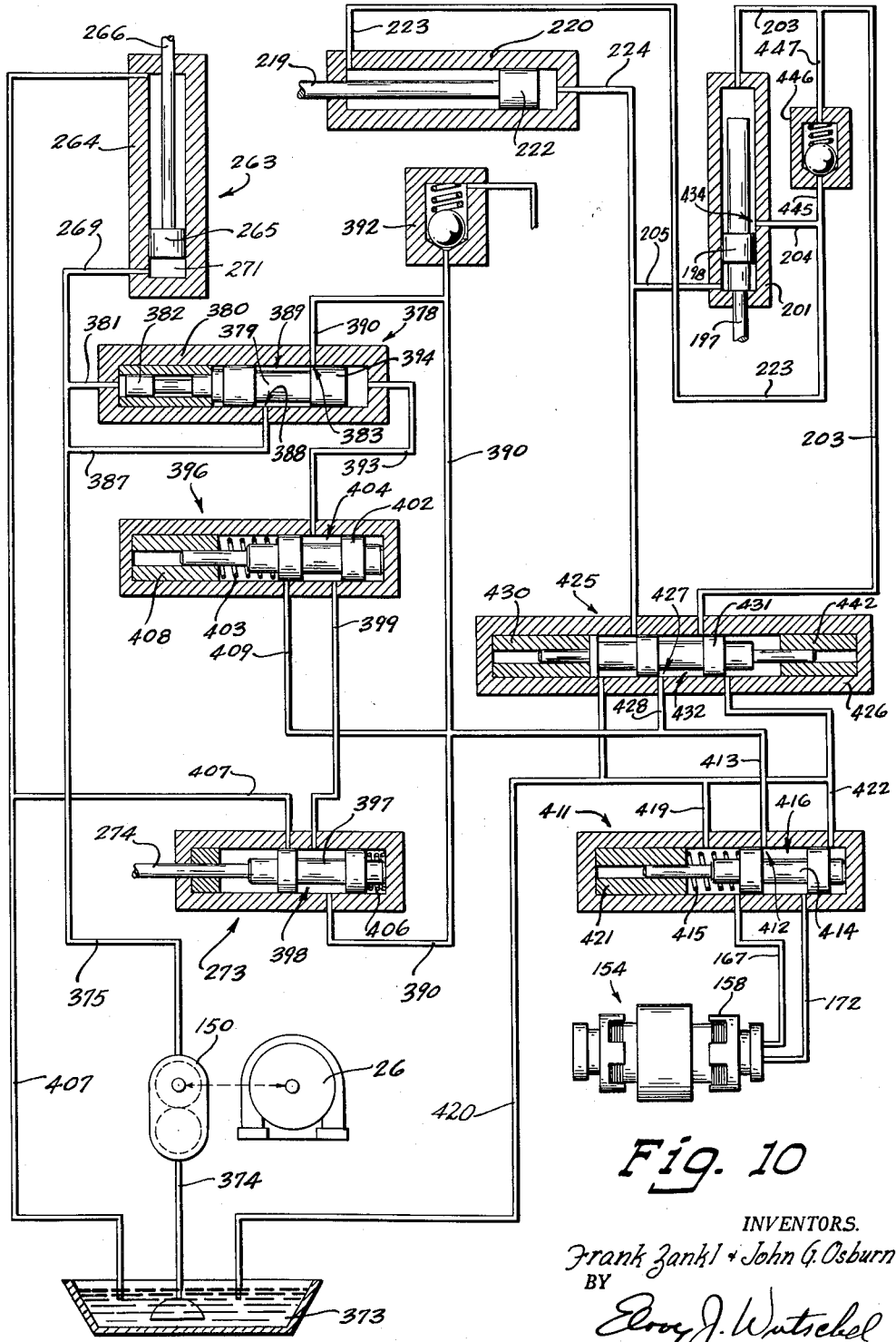
FIG. 10 is a schematic hydraulic circuit diagram for controlling the spindle drive mechanism, the spindle head counterweight mechanism, as well as the quill moving and clamping mechanisms.

FIGS. 12A, 12B, and 12C comprise a diagrammatic representation of an electrical control system for effecting either push button, or programmed control operation of a plurality of movable machine elements or functions;

FIG. 13 is an enlarged fragmentary view, partly in elevation and partly in transverse vertical section, of the quill clamping mechanism taken generally along the lines 13—13 in FIG. 6;

FIG. 14 is a detailed fragmentary view, partly in elevation and partly in vertical section, of the quill clamping mechanism taken along the lines 14—14 of FIG. 12;

FIG. 15 is an enlarged fragmentary, detailed view, partly in elevation and partly in transverse horizontal section, through the outer end of the manual control shaft for moving the spindle head, and taken generally along the lines 15—15 in FIG. 7;

FIG. 16 is an enlarged view in elevation of a control knob and pointer for one of the function selector switches, together with suitable legends indicating the respective machine movements or functions; and;

FIG. 17 is an enlarged fragmentary view in front elevation of the stepping switch.

Referring more particularly to the drawings, the machine tool there shown as incorporating a preferred embodiment of the present invention is a horizontal spindle milling machine of the bed type. As shown in FIGS. 1 and 2, the machine comprises essentially a hollow supporting base or bed 21, having secured to one side thereof a vertically upstanding column or upright 22, which in turn is disposed to movably support a vertically adjustable spindle head 23. A rotatable tool spindle 25 journalled in the spindle head 23 is connectable to be driven by the main drive spindle motor 26 secured to the underside of the spindle head. The spindle head 23, together with the associated driving mechanism for the tool spindle 25, is connected to be vertically moved along the upright 22 by means of an elevating mechanism 27, shown in FIG. 7.

The outer tool carrying end of the spindle 25 is disposed to overlie a worktable 29 that is slidably mounted for reciprocable movement upon the upper surface of the supporting bed 21. For guiding the worktable 29 during reciprocable movement, there are provided suitable way surfaces (not shown) on the bed 21. For driving the worktable 29 at either a feed or rapid traverse rate, a feed motor 30 secured to a side face of the upright 22 is connected to supply input power to a variable feed mechanism 31 mounted within the bed 21. The feed drive mechanism 31 is connected to supply power for moving the worktable 29 relative to a cutter (not shown) carried by the tool spindle 25.

Before proceeding with a detailed description of the power drives to the tool spindle 25, the spindle head 23, and the worktable 29, it should be mentioned that vertical movement of the spindle head 23 and reciprocable movement of the worktable 29 are two of the machine movements under the control of the programming system embodied in this invention. In addition, the programming control system is likewise adapted to selectively control axial movement of the tool spindle 25 as well as a copy control mechanism 33, FIG. 1, which is connected to effect automatically controlled vertical movement of the spindle head 23 in coordinated relationship with the longitudinal movement of the worktable 29. As will hereinafter be more fully explained, the tool spindle 25 is journalled to rotate directly within a spindle quill 34, FIGS. 1 and 6, that is slidably mounted within the spindle head 23 for axial movement. Likewise the copy control mechanism 33, FIG. 1, is provided with a vertically movable stylus 35 that engages the irregular contour of a pattern, such as the pattern 36, secured directly to the rearward edge of the worktable 29 for longitudinal movement therewith by means of a pattern support 46. Whenever the machine is connected to operate in response to the copy control mechanism 33, therefore, movement of the pattern 36 will so actuate the stylus 35 as to effect the required vertical movement of the spindle head 23.

The programming control system is operable to effect the required machine movements in any predetermined sequence, i.e. head up or down, quill in or out, table left or right, and copy control in coordinated relationship with worktable movement.

In addition to the movement of machine members under programmed control, certain machine movements may be independently effected by push button control. Thus, when the machine has not first been conditioned for program control, separate push buttons are connected to effect power driven movement of the worktable 29 at feed or rapid traverse rates, as well as effecting either upward or downward movement of the spindle head 23. To condition the machine for the required mode of operation, there is provided a main selector switch 38 that is interconnected in the control circuit, as shown in FIG. 12A. With the switch 38 in open position, the various machine movements are obtainable only in response to manually actuated push button operation. With the main selector switch 38 in closed position, the four principle machine movements hereinbefore enumerated are obtainable in any predetermined sequence by means of the programming control system.

When connected for programmed control operation, the desired sequence of machine movements can be effected either in single cycle operation or in repeat cycle operation. In single cycle operation, it is necessary to depress a start push button for initiating programmed control of the first selected member movement, with the subsequent movements being automatically and sequentially effected throughout a single series or cycle of operation. In single cycle operation, therefore, it is necessary to restart programmed control after each cycle or series of machine movements has been effected. In repeat cycle operation, on the other hand, the programmed control of machine movements is continuous, in such manner that the first movement of a subsequent cycle is effected immediately after the termination of the last member movement of a preceding cycle. Whenever the machine has been conditioned to operate in repeat cycle programmed control, the predetermined sequence of machine movements selected during each cycle are repeated continuously until machine operation is stopped by manually depressing a traverse stop push button provided for that purpose.

For predeterminately limiting the extent of worktable movement during programmed control operation, a tripping post 32, FIG. 3, secured to the central portion of the bed 21 is provided with a plurality of axially movable switch actuating plungers disposed to be selectively actuated by one or another of a plurality of dogs removably secured to the front face of the worktable 29. As will hereinafter be more fully explained, the adjustable dogs carried by the worktable 29 are effective to actuate a selective one of the switch plungers carried by the tripping post 32 to stop worktable movement, to change the rate of worktable movement, or to stop worktable movement and simultaneously therewith initiate a subsequent machine movement or function. The subsequent machine movement, for example, might be vertical movement of the spindle head 23 in either direction.

As shown in FIGS. 2 and 4, a tripping post 37 extending rearwardly from the upright 22 is provided with a plurality of switch actuating plungers that are disposed to be selectively actuated by one or another of a plurality of dogs carried by the vertically movable spindle head 23. The coaction between the adjustably positioned dogs carried by the spindle head 23 and a selected one of the switches carried by the tripping post 37 is disposed to terminate movement of the spindle head 23, change the rate of movement of the spindle head 23, or both terminate movement of the spindle head 23 and initiate a subsequent machine movement or function. It will therefore be apparent that the termination of a preceding machine movement, i.e. either the head 23 or the worktable 29, will operate to initiate a subsequent or next succeeding machine movement or function.

It will be noted that the phrases "machine function" and "machine movement" are used interchangeably. This is due to the fact, that a control function can be changed without immediately interfering or changing a machine movement. For example, assume that the spindle head 23 is being fed downwardly at a constant feed rate during one phase of programmed control operation. Due to the coaction between a selected switch plunger carried by the tripping post 37 and the dogs carried by the head 23, the control function may be changed in a manner that the copy control mechanism 33 takes over automatic control of the spindle head 23. Although such a function control change might occur as the spindle head 23 is moved downwardly at uniform rate, the movement of the spindle head 23 would not immediately change, but would continue until the axially movable stylus 35 constituting the control element of the copy control mechanism 33 engages the irregular contour of a pattern such as the pattern 36. As as soon as this occurred, downward movement of the spindle head 23 would stop. With the worktable being moved, the spindle head 23 would then be moved either upwardly or downwardly in response to the coaction between the stylus 35 and the pattern 36, depending upon the particular configuration of the pattern.

Power for driving the worktable 29 is transmitted from the feed motor 30 that is provided with a motor shaft 39 extending inwardly into the hollow bed 21 through a suitable opening formed in the rear wall thereof. A main drive pulley 40 secured to the motor shaft 39 is connected by means of a belt 41 to rotate a driven pulley 42 journalled within the bed and that is connected to rotate a bevel gear 43. The bevel gear 43 meshingly engages a cooperating driven bevel gear 44 secured to a horizontal shaft 45 journalled within the bed.

As shown in FIG. 5, power is transmitted from a gear 47 secured to the opposite end of the shaft 45 to drive a cooperating driven gear 48. The gear 48 is secured to one end of a drive shaft 50 that extends through and is rotatably journalled in a feed and rapid traverse driving mechanism 31, as shown in FIGS. 1 and 5. At the opposite end of the drive shaft 50, there is secured a gear 51 having meshing engagement with a complementary gear 52 carried by an input power shaft 53 journalled in and connected to supply input driving power to a feed change transmission mechanism 55. The feed change transmission mechanism may be of any well known type, such as the pick-off gear or shiftable gear type. Power for driving the worktable 29 at selected feeding rate is transmitted from the transmission mechanism 55 by means of a rotatable output shaft 58 having secured thereto a gear 59 meshing with a complementary gear 60 journalled to rotate about a stub extension 61 secured to the housing 62 for the feed and rapid traverse drive mechanism 31. The gear 60 engages a complementary gear 64 provided with an elongated inwardly extending hub 65 that is carried for rotation about the main feed and rapid traverse drive shaft 50. A gear 67 secured directly to the drive shaft 50 constitutes a source of rapid traverse driving power within the feed and rapid traverse drive mechanism 31, while the independently rotatable feed drive gear 66 constitutes a source of selectively variable feed driving power. Power is transmitted from one or the other of the gears 66 and 67 for driving the worktable 29 in the desired direction and at the required feed or rapid traverse rate of travel.

For effecting longitudinal movement of the worktable 29 in response to power from the feed gear 66 or the rapid traverse gear 67, there is provided a non-rotatable feed screw 69 that is fixedly secured against rotation at its opposite ends within a pair of depending end brackets 70 and 71 secured to the opposite ends of the table 29, FIGS. 1 and 5. Along its central portion, the feed screw 69 is disposed to be threadedly engaged by a pair of cooperating, slightly spaced apart feed nuts 72 and 73, that are rotatably journalled within an upwardly extending portion of the housing 62 and a cooperating cap member 74. The feed drive nuts 72 and 73 are urged toward each other by means of lash-removal mechanism 75 that is operative to retain that portion of the feed screw between the cooperating threads of the feed nuts under compression to eliminate any backlash therebetween. For driving the nut elements 72 and 73 in synchronism, a pair of gears 78 and 79 respectively secured thereto are in turn engaged by a pair of gear elements 81 and 82 joined together by a common hub to constitute the main drive gear 83. Thus, irrespective of the rate or direction of rotation of the drive gear 83, the feed nut elements 72 and 73 are retained in constant positions of angularity relative to each other to effect translatory movement of the feed screw 69 therethrough.

The common drive gear 83 is keyed to the central portion of a rotatable reversing shaft 88 that is journalled at its opposite ends in the side walls of the housing 62 for the feed and rapid traverse drive mechanism 31. To rotate the common drive gear 83 in a selected direction and rate of movement, the directional shaft 88 is connected to receive power from either the feed drive gear 66 or the rapid traverse drive gear 67.

To this end, the feed drive gear 66 is disposed to drive a gear 86 integrally formed with a clutch housing 87, and is journalled to rotate about a rate change shaft 89, that in turn is journalled to rotate in the opposite side walls of the housing 62. In a like manner, the rapid traverse drive gear 67 is disposed to engage a complementary gear 90 integrally formed with a clutch housing 91 journalled to rotate toward the leftward end of the rate change shaft 89. Intermediately disposed between the clutch housings 87 and 91, there is provided an axially movable common clutch spool that is resiliently maintained in a central neutral position therebetween by means of mechanism (not shown). The clutch spool 93 is hydraulically movable in a rightward direction to compress the clutch plates of a feed clutch 94 for connecting the gear 86 to drive the rate change shaft 89 at a feed rate.

In a similar manner, the clutch spool 93 is movable from its central position in a leftward direction to compress the clutch plates of a rapid traverse clutch 95 for transmitting power from the gear 90 to drive the rate change shaft 89 at a fast or rapid traverse rate. As will hereinafter be more fully described in connection with FIG. 9, there is provided a hydraulic control system that is operative to effect the required axial movement of the clutch spool 93 to engage a selected one of the rate change clutches 94 and 95 for rotating the rate change shaft 89 at either feed or rapid traverse rates. The hydraulic control system includes a pair of hydraulic supply lines 97 and 98, FIG. 5, that are respectively connected to supply hydraulic fluid under pressure to drilled lines 99 and 100 formed in the opposite central portions of the rate change shaft 89. Admission of hydraulic fluid under pressure through supply line 98 to drilled line 100 operates to effect rightward movement of the clutch spool 93 for effecting rotation of the rate change shaft at feed rate. Admission of hydraulic fluid under pressure through the supply line 97 to the drilled line 99 operates to effect leftward movement of the clutch spool 93 for driving the rate change shaft 89 at a rapid traverse rate.

At the rightward end of the rate change shaft 89, there is keyed a gear 103 engaging an idler gear 104 journalled to rotate in the feed change mechanism 31, and that in turn is disposed to drive a reversing gear 105 journalled to rotate about the rightward end of the directional shaft 88. The reversing gear 105 is integrally formed with a clutch housing 106 and is connected to be rotated about the directional shaft 88 whenever the rate change shaft 89 is being driven at the desired rate of speed. At the opposite end of the rate change shaft 89, there is keyed a gear 108 engaging a gear 109 formed with a clutch housing 110 that is journalled to rotate about the leftward end of the directional shaft 88. By means of this arrangement, the reversing gears 105 and 109 are positively connected to be driven in opposite directions of rotation, whenever the rate change shaft 89 is being rotated. The reversibly rotatable gears 109 and 105 are selectively connectable to drive the directional shaft in the required direction by means of a pair of multiple disk directional or reversing clutches 112 and 113 respectively interposed therebetween. The common drive gear 83 is secured to the central portion of the shaft 88 by means of a key 114 that is likewise disposed to retain tubular clutch support elements 115 and 116 in engagement with the shaft at the opposite ends of the gear. Stationary tubular pistons 118 and 119 are respectively secured to the peripheries of the tubular support members 115 and 116. Inasmuch as both of the directional clutches are hydraulically actuated, appropriate oil seals are provided wherever they are required in the usual manner. In addition to the tubular support 116 and stationary piston 119, the directional clutch 113 comprises an actuating element 120, a tubular cylinder member 121, and a rear plate 122, all of which are secured together for axial slidable movement relative to the stationary piston 119. Hydraulically actuated rightward movement of the tubular member 120 operates to compress a plurality of clutch plates 124 for effecting an operative driving connection between the clutch housing 106 and the directional shaft 88. A plurality of circumferentially spaced springs 125 exert pressure between the tubular cylinder 119 and rear plate 122 to urge the actuating member 120 to its leftward disengaged position.

In a like manner, the tubular support member 115 and stationary piston 118 of the clutch 112 are disposed to slidably support a tubular actuating element 127, a tubular cylinder 128, and an inwardly extending rear plate 129 that are secured for axial slidable movement therealong. Hydraulically actuated leftward movement of the actuating member 127 operates to compress a plurality of clutch plates 130 in a manner to transmit power from the reverse gear 109 to the directional shaft 88. To retain the actuating member 127 in normally rightward disengaged position, a plurality of circumferentially spaced compression springs 131 are interposed between the rightward face of the stationary piston 118 and the circular cover plate 129.

Although the directional clutches 112 and 113 are shown and described as being resiliently biased to a disengaged position, this condition occurs only prior to energizing the machine and activating the hydraulic control system as will hereinafter be more fully described. In a normal operating condition, after the hydraulic control system has been activated, both of the directional clutches 112 and 113 are simultaneously urged to their engaged positions in opposition to the biasing springs 131 and 125. With both of the clutches 112 and 113 engaged, it will be apparent that the directional shaft 88, the common driving pinion 83, and the worktable 29 will be locked against movement in either direction. At the same time, with the hydraulic system activated to engage both the clutches 112 and 113, both the feed drive clutch 94 and the rapid traverse drive clutch 95 are retained in disengaged position. Before moving the common clutch spool 93 axially in either direction to effect engagement of the clutch 94 or 95, it is necessary that one or the other of the directional clutches 112 or 113 be disengaged. The hydraulic system is so arranged that disengagement of either directional clutch 112 or 113 is accompanied by a concomitant engagement of one of the rate change clutches to effect rotation of the common driving pinion 83 for moving the worktable 29 in a selected direction and rate of travel.

To supply hydraulic fluid for engaging the directional clutches 112 and 113, a pair of hydraulic supply lines 134 and 135 are respectively connected to transmit fluid under pressure from the hydraulic control system to a pair of drilled lines 136 and 137 extending inwardly within the directional shaft 88. The drilled line 136 is connected to supply fluid under pressure for effecting engagement of the directional clutch 112, while the drilled line 137 is connected to supply fluid under pressure for effecting engagement of the clutch 113. In actual operation, and with the hydraulic control circuit activated, fluid under pressure will be simultaneously admitted through both of the drilled lines 136 and 137 to actuate the directional clutches 112 and 113 whenever the worktable 29 is in a neutral non-moving position. At the same time, with the worktable in non-moving position, no hydraulic fluid under pressure will be admitted through the drilled lines 99 and 100 in the rate change shaft 89, and therefore both of the rate change clutches 94 and 95 will be disengaged. It will now be assumed that the machine is to be operated, with the worktable 29 moved in a leftward direction at feed rate. To accomplish this, the hydraulic control circuit is so arranged as to remove pressure from the drilled line 136 thus permitting the directional clutch 112 to be moved to its resiliently biased disengaged position, and, at the same time, retaining the clutch 113 in engagement for transmitting power from the directional shaft 88 for rotating the feed nut elements 72 and 73. Simultaneously therewith, hydraulic fluid under pressure is admitted through the drilled line 100 to effect engagement of the feed drive clutch 94, thus effecting a transfer of driving power from the rate change shaft 89 to rotate the directional shaft 88. The sequential disengagement of one of the other of the clutches 112 or 113 as well as a corresponding engagement of one of the rate change clutches is effected by appropriate interlocking mechanism in the hydraulic control system.

Power for driving the tool spindle 25 at a selected rate of speed, is supplied by the spindle motor 26 bolted directly to the underside of the spindle head 23. As shown in FIG. 6, the spindle motor 26 is provided with a motor shaft 142 having secured thereto a motor pulley 143 connected by means of a drive belt 144 to rotate a drive pulley 145 secured to the outer end of a shaft 146 journalled in the central portion of the spindle head 23. The shaft 146 extends inwardly within the spindle head 23 and has secured to its inner end a drive gear 148 disposed to meshingly engage a driven gear 149. Whenever the spindle motor 26 is energized to rotate, the gear 149 is connected to drive a hydraulic pump 150 for supplying hydraulic fluid under pressure to activate a hydraulic control system within the spindle head, as shown in FIGS. 6 and 10, as will hereinafter be more fully described. The drive shaft 146 likewise has secured to its inner end a clutch housing 153 adapted to operatively engage the outer periphery of a plurality of driving clutch plates associated with a multiple disk feed drive clutch 154. The clutch 154 is provided with a plurality of driven clutch plates secured at their inner periphery to drive a concentrically journalled shaft 155 that is rotatably carried within the spindle head 23 and has secured to its rearwardly extending end a removable pick-off speed change gear 156. For effecting quick stopping of the shaft 155, there is provided a multiple disk spindle brake 158 having one set of clutch plates secured at their outer periphery to a housing 159 that is attached directly to an inner side wall of the spindle head 23. Another set of clutch plates associated with the brake 158 are operatively connected at their inner periphery to the drive shaft 155 in well known manner.

To effect an operative engagement of either the spindle drive clutch 154 or the spindle brake 158, a clutch spool 160 is slidably carried therebetween by means of a stationary piston 161 for axial movement in either direction from a central neutral position. The stationary piston is secured to the shaft 155 by means of a tubular support member. A clutch actuating element 164 and a brake actuating element 165 are secured to the tubular clutch spool 160 for axial movement therewith relative to the stationary piston 161. Normally, the tubular clutch spool 160 together with the actuating elements 164 and 165 are retained in a central neutral position relative to the piston 161 by means of a plurality of circumferentially spaced compression springs (not shown) in a manner that neither the clutch 154 nor the brake 158 are engaged.

To effect leftward movement of the clutch spool 160 for engaging the clutch 154 to rotate the shaft 155, hydraulic fluid under pressure is admitted from a hydraulic supply line 167 to a drilled line formed in a member secured within the spindle head and thence to an internally formed annular collector groove 169. From the collector groove 169, hydraulic fluid under pressure continues through a drilled line 170 formed within the shaft 155 and thence to a chamber between the actuating element 164 and the stationary piston 161. Thus, with hydraulic fluid under pressure in the line 170, the actuating element 164 is moved leftwardly to effect an operative engagement of the spindle drive clutch 154 for effecting rotation of the shaft 155.

In a similar manner, the clutch spool 160 and brake actuating element 165 are axially movable in a rightward direction from their central resiliently biased position for effecting engagement of the spindle brake 158. To accomplish this, hydraulic fluid under pressure is admitted from a supply line 172 connecting to a drilled line 173 that terminates in an annular collector groove 174 encircling the rearward portion of the shaft 155. From the collector groove 174, the flow of hydraulic fluid under pressure continues through a drilled line 175 formed within the shaft 155 and thence to a hydraulic chamber between the actuating element 165 and the stationary piston 161. The flow of hydraulic fluid from the line 175 operates to effect rightward axial movement of the actuating element 165 from its neutral position to effect engagement of the spindle brake 158 for effecting a quick stopping of the tool spindle 25.

As will hereinafter be more fully described in connection with the hydraulic circuit shown schematically in FIG. 10, hydraulic fluid under pressure is supplied to either the supply line 167 or the supply line 172 as soon as the spindle motor 26 is energized to rotate the pressure pump 150. Therefore, either the spindle drive clutch 154 or the spindle brake 158 is engaged as soon as the hydraulic control system is activated. Thus, the tubular clutch spool 160 together with its cooperating actuating elements 164 and 165 are retained in their resiliently biased neutral position only prior to energization of the spindle drive motor 26.

The transmission of spindle driving power continues from the pick-off gear 156 secured to the rearward end of the shaft 155 to a complementary speed pick-off gear 178 removably splined to the rearward end of a shaft 179 journalled within the spindle head 23. The complementary meshing pick-off gears 156 and 178 constitute one set of a plurality of sets (not shown) of speed pick-off gears that may be removably secured to the splined rearward ends of the shafts 155 and 179 to constitute a variable speed transmission. From the rotatable shaft 179 power is transmitted by means of a gear 181 splined thereto and having meshing engagement with a complementary high speed gear 182 integrally formed with a low speed gear 183 to constitute an axially shiftable range change couplet 184. The range change couplet is slidably keyed to a shaft journalled within the spindle head 23 for axial shiftable movement in either direction. The couplet 184 can be shifted rightwardly by means of a shifter fork (not shown) in a manner that the gear 182 directly engages a high speed spindle driving gear 187 keyed to the central rearward portion of the tool spindle 25. In a similar manner, the couplet 184 can be shifted leftwardly in a manner that the gear 183 is moved into meshing engagement with a low speed gear 188 keyed directly to the tool spindle 25.

The tool spindle 25 is carried within the quill 34 for a slight rearward axial or "ducking" movement at the conclusion of each cutting stroke. The arrangement is such that the quill 34 is automatically moved to its extreme forward or outer position at the start of each cutting operation. With the quill 34 in its forward or outer position, as shown in FIG. 6, a split clamp ring 190 encircling the forward end of the quill is automatically contracted by means of a clamp rod 191, FIGS. 6 and 13, to immovably clamp the quill against movement during a cutting operation. The worktable 29, FIG. 1, is then caused to move in manner that a workpiece (not shown) mounted thereon is engaged by a cutting tool (not shown) carried by the spindle 25. After the worktable has moved a sufficient distance, and the metal cutting operation is completed, the direction of worktable movement is reversed so that the workpiece is returned to its starting position. To prevent damage to the workpiece during its return path of movement, the quill 34 together with the tool spindle 25 are retracted slightly after the metal cutting operation has been completed and immediately prior to reversal of table movement to its starting position. The retraction or "ducking" movement of the quill 34 may be accomplished automatically and in coordinated relationship with the extent of worktable movement during a particular metal cutting operation. The clamping action of the clamp ring 190 is released immediately prior to the quill 34 being retracted slightly at the conclusion of a particular cutting operation.

To effect the automatic "ducking" movement, as shown in FIG. 6, a rack 193 secured to the quill 34 is engaged by a pinion 194 keyed to a horizontal shaft 195 rotatably journalled in the spindle head 23. Toward the opposite end of the shaft 195, there is keyed another gear 196 that in turn is engaged by an axially movable rack 197. Toward its opposite end, the rack 197 is fixedly secured to a piston 198 that is slidably carried for limited axial movement within a cooperating hydraulic cylinder 201. A hydraulic supply line 203 is connected to supply fluid under pressure to the cylinder 201 for urging the piston 198 leftwardly to its extreme outer position. Outward movement of the piston 198 effects a corresponding movement of the rack 197 for rotating the gears 196 and 194 in a counterclockwise direction, thus engaging the rack 193 to urge the quill 34 to its outermost position. As soon as this has occurred, the flow of hydraulic fluid from the cylinder 201 continues through a by-pass line 204 which is connected to actuate the clamp ring 190 as will hereinafter be more fully explained in connection with FIGS. 13, 14 and the hydraulic circuit shown schematically in FIG. 10. The return or "ducking" movement of the quill 34 is effected by exhausting the fluid from supply lines 203 and 204, and supplying fluid under pressure through line 205 to effect rightward movement of the piston 198 and a corresponding axial retracting movement of the quill 34.

The mechanism for clamping or unclamping the quill 34 includes the contractible clamping ring 190, FIGS. 6 and 13, which encircles the entire periphery of the quill 34. Toward its lower central portion, the clamp ring 190 is provided with a transversely formed radial slot 208, together with a pair of vertically formed abutment seats 209 and 210. As shown in FIG. 13, a clamp element 212 secured to one end of the clamp rod 191 is disposed to engage the vertical abutment seat 209. Likewise, a tubular clamp element 213 encircling the clamp rod 191 engages the vertically formed abutment 210 on the clamp ring 190 with its inner end. At its opposite end the tubular clamp member 213 is seated against one race of a thrust bearing 214, the opposite race of which is seated against the hub of a bell crank 216 threadedly engaging the outer end of the clamp rod 191. The bell crank 216 is provided with a radially extending arm 217 engaged at its upper end by a vertical slot formed in an axially movable piston rod 219 extending inwardly through a suitable opening provided toward one end of an hydraulic actuating clamp cylinder 220. At its inner end, the rod 219 is secured to a piston 222 carried for axial slidable movement within the cylinder 220.

For contracting the clamp ring 190 into clamping engagement with the quill 34, hydraulic fluid under pressure is admitted through a supply line 223 in a manner to urge the piston 222 rightwardly. Rightward movement of the piston 222 effects corresponding movement of the piston rod 219 for rotating the bell crank 216 in a clockwise direction. As the bell crank 216 is rotated in a clockwise direction, the clamp elements 212 and 213 are urged to move toward each other in a manner to exert clamping pressure upon the vertical abutments 209 and 210 of the clamp ring 190. To unclamp the quill 34, the pressure fluid is exhausted from line 223 and fluid under pressure is admitted through supply line 224 to effect movement of the piston 222 in a leftward direction, as shown in FIG. 14. As a result, the rod 219 is likewise moved leftwardly to rotate the bell crank 216 in a counterclockwise direction and release the clamping pressure upon the abutments 209 and 210, FIG. 13.

Figure 11:
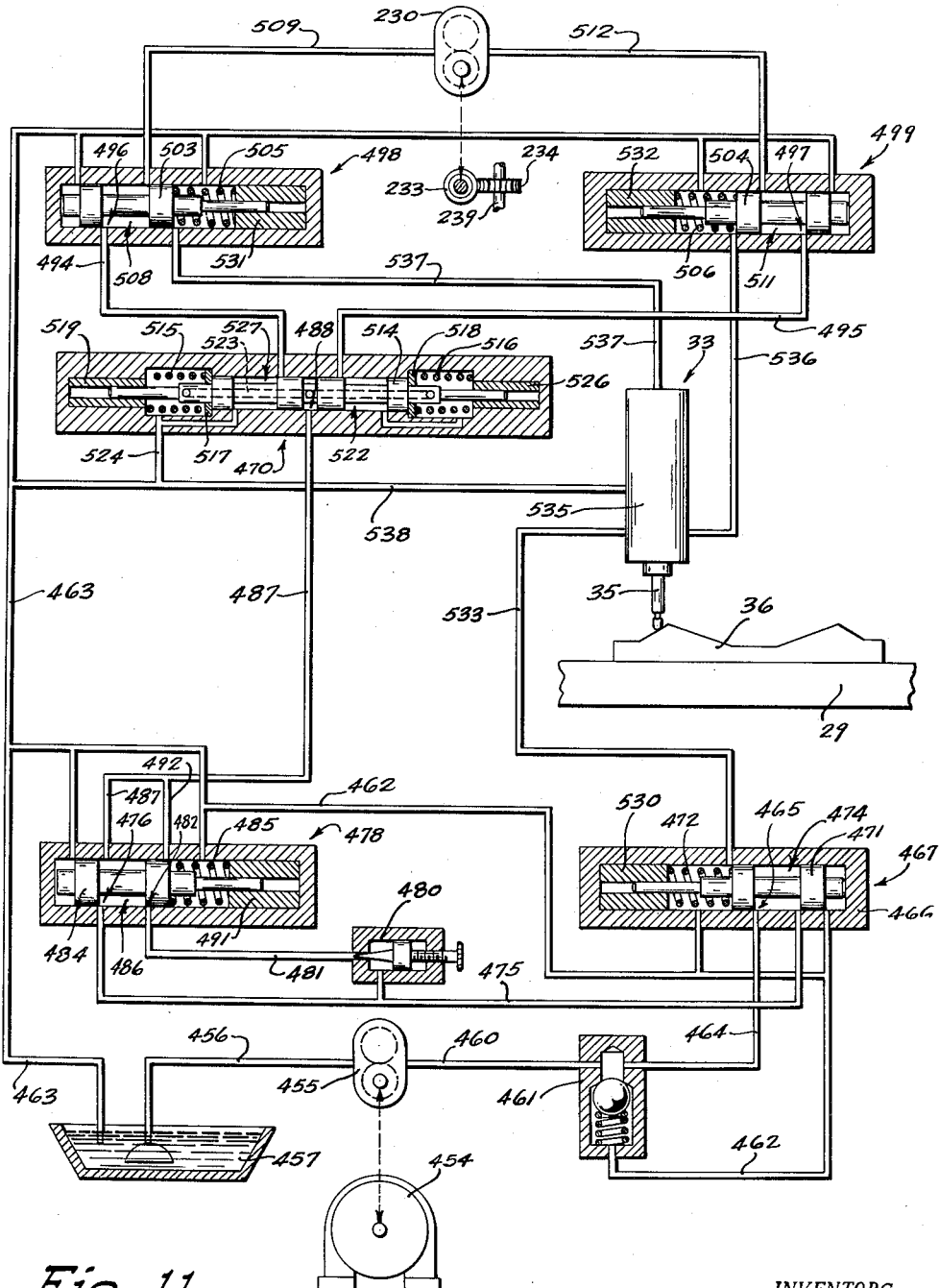
FIG. 11 is a schematic hydraulic circuit diagram that is operative to control selective rotation of the hydraulic motor for elevating the spindle head.

As shown in FIGS. 1, 7 and 11, power for driving the elevating mechanism 27 for effecting vertical movement of the spindle head 23 is derived from a selectively reversible, hydraulic motor 230. The hydraulic motor 230 is carried by a housing 231 that in turn is secured to a portion of the upright 22 overlying the vertically movable spindle head 23. From the hydraulically driven motor 230, power is transmitted to rotate a worm 233 that is operatively engaged to drive a cooperating wormwheel 234 journalled to rotate about a vertical axis within the housing 231. The wormwheel 234 is connected to rotate the driving member of a multiple disk clutch 236 that is operative, when engaged, to rotate a driven clutch member 237. The driven clutch member 237 is secured toward the upper end of a downwardly depending elevating screw 239 that is journalled toward its upper end in a pair of spaced bearings 240 and 241 supported within the outwardly projecting portion of the upright 22.

Along its central portion, the elevating screw is disposed to threadedly engage a pair of cooperating elevating nut elements 242 and 243 that are fixedly supported within a tubular carrier 244 secured to the spindle head 23. To preclude the occurrence of backlash, the nut elements 242 and 243 are angularly adjustable relative to each other within the carrier 244, by means of mechanism (not shown) to constitute a single elevating nut 245. For effecting selective engagement of the vertical drive clutch 236, hydraulic fluid under pressure is admitted through a supply line 248 and thence to a clutch actuating mechanism (not shown) in well known manner, and as indicated in FIGS. 7 and 9. Whenever hydraulic fluid under pressure is supplied through the line 248, the vertical drive clutch 236 is moved to engaged position for effecting a transmission of power from the hydraulic motor 230 to rotate the elevating screw 239. With the vertical drive clutch 236 engaged, the hydraulic motor 230 may be actuated to rotate in either direction for effecting either upward or downward movement of the spindle head 23.

For effecting selective manual vertical adjustment of the spindle head 23, a hand crank 249 may be positioned to effect rotation of a rotatable adjusting shaft 250 journalled in the spindle head 23, as shown in FIGS. 7 and 15. The hand crank 249 is provided with a circular pilot 251 adapted to be received within a circular opening formed in the end of the shaft 250, and is likewise provided with clutch teeth 253 adapted to engage complementary clutch teeth formed at the end of the shaft 250. At its inner end, the shaft 250 is provided with a splined connection to a bevel gear 256 having meshing engagement with a complementary bevel gear 257 journalled for rotation about a vertical axis within a bracket 258 secured to the spindle head 23. The bevel gear 257 is provided with a vertical bore extending therethrough and a key 259 disposed to slidably engage a keyway 260 extending longitudinally along the periphery of the elevating screw 239. Thus, rotation of the adjusting shaft 250 effects rotation of the bevel gear 257 for driving the elevating screw 239 to effect the required vertical adjustment of the spindle head 23 along the upright 22.

To facilitate vertical adjustment of the spindle head 23, a hydraulically actuated counterweight mechanism 263 is automatically connected to counterbalance the weight of the spindle head 23 whenever the hydraulic motor 230 is connected to drive the elevating screw 239, or whenever the hand crank 249 is applied to the outer end of the shaft 250 for effecting manual rotation of the screw 239. The hydraulic counterweight 263 comprises essentially an enclosed movable tubular cylinder 264 carried between cooperating brackets secured to the spindle head 23 for axial movement relative to a cooperating stationary piston 265. The piston 265 is secured to the upper end of a stationary piston rod 266 that in turn is secured at its lower projecting end by means of bracket 267 to the upright 22. Whenever the spindle head 23 is moved vertically, either by power or manually, hydraulic fluid under extremely high pressure is admitted through a supply line 269 connected to a drilled line 270 and thence into an enclosed chamber 271 formed within the cylinder 264 and above the piston 265. The introduction of hydraulic fluid under extremely high pressure within the expansible chamber 271 exerts downward pressure against the stationary piston 265 in a manner to tend to urge the cooperating tubular cylinder 264, as well as the spindle head 23, in an upward direction. Although the pressure within the chamber 271 is insufficient to move the head 23, it is great enough to counterbalance the weight of the spindle head whenever it is moved. Whenever the spindle head 23 is not connected for vertical movement along the supporting upright, the degree of hydraulic pressure through the inlet supply line 270 is reduced considerably.

In order that the counterweight mechanism 263 is activated during manual adjustment of the spindle head 23, a counterweight actuating valve 273 is connected to be operated by insertion of the hand crank pilot 251 within the circular recess 252 at the end of the shaft 250. As shown in FIGS. 15 and 10, the valve 273 is provided with a valve plunger 274 that is normally resiliently urged to an outward position. The plunger 274 is provided with a roller 275 that is adapted to coact with the reduced diameter of a circumferentially formed cam collar 276 slidably carried by the shaft 250 for inward axial movement. For moving the cam collar 276, a pin 278 secured thereto is disposed to extend inwardly through slots 279 formed in the tubular portion of the shaft 250 through a slot 280 formed toward the inner end of an axially movable member 282. The actuating member 282 is slidably carried for axial movement within an extending portion of the circular recess 252 and is normally urged to an extreme outward position, as shown in FIG. 15, by means of a spring 283. To limit axial movement of the actuating plunger 282, there is provided a pin 285 extending through a radial slot 286 formed therein and secured at its opposite ends to the shaft 250. Thus, positioning the hand crank 249 in operative position to rotate the shaft 250, causes the pilot 251 provided on the hand crank to urge the actuating plunger 282 inwardly. Inward movement of the plunger 282 in turn effects movement of the pin 278 and cam collar 276 in a manner to depress the valve actuating plunger 274. Movement of the plunger 274 to its inner position in turn actuates the hydraulic circuit, FIG. 10, in a manner that hydraulic fluid under extreme high pressure is supplied to the chamber 271, FIG. 7, through the inlet supply line 269. As soon as the hand crank 249 is positioned to rotate the shaft 250, therefore, the counterweight mechanism 263 is hydraulically actuated to effectively counterbalance the weight of the spindle head 23 during manual adjustment.

In a similar manner, as will hereinafter be more fully described in connection with FIG. 10, an automatic valve arrangement is provided to actuate the hydraulic counterweight 263 whenever the hydraulic motor 230, FIG. 7, is rotated to effect power driven vertical adjustment of the spindle head 23. The counterweight mechanism 263 is activated irrespective of whether the motor 230 is caused to rotate in response to the push button control system, the copy control system, or the programming control system.

The separate hydraulic control circuits respectively shown in FIGS. 9, 10 and 11 incorporate both solenoid controlled, and manually controlled, valves for hydraulically actuating the various power transmitting clutches and function change mechanism hereinbefore described. Before proceeding with a detailed description of these three hydraulic circuits, however, it may be advantageous to relate in general terms the various machine movements or functions effected by each of them. The hydraulic circuit, illustrated in FIG. 9, is contained within the bed 21 and upright 22 and is operative to effect the required coordinate disengagement of one of the directional clutches 112 or 113, as well as the simultaneous engagement of one or the other of the rate change clutches 94 and 95 to move the worktable 29 in the selected direction at the required feed or rapid traverse rate. In addition to this, the circuit shown in FIG. 9 is operative to effect a selective engagement or disengagement of the vertical drive clutch 236 for effecting a transmission of power from the hydraulic drive motor 230 to effect vertical movement of the spindle head 23. The second hydraulic control circuit, shown in FIG. 10, is located within the spindle head 23, and is provided with a solenoid control valve operative to effect selective engagement of the spindle drive clutch 154 for rotating the tool spindle, or the spindle brake 158 for stopping rotation of the tool spindle. In addition to effecting selective rotation of the tool spindle, the hydraulic control circuit, shown in FIG. 10, is operative to effect movement of the quill actuating piston 198, movement of the quill clamping piston 222, and selective operation of the counterweight mechanism 263 whenever the spindle head is connected to be moved vertically in response to either power or manual means. The third hydraulic control circuit, shown in FIG. 11, is provided with a plurality of solenoid control valves that are selectively actuatable to supply hydraulic fluid under pressure for effecting rotation of the vertical head driving motor 230 in a selected direction and rate of movement. Solenoid control selector valves are likewise included in the circuit, shown in FIG. 11, in a manner that the hydraulic motor 230 may be operated in response to push button control, or under the continuous control of the copy mechanism and movable stylus 35, shown in FIGS. 1 and 11.

Referring more particularly to FIG. 9, hydraulic fluid is withdrawn from a sump 294 located in the machine bed 21 through a supply line 295 by means of a hydraulic pump 296 that is connetced in well known manner to be driven by the main drive feed motor 30 carried within the machine bed 21, FIG. 1. From the pump 296, a flow of hydraulic pressure fluid continues through a line 297 connected to a pressure regulating valve 298 that operates in well known manner to regulate the supply of pressure, and that is provided with a by-pass return line 299. From the pressure regulating valve 298 the flow continues to a main supply line 301 that is connected to a first branch line 302 connecting to an annular groove 304 formed within the central portion of the cylindrical body for an interlock valve 306. With the axially movable valve spool 307 of the valve 306 biased to its central neutral position, as shown in FIG. 9, the flow of pressure fluid does not continue beyond the annular groove 304. The valve spool 307 is normally retained in a central neutral position, as shown, by means of a pair of compression springs 309 and 310 respectively interposed between the opposite ends of the valve body and a pair of axially movable washers 311 and 312. The washers 311 and 312 are simultaneously disposed to abut recessed circular shoulders formed within the valve body, as well as the opposite ends of the valve spool 307. Thus, the valve spool of the interlock valve 306 is movable in either direction from its central neutral position, as will hereinafter be more fully explained, to effect engagement of one of the rate change clutches 94 or 95, after either of the directional clutches 112 or 113 has been disengaged.

A flow of pressure fluid from the main supply line 301 is likewise transmitted through another branch line 315 connected to an inlet port formed within a cylindrical valve body 316 of a head clutch solenoid valve 317. With a solenoidal coil 319 energized, an axially movable valve spool 320 carried within the valve body 316 is urged to its extreme leftward position in a manner that the flow of pressure fluid continues from the line 315, about a cannelure 321 formed in the valve spool 320 and thence through the supply line 248. The flow of hydraulic fluid under pressure from the line 248 operates to effect engagement of the spindle head drive clutch 236 for transmitting power from the hydraulic motor 230 to rotate the elevating screw 239. Upon deenergization of the coil 319, the valve spool 320 is urged rightwardly by means of a spring 322 in a manner that pressure fluid is exhausted from the line 248 about the cannelure 321 and thence to an outlet line 323, a branch exhaust line 324 to a main exhaust line 325 connected to return pressure fluid to the sump 294.

From the main supply line 301, the flow of fluid under pressure continues through an inlet port 328 formed in the central portion of a cylindrical valve body 329 for a table directional valve 330. The directional valve 330 is provided with a valve spool 332 carried for axial movement in either direction from a central neutral position, as shown in FIG. 9. To retain the valve spool 332 in neutral position, a pair of compression springs 333 and 334 seated at their outer ends against inner side faces of the valve body 329, are disposed to abut with their inner ends a pair of axially movable washers 335 and 336 respectively. The movable washers 335 and 336 are in turn adapted to simultaneously abut circular shoulders formed within the valve body 329, as well as the opposite ends of the valve spool 332.

With the valve spool 332 of the table directional valve 330 in its central position, as shown, the flow of pressure continues from the inlet port 328 about a cannelure 337 of the valve spool and thence through a pair of outlet ports 338 and 339 respectively communicating with hydraulic lines 341 and 342. The flow of pressure fluid continues from the lines 341 and 342 through supply lines 134 and 135 to effect simultaneous engagement of the table directional clutches 112 and 113, thereby braking the common drive gear 83 against rotation in either direction. At the same time, the flow of fluid pressure from the opposite ends of the lines 341 and 342 continues into a pair of cylindrical hydraulic chambers 344 and 345 respectively formed within the valve body for the interlock valve 306, at the opposite ends of the axially movable valve spool 307. It will be apparent that removal of hydraulic pressure from one or the other of the chambers 344 and 345, will effect axial movement of the valve spool 307 in the direction of whichever chamber has the reduced pressure, thereby effecting an engagement of either of the rate change clutches 94 or 95.

To effect rotation of the common drive gear 83 for moving the worktable, it is necessary that the valve spool 332 of the table directional valve 330 be moved axially in either direction from its central neutral position. For moving the valve spool 332, the table directional valve 330 is provided toward its opposite ends with a pair of coils 347 and 348. To effect leftward movement of the worktable, the coil 348 is energized, thus effecting rightward movement of the valve spool 332 to retain the hydraulic line 342 in communication with the main supply line 301, thereby retaining the table directional clutch 113 in engagement and supply hydraulic fluid under pressure to the chamber 345 at the rightward end of the interlock valve 306. Simultaneously therewith upon rightward movement of the valve spool 332, the hydraulic fluid is exhausted from the line 341 about a cannelure formed toward the leftward end of the spool 332 and thence through a branch exhaust line 350 connected to the main exhaust line 325. As soon as pressure fluid is exhausted from the line 341, the directional clutch 112 is moved to disengaged position and the clutch 113 is retained in engaged position to transmit power for rotating the table drive gear 83. At the same time, the pressure fluid is exhausted from the chamber 344 of the directional valve 306, permitting the fluid under pressure in the rightward chamber 345 to effect axial movement of the interlock valve spool 307 in a leftward direction. Upon leftward movement of the valve spool 307, fluid under pressure flows from the inlet port 304, through a cannelure 351 and thence to a supply line 352 communicating at its lower end with an inlet port formed in a valve body 354. The valve body 354 is disposed to support an axially slidable valve spool 355 for a rate change valve 356.

With the rate change valve spool 355 resiliently biased in a rightward direction by means of a spring 359, the flow of pressure continues from the line 352 about a cannelure in the valve spool and thence through an outlet port communicating with the supply line 98. As hereinbefore explained, the hydraulic line 98 is disposed to supply fluid under pressure for effecting engagement of a feed drive clutch 94, FIGS. 5 and 9. With the valve spool 355 positioned, as shown in FIG. 9, fluid pressure is exhausted from line 97 through the leftward end of the rate change valve 356 communicating with a branch exhaust line 361 and thence to the main exhaust line 325.

With fluid under pressure being supplied from the line 352, the rate of table movement may be changed from feed to rapid traverse by energizing a coil 362 to effect leftward movement of the rate change valve spool 355. Upon leftward movement of the spool 355, fluid is exhausted from the line 98, through the valve body 354 and a drilled line 365 communicating with the exhaust line 361. At the same time, fluid under pressure from line 352 flows a cannelure formed at the leftward end of the valve spool 355 and thence to the line 97 for effecting engagement of the rapid traverse clutch 95.

In a similar manner, the table directional valve 330 is selectively operable to effect rightward movement of the worktable at either a feed or rapid traverse rate. This is accomplished by deenergizing the coil 348 and energizing the coil 347 to urge the valve spool 332 to its extreme leftward position. Extreme leftward movement of the valve spool 332, connects the line 342 to the exhaust line 366 connecting with the exhaust line 325. Thereupon, the pressure in the chamber 345 of the interlock valve 306 is exhausted and the directional clutch 113 will move to disengaged position. Extreme leftward movement of the valve spool 332 likewise effects a connection of main supply line 301 to hydraulic line 341 for re-engaging the directional clutch 112 and supplying fluid under pressure to the chamber 344 at the leftward end of the interlock valve 306, thereby effecting rightward movement of the valve spool 307. Rightward movement of the interlock spool 307 permits a flow of fluid pressure from the annular groove 304 through a cannelure 368 and thence through an outlet port 369 communicating with the supply line 352 to the rate change valve 356. Depending upon the axial position of the rate change valve spool 355, the flow of hydraulic fluid will continue from the line 352 to either the line 97 or the line 98 for effecting engagement of the rapid traverse clutch 95 or feed drive clutch 94 respectively.

Hydraulic fluid for the control circuit shown in FIG. 10, is derived from a sump 373 contained within the spindle head 23 and is withdrawn therefrom by means of a hydraulic line 374 and the pressure pump 150 driven by the spindle motor 26, FIG. 6. From the pump 150, the flow of fluid under pressure continues through a main supply line 375 and a branch line 269 connected to the counterweight mechanism 263. The branch line 269 is connected to supply fluid under normal operating pressure to a chamber formed within the movable cylinder 264, at one end of the stationary piston 265. With the spindle head 23 in non-moving position on the upright 22, the normal operating fluid pressure supplied through branch line 269 is insufficient to fully counterbalance the weight of the spindle head 23. An increase of fluid pressure through the branch line 269, however, is immediately operative to so actuate the counterweight mechanism 263, constituting in effect a secondary actuating mechanism, that the spindle head is fully counterbalanced.

For automatically increasing the pressure of the fluid in the branch line 269 when the spindle head is to be moved, there is provided a differential pressure regulating valve 378. The pressure regulating valve 378 comprises essentially a valve spool 379 of stepped diameter contained for limited axial sliding movement within a cooperating cylindrical valve body 380. Hydraulic fluid from the main supply line 375 is transmitted through the branch line 381 to a chamber formed within the differential valve body 380 at the small diameter end 382 of the valve spool 379. With the spindle head in non-moving position, the pressure fluid from the line 381 is operative to move the valve spool 379 to its extreme rightward position within the valve body 380, thereby completely opening an outlet port 383. With this condition existing, the flow of pressure fluid continues from the supply line 375, via a branch line 387, an inlet port 388, about a cannelure 389 in the valve spool and thence through the fully opened outlet port 383 to a hydraulic line 390. It will be noted, that the pressure inlet port 388 is in slightly spaced apart relationship to the outlet port 383 which is fully opened to provide for an unrestricted flow of pressure fluid therebetween whenever the valve spool 379 is in its extreme rightward position. The pressure fluid in the line 390 is continuously maintained at a normal, uniform operating pressure by means of a pressure regulating valve 392. As will hereinafter be more fully explained, the pressure line 390 is connectable to operate all of the remaining hydraulically actuatable elements within the control circuit, shown in FIG. 10, and which constitute the primary actuating mechanism. Thus, the pressure fluid from the supply line 390 is operative to actuate all elements with the exception of the counterweight mechanism 263, which derives its operating pressure fluid directly through the branch line 269 connected to the main supply line 375.

Whenever the spindle head 23 is moved vertically, either by power means or manual means, the pressure of the hydraulic fluid in the supply line 375 and branch line 269 is increased greatly, although the fluid in the supply line 390 is still maintained at a lower normal operating pressure by means of the regulating valve 392. To effect this result, hydraulic fluid, under the pressure established by the regulating valve 392, is selectively admitted through a branch line 393 to an inlet port formed in the rightward end of the pressure differential valve body 380. The flow of hydraulic fluid from the line 393 enters a hydraulic chamber of larger diameter adjacent the large diameter end 394 of the valve spool 379. The flow of pressure fluid from the line 393 thereby effects a leftward movement of the valve spool 379 in opposition to the pressure fluid received against the small diameter end 382 from the branch line 381. Such operation of the differential pressure valve is caused by the difference in cross-sectional areas between the small end 382 and the large end 394. In other words, as is well known in the art, the cross-sectional area at large end 394 multiplied by the normal pressure in line 390 must equal the area at small end 382 multiplied by an increased pressure in the line 395 to effect a dynamic pressure balanced condition of the valve spool 379. Leftward movement of the spool 379 to its pressure balanced position greatly restricts the outward flow of fluid through the outlet port 383, and provides a throttling action of the pressure fluid admitted to the supply line 390. The leftward axial movement of the valve spool 379 thus operates to greatly increase the hydraulic pressure in the supply line 375, and branch line 269 to actuate the counterweight mechanism 263 for fully counterbalancing the spindle head 23. As soon as fluid pressure from the line 393 is stopped, the valve spool 379 is again caused to move rightwardly to fully open the outlet port 383 in a manner that the pressure in the supply line 375 is again reduced to the normal operating pressure established by the pressure regulating valve 392.

For selectively actuating the differential pressure valve 378 to increase the pressure in the supply line 269, the manually operative counterweight valve 273, and a power counterweight valve 396, are interconnected between the supply line 390 and the branch line 393. With the plunger rod 274 of the manual valve 273 depressed, a valve spool 397 secured thereto is moved to its rightward position. With this condition existing, pressure fluid from the line 390 flows about a cannelure to an inlet port of the power counterweight valve 396. An axially slidable valve spool 402 of the power counterweight valve 396 is represented in FIG. 10 as being resiliently biased to its rightward position by means of a spring 403. The flow of hydraulic fluid continues from the line 399 about a cannelure 404 formed on the valve spool 402 and thence to the line 393 connected to effect leftward throttling movement of the differential pressure valve spool 394.

As soon as vertical manual adjustment of the spindle head is stopped, and the hand crank withdrawn, the valve spool 397 is moved leftwardly by means of a spring 406 to prevent flow of fluid from the line 390 through the valve 273. Leftward movement of the valve spool 397 effects an operative connection of an exhaust return line 407 to the line 399, thereby exhausting hydraulic fluid from the line 393 to permit rightward movement of the differential pressure valve spool 394.

During power operated vertical movement of the spindle head, a solenoid 408 of the valve 396 is caused to be energized thereby effecting leftward movement of the valve spool 402. Leftward movement of the valve spool 402 in turn effects an operative connection from the hydraulic supply line 390 to a branch line 409, and thence about the cannelure 404 to the supply line 393. Upon stopping vertical movement of the spindle head under power, the solenoid 408 is deenergized, permitting the spring 403 to move the valve spool 402 to its rightward position. With this condition existing, the pressure fluid in the line 393 is connected to the exhaust line through the line 399, about the cannelure 398 of the leftwardly biased valve spool 397 to the exhaust return line 407.

For selectively controlling the rotation of the tool spindle 25, FIG. 1, there is provided a solenoid controlled spindle valve 411, having an inlet port 412 connected to receive fluid under normal operating pressure from a branch line 413 connected to the supply line 390. With a valve spool 414 of the valve 411 moved rightwardly by means of a spring 415, the flow of fluid pressure continues from the inlet port 412, about a cannelure 416 and thence to the pressure supply line 172 connected to effect engagement of the spindle brake 158. At the same time, pressure fluid is exhausted from the line 167, about the leftward end of the valve spool 414 and thence through a branch exhaust line 419 to the exhaust line 420 connected to return fluid to the pump 373.

Rotation of the tool spindle 447 is effected by energizing a solenoid 421 of the spindle valve 411 to cause leftward movement of the valve spool 414 in opposition to the spring 415. Upon movement of the valve spool 414 to its leftward position, the pressure line 413 is connected via the cannelure 416 to supply pressure to the supply line 167, which is connected to effect engagement of the spindle drive clutch 154 as hereinbefore explained. Simultaneously therewith, the spindle brake 158 is disengaged due to the fact that pressure fluid is exhausted from the line 172 through a cannelure at the rightward end of the valve spool 414 to a branch exhaust line 422 connected to the exhaust line 420.

Selective axial movement of the quill 34, as well as coordinate clamping of the quill in its outward position, is effected by a solenoid control valve 425. Selective operation of the quill control valve 425 effects the required coordinated movement of the quill moving piston 198, and the quill clamp piston 222. The valve 425 is provided with a cylindrical valve body 426 having in its central portion an inlet port 427 communicating with a branch supply line 428 connected to receive hydraulic fluid under pressure from the line 390. Energization of a solenoid 430 effects leftward movement of a valve spool 431 contained within the quill control valve body 426, in a manner that the flow of pressure fluid continues from the inlet port 427 through a cannelure 432 of the valve spool to the line 203. As hereinbefore explained, the pressure line 203 is connected at its opposite end to an inlet port within the quill moving cylinder 201, thereby effecting axial movement of the piston 198 to move the quill to its outermost position. As the piston 198 is moved axially in response to pressure from the line 203, a port 434 formed in the peripheral wall of the cylinder 201 is uncovered immediately prior to the quill arriving at its outermost position. With the port 434 in communication with the chamber above the piston 198, the flow of fluid under pressure then continues through the line 204 and the line 223 to the quill clamping cylinder 220 to effect axial clamping movement of the quill clamp piston 222.

To simultaneously unclamp and effect retracting or "ducking" movement of the quill, the solenoid 430 of the quill control valve 425 is deenergized and a solenoid 442 at the opposite end thereof is energized to effect rightward movement of the valve spool 431. Immediately upon rightward movement of the valve spool 431, the hydraulic lines 204 and 203 are connected via the cannelure 432 of the valve spool 431 to the exhaust line 422. At the same time the quill moving piston 198 is moved axially by the admission of pressure through line 205 thereby blocking the port 434 communicating with the line 204. After this occurs, the hydraulic line 204 is still connected to the main exhaust line through a branch line 445, a check valve 446 and a line 445 connected to the line 203. Movement of the quill moving piston 198 is so limited that the port 434 is blocked whenever the quill is in its inner position.

With the valve spool 431 of the quill control valve 425 moved rightwardly, a pressure circuit is completed from the inlet port 427 about a cannelure formed toward the leftward end of the valve spool 431 leading to the line 205. From the line 205, the flow of fluid under pressure continues through the line 224 connected to effect axial unclamping movement of the piston 222. The flow of fluid under pressure continues through the line 205 to an inlet port formed in the quill moving cylinder 201 to effect axial movement of the piston 198 for moving the quill to its inner or retracted position, and thereby blocking the port 434.

As shown in FIGS. 1, 2 and 11, hydraulic fluid for actuating the spindle head hydraulic motor 230 is provided by a separate hydraulic system 452 mounted adjacent the machine bed 21 and provided with a separately energizable electric drive motor 454. As seen in FIG. 11, the electric motor 454 is connected to drive a hydraulic pump 455 that is operative to withdraw hydraulic fluid via an intake line 456 from a sump 457. From the pump 455, hydraulic fluid under pressure is transmitted through a supply line 460 to a pressure regulating valve 461, that is provided in well known manner with an overflow by-pass line connected through a branch exhaust line 462 to a main exhaust line 463. The pressure regulating valve 461 is operative in well known manner to supply hydraulic fluid under uniform pressure through a supply line 464 connected to an inlet port 465 formed in the peripheral wall of a valve body 466 of a solenoid controlled selector valve 467. The selector valve 467 is operative to transmit a flow of hydraulic fluid from the pressure line 464 for activating either the copy control mechanism 33 or a spindle head directional valve 470, either of which may be then actuated to effect the required rotation of the hydraulic motor 230 for moving the spindle head 23 in a selected direction along the upright 22.

Rightward movement of the selector valve spool 471 by means of a spring 472 effects the transmission of fluid from the pressure line 464 in a manner that the directional valve 470 may be actuated to effect a required rotation of the hydraulic motor 230. The flow of pressure fluid for accomplishing this continues from the inlet port 465 about a cannelure 474 in the valve spool 471, and thence through a hydraulic line 475 connected at its opposite end to a rapid traverse inlet port 476 of a rate change valve 478. At the same time, the fluid under pressure is available from the line 475 through a feed regulating valve 480 and a line 481 to a feed rate inlet port 482 of the rate change valve 478. The full volume flow of pressure fluid through the rapid traverse port 476 provides for fast or rapid traverse movement of the hydraulic motor 230. The volume of hydraulic fluid from the feed inlet port 482, when opened, is selectively reduced by means of the feed rate regulating valve 480 to provide for rotation of the hydraulic motor 230 at a selected feed rate.

With a valve spool 484 of the rate change valve 478 biased leftwardly by means of a spring 485, as shown, the flow of hydraulic fluid continues from the rapid traverse inlet port 476 to a cannelure 486. From the rate change valve 478, the flow of hydraulic fluid under rapid traverse driving pressure continues through a hydraulic line 487 connected at its opposite end to an inlet port 488 in the peripheral wall of the spindle head directional valve 470. For changing the rate of rotation of the hydraulic motor 230 from rapid traverse to feed rate, a solenoid 491 of the rate change valve 478 is energized to effect rightward movement of the valve spool 484. Rightward movement of the valve spool 484 effects a transmission of hydraulic fluid from the feed inlet port 482, about the cannelure 486 and thence through a branch outlet line 492 connected to the line 487. At the same time, rightward movement of the valve spool 484 blocks the inward flow of fluid from the rapid traverse inlet port 476.

From the spindle head directional valve 470, there are provided a pair of hydraulic lines 494 and 495 connected at their opposite ends to inlet ports 496 and 497 respectively provided in a pair of selector valves 498 and 499. With the directional valve 470 connected to control operation of the motor 230, as shown in FIG. 11, valve spools 503 and 504 of the valves 498 and 499 are respectively biased to their outermost position by means of springs 505 and 506. With this condition existing, the inlet port 496 is connected via the cannelure 508 of the valve spool 503 to a hydraulic line 509 connected directly to the hydraulic motor 230. In a similar manner, the inlet port 497, of the selector valve 499, is connected via a cannelure 511 of the valve spool 504 to a hydraulic line 512 that is operatively connected at its opposite end to the hydraulic motor 230.

Whenever the hydraulic motor 230 is not being rotated by actuation of the directional valve 470, an axially slidable valve spool 514 therein is maintained in a central neutral position by means of a pair of compression springs 515 and 516 respectively, thereby blocking the return flow of fluid from the lines 494 and 495 to the exhaust line. The springs 515 and 516 are seated at their inner ends against washers 517 and 518 which are respectively abutting circular shoulders formed within the valve body as well as the opposite ends of the valve spool 514. To effect upward movement of the spindle head, a solenoid 519 of the directional valve 470 is energized to effect leftward movement of the valve spool 514. Upon movement of the valve spool to its leftward position, the flow of fluid from the inlet port 488 continues about a cannelure 522 connected to supply fluid under either feed, or rapid traverse driving volume, to the hydraulic line 495. From the line 495, the flow of fluid continues through the selector valve 499 and the line 512 to effect rotation of the hydraulic motor 230 for moving the spindle head upwardly. At the same time, a return flow of fluid from the motor 230 is established through the line 509, the selector valve 498 and the line 494. With the valve spool 514 moved leftwardly, the return flow of fluid from the motor continues from the line 494 and thence through a transverse inlet to a drilled line 523 in the valve spool, and a branch exhaust line 524 connected to the exhaust line 463.

In like manner, energization of a solenoid 526 effects rightward movement of the valve spool 514 from its resiliently biased central position to effect downward movement of the spindle head 23. With the valve spool 514 moved rightwardly, the flow of pressure from the inlet port 488 continues about a cannelure 527 to the line 494, through the selector valve 498 and the conduit 509 to the hydraulic motor 230. The admission of fluid under pressure from the line 509 operates the hydraulic motor 230 for effecting downward movement of the spindle head. At the same time a return path for fluid from the motor 230 is provided through the line 512, the selector valve 499, to the line 495. With the valve spool 514 moved rightwardly, the flow of fluid from the line 495 continues through the drilled line 523 within the valve spool and the branch exhaust line 524 to the exhaust line 463.

The hydraulic control system illustrated in FIG. 11 is so arranged that the spindle head moving hydraulic motor 230 is operative either in response to the directional valve 470, or in response to the vertically movable stylus 35 of the copy control mechanism 33. To change the mode of motor operation, from the directional valve 470 to the copy control mechanism 33, the three selector valves 467, 498 and 499 are adapted to be simultaneously actuated for disconnecting the directional valve 470 and interconnecting the copy control mechanism 33.

As will hereinafter be more fully explained, this arrangement is particularly advantageous in permitting an automatic approach of the copy control stylus 35 into engagement with the pattern 36. For example, with the worktable 29 and pattern 36 in non-moving relationship to the upwardly positioned spindle head 23, the spindle head and copy control mechanism may be moved downwardly at rapid traverse rate by the proper coordinated operation of the directional valve 470 and rate change valve 478. As the stylus 35 moves into closer proximity to the guiding edge of the pattern 36, the rate change valve 478 may then be actuated to reduce the rate of downward head movement to a selected feed rate. As the spindle head is moved into closer relationship to the pattern, the selector valves 467, 498 and 499 are energized to transfer control of the hydraulic motor 230 to the copy control mechanism 33. As the spindle head is traversed downwardly into proper work and pattern engaging relationship, the worktable is caused to begin movement at a selected feed rate immediately prior to engagement of the stylus 35 with the guiding edge of the pattern 36. This entire series of head movements, function change to copy control, and coordinated table movement may be programmed in series with a selected sequence of other machine movements. Thus, the necessity for traversing the copy control mechanism 33 into proper pattern engaging relationship by manual hand control is completely obviated.

To provide for copy control operation, the selector valves 467, 498 and 499 are actuated by simultaneously energizing solenoids 530, 531 and 532 respectively associated therewith. Energization of the solenoid 530 for the selector valve 467 effects leftward movement of the valve spool 471 in opposition to the spring 472, in a manner that fluid from the main pressure line 464 is transmitted via the cannelure 474 directly to a copy system pressure supply line 533. The pressure supply line 533 is connected at its opposite end to supply fluid under pressure to a copy control valve member 535. The copy control valve member 535, which may be of any well known type, is operative in well known manner to supply fluid under pressure to one or the other of two output lines in accordance with the vertically movable stylus 35. As shown in FIG. 11, a slight upward movement of the stylus 35 relative to the copy valve member 535 operates to effect a transmission of fluid from the pressure supply line 533, through the valve member 535 and thence to an output supply line 536.

With the valve spool 504 of the selector valve 499 moved leftwardly by the solenoid 532, the supply line 536 is connected via the cannelure 511 to the line 512. As hereinbefore explained, fluid pressure in the line 512 operates to rotate the hydraulic motor 230 for effecting upward movement of the spindle head 23. As the motor 230 is rotated during this condition of operation, the return flow of fluid therefrom continues through the line 509. Inasmuch as the valve spool 503 of the selector valve 498 has been moved rightwardly by means of the solenoid 531, the flow of fluid continues from the line 509 via the cannelure 508 to a hydraulic conduit 537. With the stylus 35 moved upwardly to effect upward movement of the spindle head, the flow of pressure fluid from a line 537 continues through the copy valve member 535 and thence through an exhaust line 538 to the main exhaust line 463.

In the event the stylus 35 is moved downwardly, the fluid under pressure from supply line 533 to the copy valve member 535 then flows outwardly through the hydraulic line 537. It will be apparent that fluid under pressure through the supply line 537 and the selector valve 498 will operate the hydraulic motor 230 for effecting downward movement of the spindle head. At this time, the return flow of fluid from the motor 230 continues through the line 512, valve 499, line 536, and the copy valve member 535 of the exhaust line 538. The arrangement is such, that selective upward or downward movement of the copy stylus 35 effects a properly graduated flow of pressure fluid through one or the other of the output lines 536 or 537 to provide the required rotation of the motor 230. In the event the stylus 35 is retained continuously at its mid position, the pressure of the fluid from the valve member 33 to the hydraulic lines 536 and 537 will be exactly balanced to retain the hydraulic motor 230 in non-rotating position. Such condition would occur, for example, in the event the stylus momentarily traversed a portion of the pattern that was exactly parallel to the path of travel of the worktable 29. In such a case, there will be no flow of fluid through the exhaust line 538.

To effect a selective energization of one or another of the various solenoid control valves shown in the hydraulic circuits in FIGS. 9, 10 and 11; there is provided the complete electrical control circuit illustrated in FIGS. 12A, 12B, and 12C. To facilitate the description of the electrical control circuit, it should be stated that the portion of the circuit shown in FIG. 12A includes the various manually operative switches for energizing the machine, the selector switch 38 for determining the mode of operation, and the various push button switches, indicated by the dotted panel 550, for effecting manually initiated power driven movement of the various machine members. That portion of the control circuit shown in FIG. 12B includes the solenoids, indicated by the dotted panel 552, for actuating the various solenoid control valves, certain of which are responsive to the push button switches, 550, in FIG. 12A, and certain of which are responsive to the programming control system shown more fully in FIG. 12C. To effect programmed control operation of various ones of the valve solenoids, shown in the panel 552 in FIG. 12B, it is necessary to move the main selector switch 38, FIG. 12A, to closed position. With the switch 38 in closed position, the program control system shown in FIG. 12C is connected to effect sequential energization of predetermined ones of the control valve solenoids, indicated in the panel 552 in FIG. 12B. The program control system comprises essentially a selectively energizable stepping switch 553, FIG. 12C, together with a plurality of function selector switches, indicated generally by the dotted panel 554, and three control relays, shown in the dotted panel 555, for energizing the stepping switch 553.

Power for selectively energizing the motors and the control circuit, is derived from a three phase source by means of a disconnect switch 556 that is operative in well known manner to transmit current to line conductors $L_1$, $L_2$ and $L_3$ that are connected to energize a power circuit represented by dark lines in FIG. 12A. The line conductors $L_2$ and $L_3$ are likewise connected to energize the primary coil of a transformer 560 constituting a source of power for energizing the control circuits represented by light lines in FIGS. 12A, 12B and 12C. The secondary coil of the transformer 560 is connected to supply current of the required reduced voltage through the usual fuses to energize input supply conductors 561 and 562 that are connectable to energize the control circuits.

To energize the spindle motor 26 and feed motor 30, a master start button switch 564 is momentarily depressed, thus completing a circuit from the conductor 561, through the normally closed contact bar of a master stop switch 565, a conductor 566 and thence through the start switch to energize a conductor 567. From the energized conductor 567, a flow of current continues through the coil of a master start relay 569 to the energized conductor 562, thereby effecting upward movement of the relay to closed position. Upon releasing the start switch 564, a holding circuit is then completed from the energized conductor 566, through a conductor 570, the closed upper contact bar of the relay 569 and thence through conductors 571 and 572 connected to the conductor 567. Thus, with the master start relay 569, energized to closed position, the conductor 571 is energized to constitute a source of current for other elements in the control system.

Likewise, a circuit is completed from the energized conductor 562 through conductor 574, the closed lower bar of the relay 569 and a branch conductor 575 connected to a control circuit supply condutor 576. Toward one end, the energized conductor 576 is connected to supply current to the terminals associated with a pair of coils for a spindle motor start relay 579 and a feed motor start relay 580. The flow of current through the coils for the motor starting relays 580 and 579 continues through branch conductors 581 and 582 respectively, through the middle closed contact bar of the master start relay 569 to the energized conductor 572. Energization of the coil for the spindle motor start relay 579 effects upward movement of the relay in a manner that current is transmitted from line conductors $L_1$, $L_2$ and $L_3$, through the closed contact bars of the relay to effect energization of the spindle motor 26. In a similar manner, energizaiton of the coil for the feed motor relay 580 effects upward movement of the contact bars therein in a manner to transmit current from the line conductors $L_1$, $L_2$ and $L_3$ to energize the feed motor 30.

To energize the drive motor 454 for the separate spindle head moving hydraulic circuit 452, FIG. 1, there is provided a separate control circuit via conductors 585 and 586 connected to receive energy directly from the input supply conductors 561 and 562 respectively. Movement of a switch 587 to closed position effects a flow of current from the conductor 586 through the coil of a starting relay 588 and thence to the conductor 585. Energization of the coil in turn effects upward movement of the relay 588 to closed position, thereby effecting a transmission of current from line conductors $L_1$, $L_2$ and $L_3$, through the closed contact bars of the starting relay to energize the drive motor 454. In the event the spindle head is not power driven during a particular machining operaion, the switch 587 is retained in open position as it is then unnecessary to energize the motor 454. For the purposes of this description, however, it will be assumed the switch 587 is closed and that the motor 454 is energized to rotate in a manner that the spindle head is vertically movable under power.

After the spindle motor 26 and the feed motor 30 have been energized to rotate, as described, the spindle motor may be connected to drive the tool spindle by momentarily depressing a spindle start switch 590. With the spindle start button 590 momentarily depressed, a circuit is completed from the energized conductor 571, through the normally closed contact bar of a spindle stop button switch 591 to a conductor 592. From the conductor 592, the flow of current continues through the contact bar of the start switch 590 to a conductor 593 connected to one terminal of a coil for a spindle start relay 595, FIG. 12B. The flow of current continues through the coil, effecting upward movement of the relay 595 to closed position, and thence through a return conductor 596 that is in turn connected to the energized control circuit supply conductor 576.

A holding circuit for the relay 595 is then completed from the conductor 596, through the coil, the conductor 593 and the closed second contact bar 598 of the relay to a conductor 599. The conductor 599 is in turn connected at its opposite end to the conductor 592, in a manner that depressing the spindle stop button switch 591 will interrupt the holding circuit and permit the relay 595 to drop to open position. Movement of the spindle start relay 595 to energized closed position completes a circuit for energizing the solenoid 421 thereby engaging the spindle drive clutch 154 to drive the tool spindle 25, FIGS. 6, 10 and 12B. As shown in FIG. 12B, one of the terminals associated with the various solenoids indicated in the dotted panel 552, is normally connected to receive current from the energized supply conductor 603. As shown in FIG. 12A, the conductor 603 is connected to be energized by the conductor 576 whenever the master start relay 569 is energized to upward closed position. Referring again to FIG. 12B, a control circuit for energizing the spindle start coil 421 extends from the conductor 603 through a branch conductor 604 and through the coil to a conductor 606. The conductor 606 in turn is connected through a closed contact bar 607 of the spindle start relay 595 to an energized conductor 608. The circuit is completed from the conductor 608 which is connected at its opposite end, FIG. 12A, to the energized control circuit conductor 571. Whenever the tool spindle is connected to rotate by movement of the spindle start relay 595 to closed position, the various other machine movements may be effected, either by push button control or automatic program control, depending upon the position of the main selector switch 38, FIG. 12A.

With the spindle start relay 595 in closed position and the selector switch 38 in open position, the various push button switches indicated in the dotted panel 550, FIG. 12A, may be selectively depressed to effect a required table or spindle head movement. The push button directional switches shown in the dotted panel 550, FIG. 12A, include a table right switch 610, a table left switch 611, a head up switch 613, a head down switch 614, and a common rapid traverse switch 615. Depressing the table right switch 610 momentarily, establishes a holding circuit for effecting rightward movement of the worktable, the rightward table movement being continued until a limit switch is actuated or until a traverse stop button switch 616 is depressed. In a similar manner, the other directional switches 611, 613 or 614 may be depressed to effect leftward table movement, upward head movement, or downward head movement respectively. Movement of the worktable or the spindle head in response to momentarily depressing one or another of the directional switches within the dotted panel 550, will normally effect a required member movement in a selected direction at feed rate. The directional switches are interlocked to preclude damage to the power transmission mechanisms and to prevent reversal through operation of the directional switches. For example, with the table moving in a rightward direction, after momentarily depressing the table right switch 610, depressing the table left switch 611 operates to reverse the direction of table movement. Only one of the switches 610 or 611 is operative to effect table movement at any given time. Reversal of vertical spindle head movement is accomplished in a similar manner by operation of the spindle head directional switches 613 and 614.

The common rapid traverse push button switch 615 is operative to effect either rapid traverse of the worktable or the spindle head, depending upon which of the table directional switches 610, 611 or the head directional switches 613, 614 has been depressed. Rapid traverse movement of either the worktable or the spindle head is continued only while the push button 615 is maintained in fully depressed position.

To facilitate the description, the four directional relays that are selectively energized to closed position in response to the directional push button switches 610, 611, 613 and 614 will be referred to as "manual" relays. This is to differentiate them from a similar group of four relays that are operative to accomplish a similar purpose when the machine is conditioned for programmed control operation. In other words, either the four directional relays for program operation or the four "manual" relays are operative to energize one or another of the solenoids 347, 348, 519, or 526, FIG. 12B. As hereinbefore explained, the directional solenoids 347 and 348 are operative to effect directionally controlled movement of the worktable, while the solenoids 519 and 526 are operative to effect vertical movement of the spindle head.

With the machine conditioned for manual push button operation, the five push button switches shown in the dotted panel 550, FIG. 12A, are disposed to have one terminal connected to an energized connector 618. The energized conductor 618 in turn is connected through the lower, normally closed contact bar 619 of the traverse stop switch 616 to a conductor 620 connected to a conductor 621. From the conductor 621, the current flow continues from the normally closed contact bar 622 of a relay 623, FIG. 12B, and thence through a conductor 626 to the energized conductor 608.

Thus, referring again to FIG. 12A, momentarily depressing the table right push button 610 effects a flow of current from the energized common conductor 618 to a conductor 627 connected at its opposite end to one terminal of a coil for a "manual" right relay 628. The flow of current through the coil energizes the relay 628 to upward closed position and continues to a conductor 630. As shown in FIG. 12B, the energized circuit continues from the conductor 630 through the normally closed contact bar 631 of the relay 623 to a conductor 632 connected to a conductor 633. From the conductor 633, the circuit continues through the normally closed contact bar of a table right or function change switch 635 to a conductor 639.

The table right switch 635 is operative either as a stop switch or a function change switch, depending upon the selected mode of operation of the machine. With the machine conditioned for push button controlled operation, depressing a switch plunger 636 opens the switch 635 to interrupt the holding circuit to the energized "manual" right relay 628, thereby stopping rightward movement of the worktable. As shown in FIG. 3, the switch plunger 636 is carried by the table tripping post 32 in a manner to be selectively actuated by a stop or function change dog 637 adjustably secured within a groove 638 formed in the front face of the worktable 29.

Referring again to FIG. 12B, the energized circuit for effecting rightward, push button initiated movement of the table, continues from the conductor 639, a conductor 640 and thence through the normally closed contact bar 641 of the relay 623 to a conductor 642. From the conductor 642, the energized circuit continues through a conductor 643, and thence through a conductor 644, FIG. 12A, and through a normally closed contact bar 645 of a quill-out relay 646 to a conductor 647. The circuit then continues from the conductor 647 through the normally closed contact bar 648 of a quill-in relay 649, FIG. 12B, to a conductor 652. The interlocking circuit continues from the conductor 652, through the normally closed contact bar of a head up relay 654 to a conductor 655, through a closed contact bar of a "manual" head up relay 657 to a conductor 658. The interlocking circuit then continues from the energized conductor 658, through a normally closed contact bar of a "manual" head down relay 660 to a conductor 661, through a closed contact bar of a head down relay 663 to a conductor 664. The interlocking circuit continues from the conductor 664 through a normally closed contact bar of a left copy relay 666, through a conductor 667 and a closed contact bar of a right copy relay 669 to a conductor 670 connected to the energized conductor 603.

For purposes of the description, it will be assumed that the table right push buton 610, FIG. 12A, has been retained in depressed position until the complete circuit extending from the conductor 630 to the energized conductor 603 has been completed to energize the coil of the "manual" right relay 628, thereby effecting movement of the relay to closed position. A holding circuit for the relay 628 is then completed from the conductor 627 and a conductor 673, through the closed contact bar 674 of the closed relay 628 to a conductor 675. The holding circuit continues from the conductor 675 through a normally closed contact bar of a "manual" left directional relay 676 to a conductor 677. From the conductor 677, FIG. 12B, the holding circuit continues through a common conductor 679, and thence through a closed contact bar 680 of the energized spindle start relay 595 to a conductor 681. As seen in FIG. 12A, the circuit continues from the conductor 681 which is connected at its opposite end to the energized conductor 618. Thus, after rightward table movement has been effected by energization of the "manual" relay 628 to closed position, the traverse stop button switch 616 may be depressed to move the contact bar 619 downwardly, and interrupt the flow of current from the energized conductor 620 to the conductor 618 and the holding circuit conductor 681. Depressing the traverse stop button switch 616 thereby interrupts the holding circuit to the energized coil of the relay 628 to stop rightward table movement.

Upward movement of the relay 628 to closed position completes a circuit for energizing the table right control valve solenoid 347, FIG. 12B. The circuit for energizing the table right solenoid 347 is completed from the energized conductor 603 through a branch conductor 684 and the normally closed contact bar of a table right limit switch 685 to one terminal of the coil 347. As shown in FIGS. 3 and 12B, the table right limit switch 685 is provided with an actuating plunger 686 that is adapted to be engaged by a table right limit stop dog 687 fixedly secured to the worktable 29. Actuation of the plunger 686 by the limit stop 687 thereby operates to open the limit switch 685 to deenergize solenoid 347 and stop worktable movement in the event it has inadvertently been caused to move too far in a rightward direction. The circuit for energizing the solenoid 347 continues from the opposite terminal thereof through the conductor 689 and thence to a branch conductor 690, FIG. 12A. From the conductor 690, the flow of current continues through a closed contact bar 691 of the energized relay 628 to a conductor 693 connected to a conductor 694. From the conductor 694, the flow of current continues through a conductor 695, and thence through the upper closed contact bar of the energized spindle start relay 595, FIG. 12B, to the energized conductor 608.

It will be readily apparent, that once rightward table movement has been initiated by momentarily depressing the table right switch 610, that table movement can be stopped in one of three ways during push button controlled operation of the machine. First, depressing the traverse stop switch 616 interrupts the holding circuit to the "manual" table right relay 628, to stop rightward table movement. Second, the table right stop or function change dogs 637, FIG. 3, may be predeterminately set to actuate the switch plunger 636, FIGS. 3 and 12B, to likewise interrupt the holding circuit to the relay 628 for stopping rightward table movement. Third, in the event the worktable is inadvertently moved too far in a rightward direction, the limit stop 687, FIG. 3, will actuate the rightward table limit switch plunger 686 to immediately deenergize the solenoid 347 for stopping table movement in a rightward direction. In a similar manner, as will hereinafter be more fully explained, means are provided during push button controlled operation for stopping leftward table movement, upward movement of the spindle head, or downward movement of he spindle head. Likewise, means are provided to reverse the direction of movement of the spindle head or the worktable.

Leftward table movement is initiated by momentarily depressing the table left switch 611, FIG. 12A, thereby effecting a transmission of current from the energized conductor 618 to the conductor 703. From the conductor 703 the flow of current continues through a coil for the "manual" table left relay 676, effecting upward movement of the relay to closed position, and continues to a conductor 704. From the conductor 704, the circuit then continues through a normally closed contact bar 706 of the relay 623, FIG. 12B, to a conductor 707. From the conductor 707, the flow of current continues through the normally closed contact bar of a table left stop or function change switch 708 to the conductor 643. As shown in FIGS. 3 and 12B, the switch 708 is provided with an actuating plunger 709, carried by the table tripping post 32, and that is adapted to be actuated by a stop or function change dog 710 adjustably positioned within a groove 711 formed in the worktable 29. As hereinbefore explained with respect to rightward table movement, an interlocking holding circuit continues from the conductor 643 through normally closed contact bars in the various control relays to a conductor 670, FIG. 12B, connected to the energized conductor 603.

With the "manual" table left relay 676 energized to upward closed position, a control circuit is completed for effecting leftward table movement. As shown in FIG. 12A, this circuit continues from the energized conductor 695, a branch conductor 714 and the closed contact bar 715 of the energized relay 676 to a conductor 716. From the conductor 716, the flow of current continues through a conductor 717 connected at its opposite end to one terminal of the table left control valve solenoid 348, FIG. 12B. The circuit for energizing the solenoid 348 continues through the normally closed contact bar of a table left limit switch 719, and through the conductor 684 to the energized conductor 603. The limit switch 719 is provided with an actuating plunger 720, FIGS. 3 and 12B, that is carried by the table tripping post 32 in a position to be actuated by a left limit stop 721 secured to the table 29. In the event of overtravel of the table 29 in a leftward direction, the stop 721 actuates the plunger 720 to effect deenergization of the solenoid 348.

With the machine still conditioned for push button controlled operation, the directional switch 613 may be momentarily depressed to effect upward movement of the spindle head. Depressing the switch 613 effects a transmission of power from the energized conductor 618, through the switch to a conductor 724 that is connected at its opposite end to one terminal of a coil for the "manual" up relay 657. The flow of current through the coil effects upward movement of the relay 657 to closed position and continues through a conductor 725. From the ocnductor 725, the flow of current continues through a normally closed contact bar 726 of a relay 728, through a conductor 729 and a closed contact bar 731 to a conductor 732. From the conductor 732, the circuit continues through the closed contact bar of a stop or function change switch 734 to a conductor 739. As seen in FIGS. 4 and 12B, the stop or function change switch 734 is provided with an actuating plunger 735. The actuating plunger 735 is slidably carried by the head tripping post 37 which is secured to the column upright 22. The switch plunger 735 is so positioned as to be actuated by a stop or function change dog (not shown) that may be adjustably secured within a groove 736 formed in a laterally extending support member 737 secured to the spindle head 23. Actuating the switch plunger 735, therefore, operates the switch 734 to interrupt the circuit from the conductor 732 to the conductor 739, thereby permitting the "manual" relay 657 to drop to open position.

From the conductor 739, the circuit for retaining the relay 657 in energized closed position, continues through a normally closed contact bar 740 of the relay 728 and thence through a conductor 741 to a conductor 742. The interlocking circuit continues from the conductor 742 through the normally closed contact bar 743 of the quill out relay 646, FIG. 12A, to a conductor 745. From the conductor 745, the circuit continues through a closed contact bar 746 of the table right relay 747, through a conductor 749, a normally closed contact bar of the "manual" table right relay 628 to a conductor 751. The circuit then continues from the conductor 751 through a normally closed contact bar of the "manual" table left relay 676 to a conductor 752. The conductor 752 is connected through a normally closed contact bar of a table left relay 753 to a conductor 754 that in turn is connected by a normally closed contact bar 755 of the quill in relay 649, FIG. 12B, to the conductor 756. The interlocking circuit continues from the conductor 756, through a normally closed contact bar of the left copy relay 666, a conductor 757, to a normally closed contact bar of the right copy relay 669, to the conductor 670 connected to the energized conductor 603.

Upon energized upward movement of the "manual" up relay 657 to closed position, a circuit is completed to effect energization of the directional valve solenoid 519 for effecting upward movement of the spindle head. As shown in FIG. 12B, the circuit for energizing the head up directional valve solenoid 519 is effected from the energized conductor 603, through branch conductor 760, and the normally closed contact bar of a limit switch 761 to one terminal of the coil 519. To prevent accidental overtravel of the spindle head in an upward direction, a limit switch 761 is provided with an actuating plunger 762, FIGS. 4 and 12B, slidably mounted in the head tripping post 37 in a manner to be actuated by a stop dog (not shown) fixedly secured to the spindle head member 737. The circuit for energizing the solenoid 519 continues through a conductor 764, branch conductor 765, a closed contact bar 766 of the energized relay 657 to a conductor 767. From the conductor 767, the circuit continues through conductors 769 and 770, thence through a closed contact bar 771 of the energized spindle start relay 595 to the energized conductor 608. It will be apparent that actuation of either the limit switch 761 or the stop switch 734, FIG. 12B, will operate to stop upward movement of the spindle head. In like manner, depressing the traverse stop switch 616, FIG. 12A, will also stop upward movement of the spindle head after it has been initiated by momentarily depressing the spindle head directional switch 613.

In a similar manner, downward movement of the spindle head may be initiated by depressing the directional switch 614 momentarily, thereby completing a circuit from the energized conductor 618 through the contact bar of the switch to a conductor 775. The flow of current from the conductor 775 continues through the coil of the "manual" down relay 660, FIG. 12B, to a conductor 776. The conductor 776, in turn, is connected through the normally closed contact bar 777 of the relay 728 to a conductor 780. From the conductor 780, the flow of current continues through the normally closed contact bar of a switch 781, that operates either as a stop or function change switch, to the conductor 741. From the conductor 741, an interlocking circuit continues via the conductor 742, as hereinbefore explained, to the normally closed contact bars of the various control relays to the conductor 670 connected to the energized conductor 603. The stop or function change switch 781 is provided with an actuating plunger 782, FIGS. 4 and 12B, and extends from the head tripping post 37 in position to be engaged by a stop or function change dog (not shown) removably secured in a groove 783 formed in the head support member 737.

With the "manual" head down relay 660 energized to closed position, a circuit is completed to energize the directional valve solenoid 526, FIG. 12B. The circuit for energizing the solenoid 526 is completed from the energized conductor 603, the conductor 760, the normally closed contact bar of a down limit switch 786, and through the coil 526 to a conductor 788. As shown in FIGS. 4 and 12B, the limit switch 786 is provided with an actuating plunger 787 so disposed within the head tripping post 37 as to be actuated by a limit stop dog (not shown) fixedly secured to the extending head members 737. The circuit continues from the conductor 788 through the closed contact bar 789 of the energized relay 660 to the conductor 769 which, as hereinbefore explained, is connected via the conductor 770 and the closed contact bar 771 to the energized conductor 608.

Because of the interlocking holding circuits to the coils of the "manual" directional relays 628, 676, 657, and 660, only one of these relays may be energized to closed position at a time to effect a required movement of the worktable or the spindle head. The interlocking holding circuits likewise are arranged to provide for a push button controlled reversal in the direction of movement of either the worktable or the spindle head. For example, assume the table right push button 610 has been momentarily depressed to energize the "manual" right relay 628 to closed position, thereby effecting rightward movement of the worktable. Rightward movement of the worktable will then continue until the holding circuit to the coil of the relay 628 is interrupted, permitting the relay to drop to open position for stopping rightward movement. With the relay 628 energized to closed position and the worktable moving in a rightward direction, the direction of table movement may be reversed by momentarily depressing the table left push button 611. As hereinbefore explained, the push button 611 operates to effect energization of a coil for the "manual" left relay 676 to initiate leftward movement of the worktable. At the same time, upward movement of the relay 676 to closed position moves a normally closed contact bar bridging conductors 677 and 675, to open position. The interruption of the holding circuit from conductor 677 to conductor 675 and the closed contact bar 674 of the relay 628 interrupts the holding circuit to the coil for the relay 628, permitting movement of the relay to open position and stopping rightward table movement.

The directional push button switches 613 and 614 are operative in a similar manner to effect reversal in the movement in the spindle head. This arrangement is particularly advantageous in permitting a selective positioning movement of either the worktable or the spindle head in response to push button controlled operation. A further advantage of this arrangement is the fact that both the worktable and the spindle head may be moved in either direction at a selected feed or rapid traverse rate for milling a single workpiece, or a relatively small number of workpieces.

Whenever a selected one of the "manual" directional relays 628, 676, 657 or 660 is energized to effect a required worktable or spindle head movement at feed rate, the rate of travel of the moving member may be increased by depressing the rapid traverse push button switch 615. During push button controlled operation of the machine, the rapid traverse rate of worktable or spindle head movement is available as long as the push button 615 is retained in depressed position.

To illustrate the push button rapid traverse control of the worktable, it will be assumed that the "manual" right relay 628 has been energized to upward closed position to effect rightward movement of the worktable at feed rate. Depressing the rapid traverse push button switch 615 then operates to complete a circuit from the energized conductor 618 to a conductor 793 and a branch conductor 794 to one terminal of a coil for a table rapid traverse relay 795. The flow of current from the conductor 794 continues through the coil to a conductor 796 thereby energizing the relay 795 to upward closed position. The conductor 796 is connected through a normally closed contact bar of a table right rapid traverse stop switch 802, having an actuating plunger 803, to a conductor 804. From the conductor 804, the circuit continues through a closed contact bar of the energized relay 628 to a conductor 805. The conductor 805 in turn is connected by a conductor 807 to the energized conductor 644. With this circuit being completed by retaining the rapid traverse push button switch 615 in depressed position, the rapid traverse table relay 795 is energized to closed position to complete a circuit for energizing the table rapid traverse valve solenoid 362, FIG. 12B. The energized circuit for the solenoid extends from the conductor 603 and a branch conductor 808 through the solenoid 362 to a conductor 810. As shown in FIG. 12A, the circuit for energizing the table rapid traverse solenoid continues from the conductor 810 through a closed contact bar 811 of the closed relay 795 to a conductor 812, a conductor 813, and a conductor 814 to the energized conductor 608. With the described energized circuit to the table rapid traverse solenoid 362 being completed in the described manner, rightward table movement at rapid traverse rate will continue until the push button switch 615 is released.

In a similar manner, rapid traverse movement of the worktable in a leftward direction can be effected by momentarily depressing the switch 615, providing the "manual" table left relay 676 has first been energized to closed position. Depressing the switch 615 to effect leftward rapid traverse movement of the worktable completes a circuit through the coil of the relay 795 and a conductor 796, through a normally closed rapid traverse stop switch 816, having an actuating plunger 817, to a conductor 818. With the "manual" left relay 676 energized to closed position, the control circuit continues from the conductor 818 through a closed contact bar of the relay 676 to the conductor 805, thereby effecting energization of the coil for the relay 795.

It will be noted that no function has been ascribed to the rapid traverse stop switches 802 and 816 whenever rapid traverse movement of the worktable is effected in response to the push button switch 615. This is due to the fact that the rapid traverse stop switches 802 and 816 serve a useful purpose only when the machine has been conditioned for programmed controlled operation. As will hereinafter be more fully explained, the switches 802 and 816, together with the actuating plungers therefor, are designated, as feed start switches, in FIG. 3, since they operate both to stop the rapid traverse rate and initiate feed rate during program controlled operation. As shown in FIG. 3, the actuating plunger 803 for the right rapid traverse stop switch 802 is slidably carried by the table tripping post 32 in position to be engaged by a rapid traverse stop dog 820 adjustably secured within the table groove 638. In a similar manner, the table left rapid traverse stop switch 816 and actuating plunger 817 are carried by the table tripping post 32 in a manner to be actuated by a rapid traverse stop dog 821 secured within the upper table groove 711.

To effect upward movement of the spindle head at rapid traverse rate, the switch 615, FIG. 12A, is depressed to complete a circuit from the conductor 618 via the conductor 793 and a branch conductor 825 connected to one terminal of a coil for a spindle head rapid traverse relay 826. The flow of current through the coil energizes the relay 826 to upward closed position and continues through a conductor 827, the normally closed contact bar of a stop switch 829 having an actuating plunger 830, to a conductor 831. The flow of current from the conductor 831, as shown in FIG. 12B, continues through a conductor 832, a closed contact bar of the energized "manual" up relay 657 to a conductor 833. The circuit is completed through the conductor 833 which is connected at its opposite end to the energized conductor 741.

To effect downward movement of the spindle head at rapid traverse rate, the circuit for energizing the coil of the spindle head rapid traverse relay 826, FIG. 12A, is completed from the conductor 827 through the normally closed contact bar of a switch 835, having an actuating plunger 836, to a conductor 837. From the conductor 837, FIG. 12B, the circuit continues via a conductor 838, a closed contact bar of the "manual" down relay 660 and to the conductor 833 connected to the energized conductor 741.

Thus, whenever the spindle head rapid traverse relay 826, FIG. 12A, is energized to closed position and one of the "manual" head directional relays 657 or 660, FIG. 12B, is energized to closed position, a circuit is completed to energize the spindle head rapid traverse control valve solenoid 491. This circuit extends from the energized conductor 603, branch conductor 840, through the coil 491 to a conductor 841 that is connected through a closed contact bar of the relay 826, FIG. 12A, to the energized conductor 813.

The stop switches 829 and 835, FIG. 12A, are interconnected in the circuit primarily to serve as feed start switches when the machine is conditioned for programmed controlled operation. As indicated in FIG. 4, the actuating plunger 830 for the switch 829 is carried by the head tripping post 37 in a manner to be selectively actuated by a dog (not shown) adjustably positioned within the groove 736 presented by the support member 737. In a like manner, the actuating plunger 836 for the stop switch 835 is carried by the head tripping post 37 in a manner to be actuated by the dog 843 adjustably secured within the groove 783 in the member 737.

During power driven vertical movement of the spindle head at either feed or rapid traverse rate, both the spindle head clutch solenoid 319 and vertical counterweight valve solenoid 408 are energized. This condition occurs during push button controlled operation, during program controlled operation of the directional valve or during copying controlled operation. With either of the "manual" vertical control relays 657 and 660 energized during push button operation, a circuit is completed to energize the head clutch solenoid 319 and the counterweight solenoid 408. From the energized conductor 603, FIG. 12B, this circuit extends through the solenoids 319 and 408 to a conductor 844. During upward movement, the circuit continues from the conductor 844, through a closed contact bar of the "manual" up relay 657, to a conductor 847 connected via a branch conductor 848 to the energized conductor 626. In a similar manner, during downward movement, the circuit continues from the conductor 844 a conductor 849, and a closed contact bar of the "manual" down relay 660 to the conductor 847.

That portion of the electrical control circuit hereinbefore described in connection with the circuit diagram illustrated in FIGS. 12A, 12B, and 12C is directed primarily to manual push button controlled operation of the worktable and spindle head. As previously explained, manually initiated power driven control of the worktable or spindle head in response to the push button switches 550, FIG. 12A, is possible only when the selector switch 38 is in open position as shown.

To condition the machine for program controlled operation, the main selector switch 38, FIG. 12A, is moved to closed position thereby completing a circuit to energize the copy selector relays 623 and 728, FIG. 12B, to upwardly closed position. With the switch 38 in closed position, a circuit is completed from the energized main supply conductor 571 through the switch to a conductor 850 connected directly to one terminal of the coil for the relay 728, FIG. 12B. The flow of current through the coil energizes the relay to upward closed position and continues through a branch conductor 851 connected via the conductor 596 to the main energized supply conductor 576, FIG. 12A. At the same time, the other circuit is completed from the conductor 850 through a branch conductor 852, the coil for the relay 623 to a conductor 853 connected to the conductor 596. With the relays 623 and 728 retained in energized closed position by the holding circuit established through the closed selector switch 38, the machine is conditioned for programmed controlled operation, and the push button controls indicated within the dotted panel 550, FIG. 12A, are rendered inoperative to effect directionally controlled movement of either the table or the spindle head.

Assume for the moment that the program controlled system illustrated generally in FIG. 12C, has been predeterminately adjusted to effect a selected sequence of machine movements or functions. As will hereinafter be explained, this setting is accomplished by adjusting the function selector switches represented in the dotted panel 554, FIG. 12C, in coordinated relationship with the setting of the various function change or stop dogs represented in FIGS. 3 and 4. With this accomplished, and the selector switch 38 in closed position, a particular selected machine program may be initiated by momentarily depressing a traverse start button switch 855, FIG. 12A. Depressing the traverse start switch 855 effects energization of a program control relay 856 into upward closed position, thereby operatively interconnecting the output conductors from the selector switches with the appropriate movement and function determining relays in the control system. At the same time, releasing the traverse start switch 855, after it has been depressed, effects an operative advancement of the three wiper arms in the stepping switch 553, FIG. 12C, from their home position into engagement with the first set of contacts for effecting the required member movement. With the machine conditioned for single cycle program operation, it is necessary to momentarily depress the traverse start button switch 855 to start each succeeding cycle. With the machine conditioned for repetitive cycle operation, however, the selected cycle of machine movements will continue until the traverse stop switch 616 is depressed.

Referring more particularly to FIG. 12C, the stepping switch 553, diagrammatically illustrated for purposes of the description, is provided with three spaced apart wiper arms 858, 859 and 860. The wiper arms 858, 859 and 860 are secured to a common shaft (not shown) for rotation in synchronism about the same axis. As is more clearly shown in FIG. 16, the stepping switch wiper arm 858 is indexable in a step-by-step manner, to a total of eleven different equally spaced apart stations, in each of which the wiper arm engages a different contact. As indicated in FIG. 16, the wiper arm 858 is movable from its home position into sequential engagement with equally spaced apart contacts that are respectively indicated as phases 1 to 10 inclusive.

As shown in FIG. 16 and the schematic view, FIG. 12C, the switch wiper arm 858 is successively indexed from its home position into engagement with the ten contacts respectively connected to conductors 861 to 870 inclusive. The conductors 861 to 870 inclusive are in turn disposed to be connected at their opposite ends to the central terminals associated with wiper arms respectively provided in ten function selector switches 871 to 880 inclusive, the latter collectively comprising a function selector device or switching matrix for presetting a machine program. A particular program may be preset by predeterminately setting the function selectors in coordinated relationship with securing the dogs to the table. Inasmuch as all of the function selector switches are of identical construction, only the switch 880 is represented in FIG. 17 as being provided with a control knob 884 and pointer 885 that may be manually rotated into detent controlled position relative to machine function legends provided on a plate 886. With the control knob 884 positioned as shown in FIG. 17, a switch wiper arm 887 is in the reset position. The various legends on the plate 886 are denominated reset, stop, table right or left, quill in or out, spindle head up or down, and copy right or left. These legends indicate the various machine functions or movements that are available during program controlled operation. As shown in FIG. 12C, the selector switch 880 is provided with a second spaced apart wiper arm 887A that is secured to a common shaft (not shown) for adjustment in synchronism with the wiper arm 887.

Each of the function selector switches, FIG. 12C, 871 to 880 inclusive are provided with a control knob 884 that is operative to position the respective wiper arms 887 into the required position for obtaining the various selected machine functions or movements, during the ten different phases of programmed operation. It will be noted that, with the exception of selector switch 871, the ten contacts respectively provided on each switch are connected to the same common conductors. Switch 871 differs only in that there is no branch conductor to the reset contact thereof. In explanation, no reset conductor is required to the function selector switch 871 because this switch is interconnected with the stepping switch wiper arm 858 only during the first phase of program controlled operation. The reset contacts on the remaining function selector switches 872 to 880 inclusive are required only to effect an automatic sequential indexing of the stepping switch wiper arms to "home" position. This condition will occur, for example, if only the first four (or any number less than ten) of the function selector switches 871 to 874 inclusive are manually adjusted to obtain a particular sequence of machine functions. In such a case the remainder of the selector switches 875 to 880 would be positioned to reset, thus effecting an indexing of the stepping switch wiper arm 858 to its home position for the start of the next cycle of operation. Each control knob 884 of the function selector switches is likewise connected to effect simultaneous adjustment of a second set of wiper arms 887A respectively associated with the switches.

The central terminals of the second set of ten wiper arms 887A of the selector switches 871 to 880 inclusive, are respectively connected via conductors 861A to 870A inclusive to ten contacts adapted to be sequentially engaged by the second stepping switch wiper arm 859. During sequential indexing movement of the stepping switch, the second wiper arm 859 thereof is disposed to be successively connected to the second set of wiper arms 887A of the selector switches 871 to 880 inclusive.

The first contacts of the nine function selector switches 872 to 880 inclusive are respectively connected through branch conductors to a common reset conductor 888. Thus, one or more of the wiper arms 887 of the switches 872 to 880 inclusive may be manually adjusted into engagement with the common reset conductor 888. The second contact disposed to be engaged by the wiper arms 887 of the ten function selector switches 871 to 880 inclusive are connected via branch conductors to a common stop conductor 889. In a similar manner, the eight remaining contacts of the function selector switches 871 to 880 inclusive are respectively connected via branch conductors to common conductors 891 to 898 inclusive. The eight common conductors 891 to 898 inclusive are respectively denominated table right, table left, quill in, quill out, head up, head down, copy right, and copy left.

As shown in FIG. 12C, whenever the control relay 856 is energized to closed position, the eight function initiating conductors 891 to 898 inclusive are respectively connected via closed contact bars of the relay to conductors 901 to 908 inclusive. The conductors 901 to 908 inclusive, in turn, are connected to effect selective energization of one or another of the various motion initiating relays in the control system, as will hereinafter be more fully described. It will be apparent that only one of the conductors 901 to 908 inclusive may be energized at a time to effect a particular predetermined selected machine movement or function.

To effect indexable advancement of the stepping switch wiper arm 858 to each of its eleven, equally spaced apart, stations; there is provided an axially slidable indexing plunger rod 911. As schematically shown in FIG. 12C, the plunger rod 911 is provided at its lower end with a spring biased pawl 912. The pawl 912 is disposed to cooperate with a ratchet wheel 913 that is secured to the common shaft (not shown) to which in turn are fixedly secured the stepping switch wiper arms 858, 859 and 860. Energization of the stepping switch coil 914 effects downward slidable movement of the actuating plunger 911 from its position shown in FIG. 12C. Thus, with the coil 914 energized, the plunger 911 is in its lowermost position with the pawl 912 positioned to engage the ratchet wheel 913 for effecting the next indexable advancement of the switch wiper arms 858, 859 and 860. Upon deenergization of the coil 914, a spring 915 is adapted to urge the plunger rod 911 upwardly to effect a single step, indexable advancement of the stepping switch wiper arms 858, 859 and 860.

To energize the stepping switch 553 into cocked position for effecting resiliently biased indexable advancement of the wiper arms, one terminal of the coil 914 is connected by a conductor 916 to a half-wave rectifier with filter 917, that is connected to receive current from the energized supply conductors 571 and 576. Inasmuch as the stepping switch 553 may be of any well known type, it will be apparent that the conductor 916 connected to one terminal of the coil 914 may derive energy directly from an A.C. control current source, instead of from the half-wave rectifier 917, as shown.

Whenever a conductor 918 connected to the opposite terminal of the coil 914 is energized, the indexing plunger 911 of the stepping switch 553 will be urged downwardly into cocked position. The conductor 918, in turn, is connected to receive electrical energy in response to a plurality of different operating conditions. For example, with the wiper arms of the stepping switch 553 in "home" position, as shown in FIG. 12C, the conductor 918 is connected to be energized upon momentarily depressing the traverse start button switch 855, FIG. 12A. Second, after the wiper arms have moved from "home" position during program controlled operation, the conductor 918 and coil 914 will be energized immediately upon advancement of the switch wiper arms to their next station for effecting a selected machine movement or function. Upon predetermined termination of the machine function or movement selected, the coil 914 is deenergized to effect resiliently biased indexing movement of the stepping switch 553. Third, during program controlled operation, the coil 914 is caused to be respectively energized and deenergized by any of the function selector switches within the panel 554 that are adjusted to reset position. Fourth, whenever one of the function selector switches is adjusted to stop position, during a particular selected machine program, machine movement is stopped until the traverse start switch 855 is again depressed to energize the coil 914. Fifth, during repeat cycle operation, the coil 914 is connected to be energized at the conclusion of a particular selected program, providing a cycle control switch 920 is in closed position. Sixth, in the event the main selector switch 38, FIG. 12A, is opened during a program cycle, the coil 914, FIG. 12C, is connected to be energized and deenergized successively, until the wiper arms of the stepping switch 553 are returned to their "home" position.

It is to be emphasized that energization of the stepping switch coil 914 in response to energization of conductor 918 merely serves to urge the indexing plunger 911 downwardly into cocked position. Indexable movement of the stepping switch wiper arms 858, 859 and 860, therefore, does not occur until the coil 914 is deenergized in a manner that the spring 915 may effect an upward single step advancement of the ratchet wheel 913. It is further emphasized that indexable movement of the ratchet wheel 913 occurs only in a step-by-step manner, with each single step being effected by the spring 915 after the coil 914 is deenergized.

With the stepping switch 553 in "home" position, as shown, a contact bar 921 secured to an axially movable switch plunger 922 is in closed position bridging contacts respectively associated with conductors 923 and 924. The conductor 923 is connected at its opposite end through a closed contact bar of the energized program controlled relay 623 to the energized supply conductor 608, FIG. 12B. As shown in FIG. 12C, the energized conductor 923 is connected to supply current to the central terminal of the stepping switch wiper arm 859, as well as through a branch conductor 925 to the central terminal associated with the stepping switch wiper arm 858. Therefore, whenever the machine is conditioned for program controlled operation by closing the selector switch 38, FIG. 12A, a conductor 923, FIG. 12C, is energized, as are the stepping switch wiper arms 858 and 859. From the energized conductor 923, the flow of current continues through the closed contact bar 921 to the conductor 924 which is connected at its opposite end, FIG. 12A, to one contact associated with a lower contact bar 927 of the traverse start switch 855. Depressing the switch 855, effects a flow of current from the conductor 924, the closed contact bar 927 to a conductor 928 that in turn is connected at its opposite end, FIG. 12C, to the conductor 918, thereby energizing the stepping switch coil 914. Upon releasing the traverse start switch 855, the wiper arms of the stepping switch 553 are indexably advanced from their "home" position into engagement with the first set of contacts, for phase one operation. As this occurs, a circular cam 929 secured to the ratchet wheel 913 is rotated, thus urging the actuating rod 922 upwardly and moving the contact bar 921 to open position. At the same time, another contact bar 930 secured to the actuating rod 922 is moved upwardly into bridging engagement with contacts respectively connected to conductors 933 and 934. The contact bar 930 is retained in closed position as the stepping switch wiper arms are successively advanced through their ten phases of operation.

With the wiper arms 887 and 887A of the function selector switch 871 manually adjusted for table right movement, as shown in FIG. 12C, a circuit is then established through the wiper arm 887 of the switch 871 to initiate rightward table movement. At the same time, a parallel circuit is established through the wiper arm 887A of the switch 871 to effect a re-energization of the coil 914, thereby conditioning the stepping switch 553 for its next single step indexable movement upon the predetermined termination of rightward table movement. As will hereinafter be more fully explained, table right movement is terminated by the function change dog interrupting a holding circuit to the energized coil 914 of the stepping switch, permitting the spring 915 to effect indexable advancement of the stepping switch wiper arms to their next succeeding position. Therefore, it is the indexable advancement of the stepping switch wiper arms that operates to terminate rightward table movement. In other words, indexable advancement of the stepping switch 553, during program controlled operation, operates to terminate a preceding machine function or movement, as well as to initiate a subsequent machine function or movement.

Depressing the traverse start switch 855, FIG. 12A, operates simultaneously to effect energization of the program control relay 856, FIG. 12C, to closed position as well as advancement of the stepping switch wiper arms from their "home" position at the start of a program controlled operation. As shown in FIG. 12A, depressing the traverse start switch 855 moves an upper contact bar 939 into bridging engagement with contacts respectively connected to conductors 940 and 941. The conductor 941 is connected through the normally closed contact bar 942 of the traverse stop switch 616 to a conductor 943, that is connected at its opposite end through a closed contact bar of the energized relay 623 to the energized conductor 608. Therefore, upon momentary closure of the switch 855, FIG. 12A, a circuit is completed from the energized conductor 941, through the contact bar 939 and thence through the conductor 940 that is connected at its opposite end to one terminal of the coil for the program control relay 856, FIG. 12C. A flow of current through the coil energizes the relay 856 to upward closed position and continues to the conductor 596, FIGS. 12B and 12C, that is connected to the energized supply conductor 576. A holding circuit for retaining the program control relay 856 in energized closed position is then established from the conductor 596 through the coil and a branch conductor, connected via the closed upper contact bar 945 of the relay to a conductor 946. The holding circuit for the relay 856 continues from the conductor 946 to the energized conductor 941, FIG. 12A. It will be apparent that during a program controlled operation, depressing the traverse stop switch 616 will immediately interrupt the flow of current from the energized conductor 943 to the conductors 941 and 946, thereby interrupting the holding circuit and permitting the program control relay 856 to drop to an open position. In a like manner, the holding circuit to the coil of the program control relay 856 may be interrupted by moving the main selector switch 38, FIG. 12A, to open position thereby permitting the control relays 623 and 728, FIG. 12B, to drop to an open position.

Actuating the traverse start switch 855, FIG. 12A, to begin a program controlled cycle of operation thus simultaneously energizes the program control relay 856 to upward closed position, and effects an indexable advancement of the stepping switch wiper arms from their "home" position into their phase one position.

Indexable advancement of the stepping switch 553 operates to complete three separate circuits through the wiper arms 858, 859 and 860. The first of these extends from the energized conductor 923, branch conductor 925, the stepping switch wiper arm 858 to the conductor 861. From the conductor 861, the circuit continues through the manually adjusted wiper arm 887 of the function selector switch 871 to the table right conductor 891. With the program control relay 856 in closed position, the circuit continues from the conductor 891 through a closed contact bar of the relay to a conductor 901, that is connected to initiate rightward movement of the worktable, as well as to condition a circuit for energizing a conductor 948 extending to one terminal of a coil for a left-right stop relay 949. The second circuit effected by advancement of the stepping switch 553, extends from the energized conductor 923 through the wiper arm 859 to the conductor 861A. From the conductor 861A, the circuit continues through the second wiper arm 887A of the selector switch 871 to a common conductor 951 connected to the opposite terminal of the coil for the left-right stop relay 949. The flow of current from the conductor 951 through the coil to the energized conductor 948 establishes a holding circuit for retaining the relay 949 in upward closed position. With the left-right stop relay 949 retained in closed position, a holding circuit is then established from the energized conductor 923 via a conductor 954, the closed contact bar 953 to the conductor 918. As hereinbefore explained, the conductor 918 is connected to one terminal of the coil 914 for the stepping switch 553. Since the opposite terminal of the coil 914 is connected to the energized conductor 916, the indexing plunger 911 is urged downwardly to condition the stepping switch 553 for its next step-by-step indexable advancement. The third circuit established during the phase one position of the stepping switch 553 extends from the energized conductor 576 through a conductor 955 and the third switch wiper arm 860 and thence through a phase indicator light 956 to the energized conductor 571. The phase indicator light 956, together with the indicator lights 957 to 965 inclusive, are provided to indicate the particular phase of a program cycle that is being performed, in accordance with the indexable position of the stepping switch wiper arms. Another indicator light 966 is provided to indicate that the wiper arms of the stepping switch have been returned to their "home" position.

With the worktable moving in a rightward direction during the first phase of the selected program cycle illustrated in FIG. 12C, the three circuits established through the stepping switch wiper arms 858, 859, and 860 will continue until table movement is stopped. As shown in FIG. 3, rightward table movement is stopped by engagement of a stop dog 637 secured to the table 29 with the switch actuating plunger 636. The table right stop dog 637 is always operative to stop rightward movement of the worktable. However, the stop dog 637 may also serve as a function change dog, depending upon the predeterminately adjusted position of the function selector switch that will be operative during the next phase of operation. Actuation of the switch plunger 636, operates to interrupt the circuit to the energized conductor 948, FIG. 12C, thereby permitting the relay 949 to drop to an open position. Thereupon, the holding circuit previously established through the closed contact bar 953 of the left-right stop relay 949 is interrupted, thus effecting a deenergization of the stepping coil 914, and permitting resiliently biased upward movement of the indexing plunger 911. Indexing movement of the plunger 911 effects a single step advancement of the wiper arms 858, 859 and 860 to their next, or phase two position. With the stepping switch 553 in its phase two position, the wiper arm 858 is connected by the conductor 862 to the first wiper arm 887 of the function selector switch 872. At the same time, the wiper arm 859 is connected via the conductor 862A to the second wiper arm 887A of the selector switch 872, and the wiper arm 860 is connected to energize the second phase indicator light 957. With the selector switch 872 adjusted to effect inward movement of the spindle quill, it will be apparent that advancement of the stepping switch to its phase two position has operated both to terminate rightward table movement, as well as to initiate inward movement of the spindle quill. In other words, referring again to FIG. 3, the table right stop dog 637 and switch actuating plunger 636 have operated both to stop table movement and to initiate quill movement.

With the stepping switch 553 in its phase two position, three separate circuits are again established through the wiper arms 858, 859 and 860. In the illustrative program shown in FIG. 12C, one circuit extends from the energized wiper arm 858, conductor 862, the wiper arm of the switch 872, the conductor 893, the closed contact bar of the relay 856 to the conductor 903 that is connected to effect "quill in" movement, as well as energize a conductor 969 connected to one terminal of a coil for an in-out stop relay 970. The opposite terminal of the coil for the stop relay 970 is connected through a conductor 971, the second wiper arm 887A of the selector switch 872 and thence the conductor 862A to the energized stepping switch wiper arm 859. Movement of the in-out stop relay 970 to energized closed position completes a circuit from the energized conductor 954 to the conductor 918 connected to energize the stepping switch coil 914 for retaining the indexing plunger 911 in downward position. The third circuit is completed from the energized wiper arm 860 through the phase indicator light 957 to the energized conductor 571. The wiper arms 858, 859 and 860 of the stepping switch 553 are retained in phase two position until the inward movement of the spindle quill is to be stopped.

As shown in FIG. 6, inward movement of the spindle quill 34 is adapted to actuate a quill stop switch 973. To effect this result, the switch 973 is provided with an actuating plunger 974 disposed to be engaged by an upwardly extending abutment 975 secured to the quill moving rack 197. Upon movement of the switch actuating plunger 974, FIG. 6, the holding circuit to the energized conductor 969, FIG. 12C, is interrupted thus permitting the in-out stop relay 970 to drop to open position. Movement of the relay 970 to open position, in turn, interrupts the holding circuit from the energized conductor 954 through the conductor 918 to the stepping switch coil 914, thereby permitting the spring 915 to urge the three wiper arms of the stepping switch 553 to their phase three position. With the switch wiper arms 858, 859 and 860 advanced into their phase three position, three separate circuits are again established in a manner similar to that hereinbefore described. Advancement of the stepping switch into its phase three position again operates to terminate the existing member movement (quill-in) and initiate a subsequent member movement or machine function. Although only the phase one and phase two positions of the stepping switch 553 have been explained in detail, for illustrative purposes, indexable advancement of the stepping switch through its remaining phase stations operates in a similar manner to terminate one member movement and initiate another selected member movement or function. Referring again to FIG. 6, a quill out stop switch 976 is provided to stop outward movement of the spindle quill. To stop outward movement of the quill, an actuating plunger 977 for the switch 976 is engaged by the abutment 975.

Irrespective of the phase position of the stepping switch 553, the circuit through the wiper arm 858 operates to initiate a selected member movement or condition the circuit for a subsequent function, i.e. resuming program control after a selector switch adjusted to the stop position has been interconnected with the wiper arm 858. In the event the selector switches are adjusted to effect a member movement, the wiper arm 858 operates both to initiate the selected movement, as well as condition the circuit for energizing an up-down stop relay 978, or the stop relays 949 or 970 to closed position. At the same time, the circuit through the second stepping switch wiper arm 859 is connected through a corresponding wiper arm 887A of a selector switch to complete the energization of one or another of the stop relays 949, 970, or 978, depending upon the selected member being moved. Closure of one of the stop relays 949, 970 or 978 in turn effects an energization of the stepping switch coil 914 during the selected member movement, the circuit being interrupted to permit resiliently biased indexable advancement of the stepping switch 553 upon termination of the selected member movement.

Likewise, depending upon the phase position of the stepping switch 553, the wiper arm 860 thereof is connected to energize one or the other of the phase indicator lights 956 to 965 inclusive.

Unless one of the selector switches 871 to 880 inclusive has been adjusted to either reset or stop position, the stepping switch coil 914 is always energized to condition the stepping switch 553 for a subsequent indexing movement immediately upon the initiation of any selected member movement during program operation. As hereinbefore explained, initiation of a selected member movement concomitantly operates to condition the circuit for energizing one or another of the stop relays 949, 970, or 978. It will be noted that one of the stop relays is energized to closed position to condition the stepping switch 553 for a subsequent indexable advancement, irrespective of the direction of the selected member movement. Thus, the up-down stop relay 978 is energized to closed position if the spindle head is caused to be moved in either an upward or downward direction. Likewise, the in-out stop relay 970 is energized in the event the quill is moved either inwardly or outwardly. In a similar manner, the left-right stop relay is energized in the event the worktable is moved in either a leftward or rightward direction. Incidentally, the left-right stop relay 949 is connected to be energized in two different conditions of operation. The relay 949 is caused to be energized in the event one or another of the function selector switches 871 to 880 inclusive has been adjusted to table right, table left, copy right, or copy left. During program controlled operation, energization of the copy right conductor 897 or the copy left conductor 898 operates simultaneously to activate the copy control mechanism 33, FIG. 1, in coordinated relationship with either a rightward or leftward movement of the worktable 29.

It will be clear that the stepping switch coil 914 is energized by closure by one of the stop relays 949, 970, or 978, to condition the stepping switch for automatic indexable stepping advancement during a program controlled operation. In addition, the stepping switch 553 is automatically conditioned for resiliently biased stepping advancement, during a program cycle, in the event one of the function selector switches is adjusted to reset, or at the completion of a cycle, if the cycle control switch 920 is in closed position. In the program set up in FIG. 12C, for example, the phase ten selector switch 880 is adjusted to the reset position. With this condition existing, the second wiper arm 887A of the switch 880 engages an open contact and thus has no effect on the stepping switch coil 914. The first wiper arm 887 of the switch 880, however, engages the reset conductor 888. Assume now, that the stepping switch 553 is resiliently indexed from its phase nine position to its phase ten position. A circuit will then be completed from the energized conductors 923, 925, the stepping switch wiper arm 858, the conductor 870, the wiper arm 887 of the switch 880, to the reset conductor 888. From the conductor 888, the circuit continues through a closed contact bar 979 of the program relay 856 to a conductor 980. From the conductor 980, the reset circuit continues through a conductor 981, a closed contact bar 982 secured to the upper end of the indexing plunger 911, to a conductor 983. Whenever the stepping switch coil 914 is deenergized, as in the present condition, the spring 915 urges the indexing plunger 911 upwardly in a manner that the contact bar 982 bridges contacts connected to the conductors 981 and 983. From the conductor 983, the reset circuit continues through the conductor 933, the closed upper contact bar 930 secured to the switch rod 922 to the conductor 934. As hereinbefore explained, whenever the stepping switch 553 is in one or another of its phase one to phase ten positions inclusive, the switch rod 922 is moved upwardly by cam action to open the contact bar 921 and close the upper contact bar 930. From the conductor 934, the reset circuit then continues via a conductor 984 to the conductor 918 thereby energizing the stepping switch coil 914. As soon as this occurs, the indexing plunger 911 is urged downwardly to simultaneously cock the stepping switch 553 and move the contact bar 982 downwardly to interrupt the reset circuit. Thereupon, the spring 915 urges the indexing plunger 911 upwardly in a manner that the stepping switch wiper arms are indexably advanced from the phase ten position to the "home" position.

With the stepping switch 553 returned to its "home" position at the completion of one program cycle, indexable stepping movement of the switch will be stopped, in the event the cycle control switch 920 is in its open position as shown. To restart a second cycle of the selected program, it is then necessary to depress the traverse start switch 855, FIG. 12A, in the manner hereinbefore described. Depressing the traverse start switch 855, after the first cycle of the program has been initiated, has no effect on the program control relay 856, which is retained in energized closed position.

In the event the machine is to be operated for repeat cycle programmed operation, the cycle control switch 920 is moved to closed position. With the switch 920 closed, return of the stepping switch wiper arms to "home" position completes a circuit to condition the stepping switch 553 for indexable advancement into its phase one position to start another cycle of the program. With this condition existing, therefore, program controlled operation is continuous since, the wiper arms of the stepping switch 553 are automatically advanced from phase ten position, through the "home" position, to the phase one position. Assume now, that one cycle of a repeat cycle program has been completed, and the wiper arms of the stepping switch 553 have returned to their "home" position. A circuit for re-energizing the stepping switch coil 914 is then completed from the energized conductors 923, 925, the stepping switch wiper arm 858, a conductor 987, and the closed contact bar of the switch 920 to a conductor 988. From the conductor 988, the repeat cycle circuit continues via the conductor 888, the closed contact bar 979 of the relay 856 to the conductor 980. Inasmuch as the stepping switch is in its "home" position and the coil 914 is deenergized, the contact bar 982 is closed and the contact bar 930 is in open position. Therefore, the repeat cycle circuit continues from the conductor 980, through the conductor 981, the closed contact bar 982 to the conductor 983. With the contact bar 930 in open position, the repeat cycle circuit then continues to the opposite end of the conductor 983, FIG. 12B, and thence through a closed contact bar 991 of the energized control relay 623 to a conductor 992. A continuance of the repeat cycle circuit is then established from the conductor 992, FIG. 12C, through the conductor 984 and the conductor 918 connected to effect energization of the stepping switch coil 914. Energization of the coil 914 effects downward movement of the indexing plunger 911 and contact bar 982 to interrupt the repeat cycle circuit thus established. Upon interruption of the circuit by movement of the contact bar 982 to open position, the spring 915 operates to effect an indexable advancement of the stepping switch from its "home" position to its phase one position, thus initiating another repeat cycle of program controlled operation.

If it is necessary to stop program controlled operation during a cycle, the traverse stop button switch 616 is momentarily depressed to interrupt the holding circuit to the program control relay 856, permitting the relay to move to open position. Deenergization of the relay 856 immediately interrupts the member moving or function control circuits established through the closed contact bars thereof. However, since the relays 623 and 728 are retained in energized closed position, FIG. 12B, the wiper arms of the stepping switch 553, FIG. 12C, will not be effected. In other words, the stepping switch 553 remains in the same phase position it had occupied at the time the traverse stop button switch 616, FIG. 12A, was depressed to stop a cycle of the program. The interrupted cycle, either single or repeat cycle, may be resumed by again depressing the traverse start switch 855, FIG. 12A.

Movement of the main selector switch 38, FIG. 12A, to open position during a cycle of the program, effects movement of the stepping switch 553, FIG. 12C, to "home" position. This is to preclude accidentally restarting the program in the middle of a cycle, after machine movements have been effected by actuation of the push buttons shown in the dotted panel 550, FIG. 12A. As hereinbefore explained, the push button switches within the dotted panel 550 may be actuated to effect required table or spindle head movement whenever the main selector switch 38 is in its open position. Movement of the switch 38 to open position during a cycle of the program interrupts the holding circuits to the control relays 623, FIG. 12B, and 728. Movement of the relays 623 and 728 to open position likewise interrupts the holding circuit to the program control relay 856, thereby effecting movement of this relay to open position. To facilitate the description, the "return home" circuit for the stepping switch coil will be traced from the continuously energized conductor 916 connected to the half-wave rectifier 917, FIG. 12C. This circuit continues from the conductor 916, the stepping switch coil 914, the conductor 918, conductor 984, to conductor 934. The circuit then continues through the closed contact bar 930, the conductor 933, conductor 983, the closed contact bar 982 to the conductor 981. From the conductor 981, the circuit for returning the stepping switch to its "home" position continues through a conductor 995 connected at its opposite end, FIG. 12A, to the energized conductor 621. As hereinbefore explained, whenever the main selector switch 38 is in open position, the conductor 621 is energized through a normally closed contact bar 622, FIG. 12B, of the deenergized relay 623 to the energized main supply conductor 608. The circuit thus established for automatically returning the stepping switch 553 to "home" position is interrupted each time the stepping switch coil 914 is energized to move the indexing plunger 911 downwardly. Thus, even though the switch 38, FIG. 12A, is opened during the first phase of a cycle of the program, the stepping switch 553, FIG. 12C, automatically advances through the remainder of its phase stations to its "home" position. With the circuit thus established for automatically returning the stepping switch 553 to "home" position, the separate indexing operations comprising energization of the coil 914, deenergizing of the coil 914, and operation of the spring 915 occur in rapid and continuous succession. Simultaneously with the automatic return of the stepping switch 553 to "home" position, however, the cam 929 permits downward movement of the switch plunger 922, thus moving the contact bar 930 to open position. Movement of the contact bar 930 to open position, in turn, interrupts the circuit established from the conductor 933 to the conductor 934, thereby preventing further indexable stepping movement of the switch 553.

To facilitate performing certain milling operations, it may be advantageous to position one of the function selector switches to stop position. In the single cycle program, shown for illustrative purposes in FIG. 12C, for example, the phase five selector switch 875 is shown as being adjusted to stop position. With the control knob of the selector switch 875 in stop position, the first wiper arm 887 thereof engages the stop conductor 889, and the second wiper arm 887A engages an open contact. In the illustrative single cycle program, shown in FIG. 12C, there are provided two stop positions, i.e. the "home" position of the stepping switch 553 and the phase five position of the selector switch 875. In effect, therefore, a split single cycle program is provided in which either different, or identical, milling operations may be performed on opposite ends of the worktable. The start of the first split cycle is initiated by momentarily depressing the traverse start switch 855, FIG. 12A, to advance the stepping switch 553 to its phase one position. The second split cycle is initiated by again momentarily depressing the traverse start switch 855 to effect advancement of the stepping switch from its phase five, or stop position, to its phase six position for initiating the selected member movement.

In setting a machine for a split cycle operation, the worktable 29 is moved to a central position along the bed 21, FIG. 1, at the start of each split cycle. In other words, in both the "home" stop position and the phase five stop position, the mid-point of the worktable 29 will be positioned beneath the tool spindle 25. In the single cycle program selected, the worktable 29 will be first moved rightwardly from its mid-position, shown in FIG. 1, in a manner that a workpiece (not shown) carried by the left end of the table may be engaged by a cutter mounted in the tool spindle 25. After this milling operation has been completed, the table will be moved leftwardly and again stopped at its mid-position relative to the tool spindle. The worktable 29 will then be moved in a leftward direction, during the second split cycle, in a manner that a copying operation may be performed on a workpiece (not shown) mounted on the rightward end of the worktable. At the completion of the copying operation, the worktable will again be moved to its central position, corresponding to the "home" stop position of the stepping switch 553.

To effect the desired sequence of machine movements, the first four selector switches representing phases one to four inclusive are positioned to table right, quill in, table left, and quill out. In explanation, the milling operation is effected by table right movement in phase one. In phase two, the quill is retracted in a manner that the cutter (not shown) clears the workpiece on its return movement. In phase three, the table is moved leftwardly to its starting, or mid-position, at which time the quill is moved outwardly, phase four, to begin another milling operation. The phase five selector switch is adjusted to stop position, for interrupting the program to facilitate the loading and unloading of workpieces. The selector switches for phases six to nine inclusive are adjusted to table left, left copy, head up, and table right. Inasmuch as all of the available table movements or functions are not required in the illustrative cycle, the phase ten selector switch is adjusted to reset. Thus, during phase nine operation, the table is moved rightwardly to its mid-position, corresponding to the "home" position of the stepping switch 553.

It will be understood that the various stop or function change dogs, shown in FIGS. 3 and 4, are predeterminately adjusted to limit the extent of machine member movement determined by the setting of the function selector switches, FIG. 12C. Likewise, a pattern (not shown) of required configuration is secured to the worktable in a position to cooperate with the copy stylus 35 during phase seven operation. Inasmuch as the operation of the stepping switch 553 during program controlled operation has been described in detail, it is not deemed necessary to describe all phases of the illustrative program, shown in FIG. 12C. A principal advantage of the present invention, however, is the inclusion of a dynamic stop position as one phase of a continuous program cycle. As is clearly illustrated in the program shown in FIG. 12C, the stop position in phase five constitutes a predetermined interruption of the complete cycle of the program. However, movement of the worktable in a leftward direction may be immediately resumed as soon as the stepping switch 553 advances from its phase five to its phase six position. In a similar manner, depending upon the position of the phase six selector switch, any other machine movement may be initiated after the table has come to a complete stop.

To simplify the drawings, the various stop and function change dogs, shown in FIGS. 3 and 4, are not shown as being positioned in coordinated relationship with the adjusted position of the function selector switches shown in FIG. 12C. It will be apparent, however, that the various dogs shown in FIGS. 3 and 4 may be appropriately repositioned in a manner that the machine may be operated to effect a single cycle of program operation in accordance with the adjusted positions of the selector switches. In phase four of the illustrative program shown, the worktable is returned in a leftward direction to its mid-position, which is determined by engagement of the stop dog 710, FIG. 3, with the left stop switch plunger 709. The switch plunger 709 is retained in engagement with the stop dog 710 as the quill is returned to its outward position during phase four operation. The left stop switch plunger 709 is likewise retained in depressed position by engagement with the dog 710 during the fifth, or unloading phase of the selected cycle. Upon resuming leftward table movement, phase six, to initiate the next or split cycle of operation, the left stop switch 709 is still retained in depressed position.

Although the left stop switch 709 is depressed, the second split cycle may be initiated by depressing the traverse start switch 855, phase five, to advance the stepping switch to its phase six position for restarting leftward table movement. Leftward table movement, phase six, effects movement of the stop dog 710 thus permitting the stop switch plunger 709 to move outwardly to normally closed position, thereby re-energizing the left-right stop relay 949, FIG. 12C. Energization of the relay 949 in turn conditions the stepping switch coil 914 for its next resiliently biased stepping movement. In a similar manner, any selected member movement may be initiated even though one of the function change or stop dogs, shown in FIGS. 3 and 4, is retaining one or another of the cooperating stop switch plungers in open position.

Referring again to FIG. 12C, the circuit for restarting leftward movement of the worktable from the phase five position of the stepping switch is effected as follows. With the stepping switch 553 in phase five position, a circuit is completed from the energized wiper arm 858, the conductor 865, and the wiper arm 887 of the phase five selector switch 875 to the common stop conductor 889. From the common stop conductor 889, the circuit then continues through the conductor 924 which is connected at its opposite end to a contact associated with the normally open lower contact bar 927 of the traverse start switch 855. Depressing the traverse start switch 855 thus completes a circuit from the conductor 924, the contact bar 927, the conductor 928, and the conductor 918 connected to the stepping switch coil 914. After energizing the stepping switch coil 914 in the manner described, releasing the traverse start switch 855 permits the spring 915 to effect indexable advancement of the stepping switch 553 from its phase five or stop position to its phase six or motion initiating position.

Having described the operation of the program control system, shown in FIG. 12C, the motion or function initiating circuits effected by energizing one or another of the conductors 901 to 908 inclusive will be described. As hereinbefore explained, depending upon the particular phase of operation, an energized control circuit is established from the stepping switch wiper arm 858 through one or another of the function selector switches 871 to 880 inclusive via the common conductors 891 to 898 inclusive through closed contact bars of the energized relay 856 to the conductors 901 to 908 inclusive. Inasmuch as only one of the conductors 901 to 908 inclusive may be energized at a time, the motion or function initiating circuits established therethrough will be described in a sequence corresponding to that shown in FIGS. 12C and 12B respectively. To facilitate following the description, reference therefore is made to the lower left portion of FIG. 12B showing the continuation of the conductors 901 to 908 inclusive.

With the machine conditioned for program controlled operation, a phase position calling for table right movement energizes the conductor 901, FIG. 12B, which is connected at its opposite end, FIG. 12A, to one terminal of a coil for the table right relay 747. The flow of current through the coil energizes the relay 747 to closed position and continues through conductors 1002 and 1003 to a common junction 1004. From the junction 1004 an interlocking circuit for retaining the relay 747 in closed position continues through the closed contact bar 645 of the quill out relay 646 to the conductor 647. From the conductor 647, the interlocking holding circuit continues through the closed contact bar 648 of the quill in relay 649, FIG. 12B, to the conductor 652. The flow of current continues from the conductor 652 through the normally closed contact bar of the relay 654, the conductor 655, the closed contact bar of the relay 657, to the conductor 658. The interlocking circuit continues from the conductor 658 through the closed contact bar of the relay 660, the conductor 661, the closed contact bar of the relay 663, the conductor 664, the closed contact bar of relay 666, conductor 667, the closed contact bar of the relay 669 and through the conductor 670 to the energized supply conductor 603.

Simultaneously with the establishment of the described interlocking circuit for the table right relay 747, an identical series circuit is established from the energized conductor 603 to the common junction 1004, FIG. 12A. From the junction 1004 a parallel circuit is then established through the conductor 644, and the conductor 643 to one contact of the table left stop switch 708, FIG. 12B. The parallel circuit continues through the normally closed contact bar of the switch 708 to a conductor 707, and thence through the closed contact bar 1008 of the closed relay 623 to the conductor 639. From the conductor 639, the parallel circuit continues through the normally closed contact bar of the table right stop switch 635 to the conductor 633, the conductor 632, a closed contact bar 1009 of the relay 623 to energize the conductor 948 connected to one terminal of the left-right stop relay 949, FIG. 12C. As hereinbefore explained, the parallel circuit thus established to energize the conductor 948 cooperates with the energized conductor 951 to effect movement of the stop relay 949 to closed position, thereby conditioning the stepping switch coil 914 for its next resiliently biased movement.

Simultaneously with the energization of the stop relay 949, FIG. 12C, and table right relay 747, FIG. 12A, the table right valve solenoid 347, FIG. 12B, is energized. This circuit is completed from the energized conductor 603 through the coil 347, the conductor 689, and thence through the closed contact bar 1011 of the relay 747, FIG. 12A, to the energized conductor 694. It will be noted, that actuating the table right switch 635, FIG. 12B, does not directly and immediately interrupt the interlocking holding circuit through the coil of the table right relay 747, FIG. 12A. Rather, the actuation of the table right stop switch 635 by the table right stop dog 637, FIG. 3, merely interrupts the parallel holding circuit to the coil of the left-right stop relay 949, FIG. 12C.

As hereinbefore explained, the stepping switch coil 914 is deenergized, permitting resiliently indexed stepping movement of the switch wiper arms to their next phase position. Thus, the advancement of the stepping switch to its next phase position interrupts the holding circuit to the coil of the table right relay 747, FIG. 12A, to terminate rightward movement of the worktable.

Conversely, the combination of the series parallel holding circuit to the coil of the left-right stop relay 949, FIG. 12C, illustrates the reason that table right movement may be initiated even though the table right stop switch 635, FIG. 12B, is retained in open position by engagement with its cooperating stop dog. In a similar manner, this principle of operation is applied to permit initiation of any selected member movement, irrespective of whether or not the corresponding stop switch is in open or closed position.

Programmed initiation of table left movement is effected by energizing the conductor 902, FIG. 12B, which is connected at its opposite end to one terminal of a coil for the table left relay 753, FIG. 12A. As hereinbefore described with respect to table right movement, the flow of current through the coil effects closure of the table left relay 753 and continues through conductors 1002 and 1003 to the common junction 1004. From the common junction 1004, an interlocking holding circuit for retaining the table left relay 753 in closed position is established as hereinbefore described. Likewise, a parallel circuit extending from the common junction 1004 is established to energize the coil of the left-right stop relay 949, FIG. 12C, during leftward movement of the worktable. A holding circuit for energizing the valve solenoid 348, FIG. 12B, is then effected from the energized conductor 603, through the coil 348, the conductor 717, and the closed contact bar 1012 of the energized table left relay 753 to the energized conductor 694. Inasmuch as the table left stop switch 708, FIG. 12B, is connected in series with the table right stop switch 635 during program controlled operation, actuation of the left switch plunger 709 by the left stop dog will operate to stop leftward table movement.

To effect program controlled inward movement of the spindle quill, an energized conductor 903 is connected at its opposite end to the coil of the quill in relay 649, FIG. 12B. The flow of current through the coil energizes the relay 649 to closed position and continues through a conductor 1014 to a common junction 1015. From the common junction 1015 an interlocking holding circuit for retaining the relay 649 in closed position is established via a conductor 1016 to a conductor 1018, FIG. 12A. From the conductor 1018, the holding circuit continues through the closed contact bar of the relay 747, a conductor 1019, a closed contact bar of the relay 628, a conductor 1020, a closed contact bar of the relay 676, to a conductor 1021. Th holding circuit continues through a closed contact bar of the relay 753 to a conductor 1022 through a closed contact bar of the relay 654, FIG. 12B, a conductor 1023, a closed contact bar of the relay 657 to a conductor 1024. From the conductor 1024, the circuit continues through a closed contact bar of the relay 660, a conductor 1025, a closed contact bar of the relay 663, to a conductor 1026. The holding circuit is completed from the conductor 1026 through a closed contact bar of the relay 666, a conductor 1027 and through a closed contact bar of the relay 669 to the conductor 670 connected to the energized conductor 603. Concomitantly with the movement of the quill in relay 649 to closed position, a parallel circuit is established from the common junction 1015, through the normally closed contact bar of the quill-out stop switch 976 to a conductor 1030. From the conductor 1030, the parallel holding circuit continues through the normally closed contact bar of the quill in stop switch 973 to the conductor 969. As hereinbefore explained, energization of the conductor 969, FIG. 12C, completes a circuit to energize the coil of the stop relay 970 to condition the stepping switch coil 914 for its next indexable advancement. Movement of the quill in relay 649, FIG. 12B, to closed position completes a circuit for energizing the quill in valve solenoid 442. This circuit is in turn completed from the energized conductor 603, via a branch conductor 1032, through the solenoid 442, a conductor 1033, the closed contact bar of the quill in relay 649, to a conductor 1034 connected to the energized supply conductor 626. As hereinbefore explained, movement of the stop switch plunger 974 inwardly interrupts the holding circuit to the relay 970, FIG. 12C, thereby stopping inward movement of the spindle quill.

In a like manner, outward movement of the spindle quill is effected by completion of a circuit from the energized conductor 904, FIG. 12A, extending to one terminal of a coil for the quill out relay 646. Movement of the relay to energized closed position is effected by the flow of current through the coil to the conductor 1016 and the common junction 1015. As hereinbefore explained, two separate circuits are then established from the common junction 1015, one an interlocking circuit for retaining the quill out relay 646 in closed position, and the other a parallel circuit for energizing the in-out stop relay 970, FIG. 12C. With the quill out relay 646, FIG. 12A, energized to closed position, a circuit is likewise established to energize the control valve solenoid 430, FIG. 12B. The quill moving circuit is completed from the energized conductor 603, through the solenoid 430, to a conductor 1038, and thence through an upper contact bar of the quill out relay 646 to a conductor 1039 connected to the energized supply conductor 608.

Upward movement of the spindle head is effected by completion of a circuit from the energized conductor 905, FIG. 12B, that is connected through the coil of the up relay 654 to a common junction 1041. From the junction 1041, the holding circuit for retaining the relay in closed position continues via the conductor 742, the closed contact bar 743 of the quill out relay 646, FIG. 12A, and thence through the conductor 745 as hereinbefore described to the conductor 670 and the energized supply conductor 603. At the same time, a parallel circuit is established from the junction 1041, FIG. 12B, through the lower branch of the conductor 742, the conductor 741, the closed contact bar of the head down stop switch 781 to a conductor 1042. From the conductor 1042, the parallel holding circuit continues through a closed contact bar of the energized relay 728, the conductor 739, a closed contact bar of the up stop switch 734 to a conductor 1043. From the conductor 1043, the circuit continues through a closed contact bar of the energized relay 728 to a conductor 1045 connected to one terminal of the coil for the up-down stop relay 978, FIG. 12C. Energization of the relay 978 to closed position is effected by a continued flow of current through a conductor 1046 and thence to one or another of the wiper arms 887A of the function selector switches to the second stepping switch wiper arm 859.

Movement of the up relay 654 to closed position establishes three other circuits for simultaneously energizing the vertical power counterweight solenoid 408, the head clutch solenoid 319, and the head up valve solenoid 519. The solenoids 319 and 408 are energized via parallel circuits extending from the energized conductor 603 to the conductor 844 and thence through a conductor 1048, a closed contact bar 1049 of the relay 654, to a conductor 1050 and branch conductor 848 connected to the energized supply line 626. The directional valve solenoid 519 is likewise energized by completion of a circuit from the conductor 603 through the coil to the conductor 764, which, in turn, is connected through a closed contact bar 1052 of the up relay 654 to the energized conductor 769.

Downward movement of the spindle head is effected by establishing a holding circuit from the energized conductor 906, through the coil of the down relay 663, the conductor 741 to a junction 1055 connected directly to the junction 1041. From the junction 1055, the interlocking holding circuit for the relay 663, as well as the parallel circuit to energize the stop relay 978, FIG. 12C, is therefore established as hereinbefore described. Upward movement of the relay 663 to closed position in turn establishes three circuits for energizing the counterweight solenoid 408, the head clutch solenoid 319, and the valve solenoid 526. Energization of the solenoids 319 and 408 is effected via the conductor 844, the conductor 1048, branch conductor 1056, a closed contact bar of the relay 663 to the energized supply conductor 626. In like manner, energization of the down solenoid 526 is effected by completion of a circuit from the conductor 603, the coil 526, the conductor 788, a conductor 1057, and a closed contact bar of the relay 663 to the energized conductor 769.

To effect program control of right copy movement, current from the energized conductor 907 is connected to one terminal of a coil for the right copy relay 669, and continues through the coil via a conductor 1060, and thence through a normally closed interlocking contact bar of the left copy relay 666 to the energized line 603. Movement of the right copy relay 669 to closed position completes a circuit for energizing the copy control valve solenoids 530, 531 and 532. This is accomplished by a flow of current from the energized conductor 603 via parallel branch lines, through the respective solenoids 530, 531 and 532, and thence to a common conductor 1061, a closed contact bar of the relay 669, a conductor 1062, and a conductor 1063 connected to the energized conductor 626. At the same time, another circuit is completed from the energized conductor 626, a conductor 1065, the closed upper bar of the right copy relay 669 and through a conductor 1066 connected to energize the table right conductor 901. As hereinbefore explained, energization of the conductor 901 operates to initiate rightward movement of the worktable, as well as condition the stepping switch for its next indexable stepping movement at the predetermined termination of the right copy operation.

In a like manner, program controlled left copy movement is effected by completion of a circuit from the energized conductor 908, through a coil for the left copy relay 666 to a conductor 1069. The left copy control circuit continues from the conductor 1069, through a normally closed contact bar 1070 of the right copy relay 669 to the conductor 670 connected to the energized supply conductor 603. Movement of the left copy relay 666 to upward closed position establishes circuits for energizing the three copy selector valve solenoids, as well as for initiating leftward movement of the worktable in coopdinated relationship with actuation of the copy control mechanism. From the energized conductor 603, a flow of control current is conducted via three parallel lines through the solenoids 530, 531 and 532 to the common conductor 1061. This circuit continues from the conductor 1061, a conductor 1072, a closed contact bar of the energized relay 666 to the conductor 1063 connected to the energized conductor 626. Another circuit is established from the energized conductor 626, the conductor 1065, the closed upper contact bar of the relay 666, and thence through a conductor 1073 that is connected to energize the table left conductor 902. As previously explained, energization of the table left conductor 902 simultaneously initiates leftward table movement and conditions the stepping switch 553 for its next indexable movement.

During program controlled operation of the machine, the movement of the worktable or spindle head may be selectively increased from the feed to rapid traverse rate by means of two rapid traverse start switches 1075 and 1076, FIG. 12A, and two spindle head rapid traverse start switches 1077 and 1078, FIG. 12B. One or another of the rapid traverse start switches is operative to effect movement of either the worktable or the spindle head, providing the respective member movement has been initiated by the program control system, FIG. 12C. The selected rapid traverse rate of the particular member being moved may be stopped in one of two ways. First, setting a function change dog to terminate directionally controlled member movement, stops the rapid traverse rate by effecting an indexable advancement of the stepping switch 553, FIG. 12C, to its next position. Second, setting an appropriate dog to actuate one or another of the rapid traverse stop switches 802, 816, 829, or 835, FIG. 12A, will operate both to terminate rapid traverse travel, and resume feed movement. For this reason, during program controlled operation, the switch actuating plungers 803, 817, 830 and 836 respectively associated with these switches are designated as feed switches in FIGS. 3 and 4. For simplicity of operation in setting up the machine, it is more suitable to consider their function as starting feed, rather than stopping the rapid traverse rate of movement.

The normally open, table right rapid traverse switch 1075 is adapted to initiate rightward rapid traverse movement whenever the table right relay 747 is energized to closed position. To accomplish this, as shown in FIGS. 12A and 3, a switch actuating plunger 1081 is positioned to be engaged by a table right start dog 1082 adjustably secured to the worktable 29. Actuating the start switch 1075 in this manner, FIG. 12A, completes a circuit from the energized conductor 814 to a conductor 1083. The program rapid traverse circuit continues from the conductor 1083, through a closed contact bar of the energized table right relay 747 to a conductor 1084 and thence to a conductor 1085. From the conductor 1085, the program rapid traverse holding circuit continues via the conductor 793, conductor 794, and the coil of the table rapid traverse relay 795 to the conductor 796. From the conductor 796, the circuit continues through the normally closed contact bar of the right feed (rapid traverse stop) switch 802 and a conductor 804 to a conductor 1088. At its opposite end, the conductor 1088 is connected through a closed contact bar of the energized relay 747 to a conductor 1089 connected to the energized conductor 807. As hereinbefore explained, energization of the coil for the table rapid traverse relay 795 completes a circuit to energize the table rapid traverse solenoid 362, FIG. 12B. Actuating the switch plunger 803 by engagement with the feed dog 820, FIG. 3, interrupts the holding circuit to terminate rapid and initiate feed movement.

To initiate rapid movement of the table during leftward program control operation, an actuating plunger 1092, FIGS. 3 and 12A, is depressed by rapid traverse start dog 1093. A circuit is then completed from the energized conductor 813 through the momentarily closed contact bar of the left start switch 1076 to a conductor 1094. The folding circuit continues from the conductor 1094 through a closed contact bar of the relay 753 to a conductor 1095 connected at its opposite end to a conductor 1085. From the conductor 1085, the circuit continues via conductors 793 and 794, through the coil of the table rapid traverse relay 795 to the conductor 796. The holding circuit continues from the conductors 796 through the normally closed switch 816, a conductor 1097, a closed contact bar 1098 of the relay 753 to a conductor 1099 connected to the energized conductor 807.

Upward rapid traverse movement of the spindle head during program control is effected by movement of a rapid traverse start dog 1102 into engagement with a switch actuating plunger 1103 carried by the head tripping post 37. As shown in FIG. 12B, the plunger 1103 effects closure of the table left rapid traverse switch 1077 thereby completing a circuit from the energized conductor 626 to a conductor 1104. From the conductor 1104, the holding circuit continues through a closed contact bar of the energized head up relay 654, to a conductor 1105 and thence through a conductor 1106 to the conductor 793, FIG. 12A. A holding circuit continues from the conductor 793, through a branch conductor 825, the coil of the spindle head rapid traverse relay 826 to the conductor 827. The circuit continues through the normally closed contact bar of the stop switch (feed start 829) to the conductor 831 which continues, FIG. 12B, to the conductor 832. From the conductor 832, the circuit is completed through a closed contact bar of the energized relay 654 to a conductor 1108 connected to the energized conductor 741.

In a like manner, downward movement of the spindle head at rapid traverse during program operation may be effected by engagement of a stop dog (not shown) with a switch actuating plunger 1110 carried by the head tripping post 37, FIG. 4. As shown in FIG. 12B, the switch plunger 1110 effects movement of the start switch 1078 to closed position completing a circuit from the energized conductor 626 to a conductor 1111. From the conductor 1111 the circuit continues through a branch conductor, a closed contact bar of the energized down relay 663 to a conductor 1112. From the conductor 1112, the circuit continues via the conductor 1106 that is connected at its upper end, FIG. 12A, to the conductor 793. The rapid traverse holding circuit continues via branch conductor 825, through the coil of the relay 826, the conductor 827, and the closed contact bar of the feed start switch (rapid traverse stop) 835 to the conductor 837. From the conductor 837, the holding circuit continues through the conductor 838, FIG. 12B, through the closed contact bar 1114 of the energized relay 663 to a branch conductor 1115, and conductor 833 to the energized line 741.

During program controlled operation of the machine, the change from feed to rapid rates of movement, and vice versa, are obtainable in coordinated relationship with operation of the program control system shown in FIG. 12C. Although the rapid traverse rate of movement is not initiated as a function of the program control system, the termination of rapid movement may be effected in coordinated relationship with the initiation of a different member movement through program controlled operation. As illustrated in FIGS. 3 and 4, rapid traverse movement during program control is always initiated by actuation of one or another of the rapid traverse start switch plungers 1081, 1092, 1103 and 1110, in accordance with the selected adjusted position of the rapid traverse start dogs. In the illustrative single cycle program shown in FIG. 12C, phases one to four inclusive have been adjusted to produce a different member movement in predetermined sequence. Phase five is a stop position prior to initiating the next portion of the cycle. Phases six to nine inclusive have likewise been adjusted to produce a different selected sequence of machine member movements, while phase ten is in the reset condition permitting return of the stepping switch to its "home" position. By effecting an appropriate setting of the rapid traverse start dogs, it will be apparent that table rightward movement initiated during phase one may be changed from feed to rapid or vice versa, as may be required. In a like manner, table left movement initiated during phase four may be changed from feed to rapid. Likewise, the member movements effected during phases six, eight, and nine may be changed from feed to rapid as required.

From the foregoing description and operation of the improved program control system it will be apparent that it provides two principal modes of operation, affording the utmost flexibility in operating the movable members of a machine tool. In the preferred embodiments of the invention disclosed herein, the program control system is adapted to predeterminately control, in any selected sequence, the available movement of both machine members and functions. To effect this result, the machine tool incorporating the improved control system is provided with a plurality of members that are rectilinearly movable in different planes, as well as functions associated with the member movements. To initiate movement of a selected member of function, there are provided a plurality of power driven transmission mechanisms. To selectively connect or disconnect one or the other of the various transmissions, there are provided a plurality of cooperatively operable hydraulic control systems selectively responsive to the electrical control system. To operatively control the selection of a particular member movement or function change, the electrical control system may be conditioned for two principal modes of operation, i.e. push button control or program control. During push button control, the machine is operable in the manner of a conventional machine to perform milling operations on either single, or small quantities of workpieces. Push button controlled operation may likewise be utilized to position the various members for setting the stop and function change dogs in preparation for a program controlled operation. During program control, the machine movements may be effected in any predetermined sequence to perform rectilinear milling operations, curvilinear or angular milling operations, or a mixed sequence of rectilinear and curvilinear milling operations. The program controlled operation may be further subdivided into three different types of cycles. For example, split milling operations may be effected by utilizing two stop positions in a manner that work may be successively milled at separate stations on opposite ends of the worktable. During single cycle milling operations, a predetermined series of member movements or function changes may be effected, and the machine restarted at the completion at each cycle of the program. In repeat cycle operation, the machine operates automatically and continuously to perform a selected sequence of operations.

It will be apparent that the program control system provides three varying degrees of automatic control; split cycle, single cycle, or repeat cycle. Depending upon the requirements of a particular milling operation, therefore, the control system is adapted to be quickly conditioned for the selected mode of operation, and the most appropriate cycle control of a preselected program.

Although the illustrative embodiments of the invention have been described in considerable detail for the purpose of setting forth an operative and practical exemplifying structure and control system, it is to be understood that the structure and control systems shown and described are intended to be illustrative only and that various characteristics of the invention may be incorporated in other structural forms, as well as other control systems, without departing from the spirit and scope of the invention as defined in the subjoined claims.

The principles of this invention having now been fully explained in connection with the foregoing description, we hereby claim as our invention:

1. In a control system for a machine tool; a plurality of members carried for selective movement along a plurality of paths, separate transmission means associated with said movable members and being respectively operative to move the said member respectively associated with each of them, a source of electrical energy, a programming control system connected to be energized by said source and comprising an indexable stepping switch connected to operate a different preselected transmission means each time it is advanced to a succeeding station, a bank of separate electrically interconnected selector switches adapted to be preset for determining the selected sequence of operation of said transmission means in response to said stepping switch, separate holding circuits including one pair of normally closed circuit interrupters respectively positioned in proximity to each of said members, one of said holding circuits being connectable to be energized by said source upon advancement of said stepping switch to a next succeeding station, a coil connected to be energized by energization of one of said holding circuits, a resettable resiliently operable ratchet mechanism connected to be reset by energization of said coil, said ratchet mechanism being operative after being reset to effect a resiliently biased indexing movement of said stepping switch to its next station upon deenergization of said coil, and selectively positionable function change dogs respectively associated with said members in such a manner that one or another of said dogs is operative during movement of the associated one of said members to actuate one or another of said interrupters, thereby deenergizing said coil to permit resiliently biased advancement of said stepping switch to its next station whereby one member movement is terminated and another member movement is initiated in accordance with the sequence of operation of said transmission means.

2. In a machine tool, a plurality of directionally movable members, separate power drives reversibly engageable from a neutral position to drive an associated one of said members in a selected direction of movement, a source of power, a plurality of branch circuits respectively connectable to said source of power to engage an associated one of said power drives for operation in a selected direction, a control system operatively interconnecting said branch circuits for effecting a step by step directional movement of said members in any predetermined sequence, said control system comprising a resiliently actuatable stepping switch, a selectively energizable ratchet mechanism operative to condition said stepping switch for its next succeeding resiliently actuated stepping movement, a plurality of function selectors predeterminately connectable to a selected one of said branch circuits, said function selectors being sequentially connected to said source of power by sequential advancement of said stepping switch, separate holding circuits including one pair of normally closed circuit interrupters respectively associated with one of said movable members, said function selectors being operable to condition a respective one of said separate holding circuits for connection to said source of power whenever said associated member is moved by connection of one of said branch circuits to said source of power, said holding circuits being operable to energize said ratchet mechanism when connected to said source of power, and separate function change dogs selectively positionable on said movable members to actuate an appropriate one of said circuit interrupters in a manner to interrupt whichever of the corresponding one of said holding circuits that is connected to said source of power to effect resilient advancement of said stepping switch for initiating the next member movement.

3. In a machine tool, a directionally movable member, means connectable to selectively move said member in either direction, a source of power, branch circuits respectively connectable to said source in a manner to connect said means for moving said member in a selected direction, a function selector device operably connectable to condition said branch circuits for connection to said source of power in any predetermined sequence, a resiliently movable stepping switch operatively disposed to connect one of said selected branch circuits to said source of power in the sequence determined by said function selector device, a selectively energizable ratchet mechanism adapted to advance said stepping switch upon being deenergized, a separate control circuit including a single pair of circuit interrupters positioned in proximity to said member, said control circuit being connected to energize said ratchet mechanism upon advancement of the stepping switch to its next succeeding step, and means associated with said member being operable to selectively actuate one of said circuit interrupters for deenergizing said ratchet mechanism for effecting a resiliently biased stepping movement of said stepping switch.

4. In a machine tool, a plurality of directionally movable members, separate reversible power drives respectively engageable from a neutral position to drive an associated one of said members in a selected direction, a source of control power, a control system having a plurality of branch circuits connectable to said source of power and being respectively operable to engage an associated one of said power drives, a selectively operative function selector device operably connected to condition said branch circuits for connection to said source of power in any selected sequence, a resiliently advanceable stepping switch operative to sequentially connect said branch circuits to said source of power in the order determined by said function selector device, a selectively energizable ratchet mechanism adapted to condition said stepping switch for resiliently biased advancement to its next succeeding step, a plurality of separate control circuits respectively provided with a pair of normally closed circuit interrupters connected in series and each pair being associated with one of said members, said control circuits being separately connectable to energize said ratchet mechanism in coordinated relationship with the next selected member being moved, and adjustable means associated with each of said members being operative to actuate a selected one of said circuit interrupters in a manner to deenergize said coil for effecting resilient advancement of said stepping switch to in turn initiate movement of a selected one of said members in another direction and simultaneously therewith energize one of said holding circuits to re-energize said coil.

5. In a machine tool, a directionally movable member, reversibly operable power driven means selectively connectable to move said member in either direction and being selectively disconnectable to stop movement of said member, a source of power, a power driving control having a plurality of separate branch circuits respectively connectable to said source of power for selectively controlling the directional connection or the disconnection of said power driven means, a switching matrix respectively operable to condition said branch circuits for connection to said source of power in any predetermined selected sequence, a stepping switch actuatable in a step by step manner to effect a sequential connection of one of said selected branch circuits to said source of power in the order determined by said switching matrix, a coil connected to condition said stepping switch for its next succeeding stepping movement, an auxiliary control circuit including a pair of interrupting switch means disposed in proximity to said member, said control circuit being operative to effect stepping movement of said switch whenever one of said interrupting means is activated, means associated with said members being operable to activate one of said circuit interrupting switch means for effecting stepping movement of said stepping switch to its next succeeding position, and an automatic cycle control connectable to effect continuous repetitive operation of said stepping switch whereby said member may be continuously operated for performing repetitive preselected cycles of movements.

6. In a machine tool, a plurality of directionally movable members, separate reversibly operable power driven means respectively connectable to move an associated one of said members in a selected direction of movement, a source of power, a control circuit having a plurality of separate branch circuits selectively connectable to said source in a manner to connect a respective one of said power operable means for moving an associated one of said members in a selected direction, an electrical function selector device operable to condition said branch circuits for connection to said source of power in any predetermined sequence, a stepping switch operative to effect a sequential connection of said branch circuits to said source of power in the sequence determined by said function selector device, a single pair of control means associated with each of said members respectively operable to stop the movement of said associated member by effecting a single step advancement of said stepping switch to thereby initiate movement of any selected one of said members in another direction.

7. In a machine tool, a plurality of members carried for slidable movement in either of two directions, reversibly engageable power operable means respectively connectable to drive one or another of said members in either selected direction of movement, a function determining control circuit having a plurality of selectively connectable circuit connections respectively engageable to control said power operable means for moving said members in a selected direction of movement, a plurality of function selector means operable to predeterminately determine the sequence in which said respective circuit connections are connected to actuate one of said reversible power operable means, a sequencing type switch mechanism actuatable to operatively connect in step by step sequential relationship selected circuit connections to said source of power for effecting a predetermined sequential movement of one of said machine members at the completion of each step, a single pair of switch control means associated with each of said movable members being respectively and predeterminately operable depending upon the direction of member movement to effect a single step advancement of said switch mechanism to terminate movement of said associated member in one direction and to initiate movement of a selected one of said members in another direction, and means adjustably associated with each of said members for actuating a selected one of the said pair of control means associated therewith.

8. In a machine tool, a plurality of members respectively carried for reversible movement, separate reversibly driven means engageable to drive a respectively associated one of said members in either selected direction of movement, a control system comprising a plurality of branch circuits respectively operative when energized to engage an associated one of said driven means and a plurality of function selectors respectively connectable to a selected one of said branch circuits, a source of power sequentially connectable to energize successive ones of said function selectors and said selected branch circuit in a manner to effect sequential movement of one of said members in a selected direction, a stepping switch operative in steps of selected duration to interconnect said source of power to successive ones of said function selectors, a mechanism selectively energizable to condition said stepping switch for a succeeding one of its stepping movements, separate holding circuits respectively associated with each of said members including a pair of circuit interrupters located in proximity to each of said members, one of said interrupters being rendered operative for one direction of movement of said associated member, said holding circuits being respectively and separately connectable to said source of power to condition said stepping switch for advancement, a plurality of auxiliary control means respectively positionable in predetermined phase relationship with said function selectors and being operable to connect one of said holding circuits to said source of power whenever one of said selected branch circuits is connected to said source of power upon stepping movement of said switch, and selectively positionable function change dogs respectively carried by said movable members and in accordance with the direction of movement being respectively operative when moved therewith to actuate one or another of said circuit interrupters for effecting advancement of said stepping switch to its next position.

9. In a machine tool having a plurality of rectilinearly movable members and being capable of performing a plurality of functions involving rectilinear movement of said members in different directions, a plurality of function selectors respectively adapted to be set for causing said machine to perform a particular function, a source of power sequentially connectable to energize said function selectors in such a manner that said machine performs the function predeterminately selected by said energized selector, a stepping switch operatively adapted to effect a sequential interconnection between said source of power and successive ones of said function selectors, power operable means connected to effect stepping movement of said switch, a selectively energizable ratchet mechanism operatively connected to condition said stepping switch for its next succeeding movement, a plurality of separate holding circuits respectively associated with said member including energizable circuit interrupters and being concomitantly preselected by said function selectors for energizing said ratchet mechanism, another holding circuit including a pair of stop switches connected to retain said circuit interrupters energized, each pair of stop switches being carried in proximity to one of said members and being respectively operative to stop movement in one direction, a pair of stop dogs respectively carried by each of said members presettable to actuate one of said switches, in a manner that said stepping switch is advanced to initiate the next succeeding machine function that has been predeterminately selected by said function selectors.

10. In a control system for a machine tool adapted to perform a plurality of functions involving directional motion, a bank of function selectors connectable to be sequentially energized in predetermined sequence, each of said function selectors being adapted to be predeterminately set for initiating a selected machine function when energized, a source of current sequentially connectable to energize said function selectors, a stepping switch operatively arranged to effect a sequential interconnection between said source of current and said function selectors, electrically energizable means for storing mechanical energy that is adapted to effect a single step advancement of said switch whenever said means are deenergized, separate holding circuits including a single pair of circuit interrupters for each motion and being connectable to energize said means for storing mechanical energy being respectively connected concomitantly with the advancement of said stepping switch to its next succeeding step, and function change dogs selectively preset for movement during one of said machine functions and respectively operative for one direction of motion, to actuate an appropriate one of said circuit interrupters for deenergizing said means for storing mechanical energy.

11. In a function control system for a machine tool adapted to perform a plurality of functions in any predetermined sequence, a rotatably indexable sequence controller adapted to be selectively indexed to a plurality of positions throughout a full 360° of movement, said controller being adapted upon advancement to its next position to terminate a previous function and to initiate a subsequent function, force-exerting means connectable when released to effect a single indexable advancement of said sequence controller to its next succeeding position, a plurality of presettable devices operatively connected to determine the sequence of functions to be initiated by said controller, a selectively energizable cocking mechanism adapted to condition said force-exerting means in a manner that upon deenergization of said mechanism said means exerts force to advance said controller to its next position, a holding circuit including a selectively energizable interrupter relay operatively connectable to energize said cocking mechanism upon each advancement of said controller to one of its next succeeding positions, and function change dogs being adjustably operable to deenergize said interrupter relay during one function whereby the function being performed is terminated and the selected next succeeding function is initiated.

12. In a machine tool having a plurality of members carried for selective rectilinear movement in either direction, a stepping switch indexably advanceable throughout a plurality of positions for controlling the directional movement of said members, said switch being operably connected upon advancement to its next step to terminate a preceding member movement and to initiate another preselected member movement, presettable means operatively connected to vary the sequence of member movements initiated by said stepping switch, a selectively energizable ratchet mechanism connected upon deenergization to advance said stepping switch to its next succeeding position, a plurality of holding circuits respectively including an energizable holding relay and a source of power connectable to energize said ratchet mechanism immediately upon arrival of said stepping switch at one of its next succeeding positions, intermediate holding circuits including a pair of normally closed circuit interrupters operable to retain one of said holding relays energized, each pair of interrupters being carried in proximity to one of said members and being respectively operative for one direction of member movement, and a plurality of predeterminately positionable function change dogs associated with and carried for movement in proportion to the movement of each of said members, a respective one of said dogs being operative during movement of said associated member to actuate said interrupter switch in a manner that said mechanism advances said stepping switch to its next position.

13. In a machine tool, a work support adapted to be moved in either direction along a path of travel, a presettable control system comprising a plurality of selector devices in combination with a sequence controller having a plurality of stations interconnected therewith, and each adapted to be rendered sequentially effective by a step by step resettable indexing mechanism for controlling the direction and extent of movement of said member along said path, a source of electrical energy, a holding circuit including a resetting coil adapted to cooperate with said presettable control system, said sequence controller being adapted to successively energize said holding circuit in each station to which it is indexed, function control means movable with said work support in such a manner as to interrupt said holding circuit, and resiliently biased means responsive to the interruption of said electrical circuit in a manner to effect indexing movement of said sequence controller to its next succeeding station.

14. In a machine tool, a plurality of members carried for rectilinear movement along different paths, separate transmission mechanisms connectable to move a respectively associated one of said members in either direction along said paths, a sequence controller indexably advanceable by a step by step movement to a plurality of stations, said controller being operative in each station to actuate a preselected one of said transmission mechanisms for moving said associated member in a selected direction, presettable control means operative to selectively vary the sequence in which said transmission mechanisms are actuated by said controller and being operative to select one or more dynamic stop positions in which none of said members are connected to be moved in a manner that each sequence controller station provides a member movement function or a dynamic stop function, a source of electrical energy, a holding circuit including a selectively energizable resetting coil and normally open selectively energizable holding relays connectable to be energized by said source immediately upon indexable advancement of said sequence controller to a next one of its successive stations, separate auxiliary holding circuits respectively including a pair of interrupter switches and being adapted to retain one of said holding relays in energized condition, each pair of interrupter switches being carried in proximity to one of said members and being respectively operative to de-energize said associated holding circuit during one direction of movement, function change dogs selectively positionable on each of said members, one of said dogs being operative during movement of its said associated member to actuate a preselected one of said interrupter switches to deenergize associated holding relay and said coil, a resettable indexing mechanism responsive to deenergization of said coil by one of said dogs in such a manner as to cause indexable advancement of said sequence controller to a next one of its succeeding stations for effecting the next selected function, and a start switch operatively connected to advance said sequence controller from a stop station to a member movement station for resuming programmed controlled operation.

15. In a machine tool, a plurality of members carried for rectilinear movement along a plurality of paths, separate transmission means respectively associated with each of said members connectable to move said associated member in either direction selectively, a sequence controller indexable in a step by step manner to a plurality of stations, said controller being operative in any of its successive stations to control one of said transmission means for moving said associated member in a selected direction, selector means operatively connected to be preset for selectively varying the sequence in which said separate transmission means are controlled by said sequence controller, a source of electrical energy, a control circuit connected to be energized by said source of electrical energy whenever said sequence controller is indexed to a next succeeding one of its stations, a setting coil interconnected to be energized whenever said control circuit is energized, function change means associated with each of said movable members, one of said function change means being operative during movement of its associated member to interrupt said control circuit for deenergizing said coil, and a resettable indexing mechanism operative to index said sequence controller to its next succeeding station whenever said setting coil is deenergized in response to one or another of said function change means.

16. In a machine tool, a plurality of directionally movable members, separate reversibly operable power driven means respectively connectable to move an associated one of said members in a selected direction of movement, a source of power, a control circuit having a plurality of separate branch circuits selectively connectable to said source in a manner to connect a respective one of said power operable means for moving an associated one of said members in a selected direction, an electrical function selector device operable to condition said branch circuits for connection to said source of power in any predetermined sequence, a stepping switch operative to effect a sequential connection of said branch circuits to said source of power in the sequence determined by said function selector device, a single pair of switch control means associated with each of said members respectively operable to stop the movement of said associated member by effecting a single step advancement of said stepping switch to thereby initiate movement of any selected one of said members in another direction, and function change means secured to each of said members respectively disposed to coact with said switch control means associated therewith.

17. In a machine tool, a plurality of members carried for slidable movement in either of two directions, reversibly engageable power operable means respectively connectable to drive one or another of said members in either selected direction of movement, a function determining control circuit having a plurality of selectively connectable circuit connections respectively engageable to control said power operable means for moving said members in a selected direction, function selector means operable to predeterminately determine the sequence in which said respective circuit connections are connected to actuate one of said reversible power operable means, a sequencing type switch mechanism actuatable to operatively connect in step by step sequential relationship selected circuit connections to said source of power in the sequence preset by said selector means for effecting a predetermined sequential movement of one of said members at the completion of each step, a single pair of switch control means associated with each of said movable members being respectively and predeterminately operable depending upon the direction of member movement to effect a single step advancement of said switch mechanism to terminate movement of said associated member in one direction and to initiate movement of a selected one of said members in another direction, and function change means associated with each of said members for actuating a selected one of said control means associated therewith.

References Cited in the file of this patent

UNITED STATES PATENTS

| | | |
|---|---|---|
| 1,962,459 | Ostlund | June 12, 1934 |
| 2,327,404 | Curtis | Aug. 24, 1943 |
| 2,427,493 | Bullard | Sept. 16, 1947 |
| 2,674,925 | Berthiez | Apr. 13, 1954 |
| 2,700,737 | Holmes et al. | Jan. 25, 1955 |
| 2,731,572 | Cobert | Jan. 17, 1956 |
| 2,780,204 | Barby | Feb. 5, 1957 |
| 2,898,483 | Miller | Aug. 4, 1959 |